US012503907B2

(12) United States Patent
Ohrstrom

(10) Patent No.: US 12,503,907 B2
(45) Date of Patent: Dec. 23, 2025

(54) LOCK FOR SLIDEABLE FENESTRATION

(71) Applicant: VISION EXTRUSIONS GROUP LIMITED, Woodbridge (CA)

(72) Inventor: Rolf Ohrstrom, Woodbridge (CA)

(73) Assignee: VISION EXTRUSIONS GROUP LIMITED, Woodbridge (CA)

( * ) Notice: Subject to any disclaimer, the term of this patent is extended or adjusted under 35 U.S.C. 154(b) by 685 days.

(21) Appl. No.: 17/887,291

(22) Filed: Aug. 12, 2022

(65) Prior Publication Data

US 2023/0047419 A1 Feb. 16, 2023

Related U.S. Application Data

(60) Provisional application No. 63/233,088, filed on Aug. 13, 2021.

(51) Int. Cl.

| | |
|---|---|
| ***E06B 3/46*** | (2006.01) |
| ***E05B 65/08*** | (2006.01) |
| ***E05C 17/08*** | (2006.01) |
| ***E05D 15/06*** | (2006.01) |

(52) U.S. Cl.

CPC ................ *E06B 3/46* (2013.01); *E05B 65/08* (2013.01); *E05B 65/0864* (2013.01); *E05C 17/08* (2013.01); *E05D 15/0669* (2013.01); *E06B 3/4618* (2013.01); *E05Y 2201/22* (2013.01)

(58) Field of Classification Search

CPC ...... E06B 3/4618; E06B 3/46; E05B 65/0864; E05B 65/08; Y10S 292/46; E05D 15/0669; E05C 17/08

See application file for complete search history.

(56) References Cited

U.S. PATENT DOCUMENTS 3,768,847 A * 10/1973 Buck, Jr. ............. E05B 65/0864 292/179

4,045,982 A * 9/1977 Gorton ................ E05B 65/0894 292/288

4,170,885 A * 10/1979 Lundgren ........... E05B 65/0894 70/99

4,763,446 A * 8/1988 Kelly ...................... E05D 15/06 52/207

4,968,072 A * 11/1990 Taylor ................. E05B 65/0864 292/179

(Continued)

*Primary Examiner* — Justin B Rephann

(74) *Attorney, Agent, or Firm* — Ruggiero McAllister & McMahon LLC

(57) ABSTRACT

Disclosed herein is a fenestration assembly. The assembly includes a movable sash assembly, a first lock counterpart connected to the movable sash assembly, a fixed sash assembly, a second lock counterpart connected to the fixed sash assembly, and a sill configuration. While the fixed sash assembly is mounted to the sill configuration, and while the movable sash assembly is mounted to the sill configuration at a first height, the movable sash assembly is lockable to the fixed sash assembly. While the fixed sash assembly is mounted to the sill configuration, and while the movable sash assembly is mounted to the sill configuration at a second height, the movable sash assembly is lockable to the fixed sash assembly. While there is an absence of locking between the movable and fixed sash assemblies, the movable sash assembly is movable relative to the sill configuration.

20 Claims, 45 Drawing Sheets

(56) References Cited

U.S. PATENT DOCUMENTS

| | | | | | |
|---|---|---|---|---|---|
| 5,356,185 | A * | 10/1994 | Cameron | E05B 65/0864 292/137 |
| 5,407,240 | A * | 4/1995 | Andre | E05B 65/08 292/DIG. 46 |
| 5,409,271 | A * | 4/1995 | Hoffmann | E05B 63/0004 292/DIG. 47 |
| 6,871,448 | B1 * | 3/2005 | Kline | E06B 7/28 49/319 |
| 8,640,384 | B2 * | 2/2014 | Curtis | E05B 1/0038 49/395 |
| 2011/0107672 | A1 * | 5/2011 | Curtis | E05B 65/0864 49/130 |
| 2018/0058122 | A1 * | 3/2018 | Lang | E06B 3/46 |

* cited by examiner

LOCK FOR SLIDEABLE FENESTRATION

CROSS REFERENCE TO RELATED APPLICATION

This application claims priority to U.S. Provisional Application No. 63/233,088 filed on Aug. 13, 2021, which is hereby incorporated herein by reference in its entirety

FIELD

The present disclosure relates to a slidable fenestration, in particular, to a slidable fenestration with a locking system that is effective before and after adjustment of height of the movable sash.

BACKGROUND

Fenestration assemblies include patio door assemblies and window assemblies. It may be desirable to lock a movable sill of the assembly to the fixed sill.

Existing locking systems, for example, kick bolts, are configured to lock the movable sill to the fixed sill. Unfortunately, existing locking systems are effective for locking the movable sill to the fixed sill while the movable sill and the fixed sill are disposed in a particular relative configuration, in particular, the relative configuration of the movable sill and the fixed sill while the locking system is installed on the assembly. In some instances, the height of the movable sill is adjusted, for example, due to misalignment of the movable sill relative to the framework of the assembly. After adjustment of the height of the movable sill, the relative configuration of the movable sill and the fixed sill will be changed, such that the existing locking system will be ineffective for locking the movable sill to the fixed sill. This results in uninstallation of the existing locking system and installation of another locking system, which is time consuming and burdensome, and may not be possible.

In addition, existing locking systems are installed over the access port of the movable sill for adjusting the height of the movable sill with fasteners. If it is desired to adjust the height of the movable sill, to access the access port with a tool, such as a screw driver, the existing locking system has to be entirely uninstalled by removing the fasteners. After the height of the movable sill is adjusted, the locking system has to be reinstalled by mounting the locking system to the movable sash with fasteners. The process is time consuming and burdensome.

SUMMARY

In one aspect, there is provided parts for an assembly for a fenestration, comprising: a movable sash; a sill configuration; wherein: the movable sash is configured for mounting to the sill configuration; and the mounting is adjustable such that the movable sash is vertically positionable relative to the sill configuration between an upper position and a lower position; a first lock counterpart mountable to the movable sash; wherein: while the first lock counterpart is mounted to the movable sash: while the movable sash is mounted to the sill configuration such that the movable sash is disposed in the upper position relative to the sill configuration, the first lock counterpart, the movable sash, and the sill configuration are disposed in an upper position n configuration; and while the movable sash is mounted to the sill configuration such that the movable sash is disposed in the lower position relative to the sill configuration, the first lock counterpart, the movable sash, and the sill configuration are disposed in a lower position configuration; and; a fixed sash assembly configured for mounting to the sill configuration such that a mounted fixed sash configuration is established, wherein the fixed sash assembly includes: a fixed sash; and a second lock counterpart; wherein: the movable sash, the first lock counterpart, the fixed sash assembly, and the sill configuration are co-operatively configured such that, while the mounted fixed sash configuration is established: while the upper position configuration is established, the second lock counterpart is disposed relative to the first lock counterpart for interacting with the first lock counterpart in response to a locking-effective actuation of the first lock counterpart, wherein the interacting is with effect that the movable sash becomes locked to the fixed sash assembly in a first locked configuration; while the lower position configuration is established, the second lock counterpart is disposed relative to the first lock counterpart for interacting with the first lock counterpart in response to a locking-effective actuation of the first lock counterpart, wherein the interacting is with effect that the movable sash becomes locked to the fixed sash assembly in a second locked configuration; in each one of the upper position configuration and the lower position configuration, independently, while there is an absence of the interaction between the first and second lock counterparts, the mounting of the movable sash to the sill configuration is with effect that the movable sash is movable relative to the sill configuration; and transitioning from the first locked configuration to the second locked configuration is effectible in absence of re-positioning of the second lock counterpart relative to the fixed sash.

In another aspect, there is provided parts for an assembly for a fenestration, comprising: a movable sash; a sill configuration; wherein: the movable sash is configured for mounting to the sill configuration; and the mounting is adjustable such that the movable sash is vertically positionable relative to the sill configuration between an upper position and a lower position; a lock assembly mountable to the movable sash, including a locking pin movable between at least an extended position and a retracted position; wherein: while the lock assembly is mounted to the movable sash: while the movable sash is mounted to the sill configuration such that the movable sash is disposed in the upper position relative to the sill configuration, the lock assembly, the movable sash, and the sill configuration are disposed in an upper position configuration; and while the movable sash is mounted to the sill configuration such that the movable sash is disposed in the lower position relative to the sill configuration, the lock assembly, the movable sash, and the sill configuration are disposed in a lower position configuration; and a fixed sash assembly configured for mounting to the sill configuration such that a mounted fixed sash configuration is established, wherein the fixed sash assembly includes: a fixed sash; and a keeper, the keeper being defined by an elongated aperture; wherein: the movable sash, the lock assembly, the fixed sash assembly, and the sill configuration are co-operatively configured such that, while the mounted fixed sash configuration is established: while the upper position configuration is established, the keeper is disposed relative to the lock assembly for receiving insertion of the locking pin, as the locking pin is being moved from the retracted position to the extended position, such that the movable sash becomes locked to the fixed sash assembly in a first locked configuration while the locking pin is inserted within the keeper; while the lower position configuration is established, the keeper is also disposed relative to the lock assembly for receiving insertion of the locking pin, as the locking pin is being moved from the retracted position to the extended position, such that the movable sash becomes locked to the fixed sash assembly in a second locked configuration while the locking pin is inserted within the keeper; and in each one of the upper position configuration and the lower position configuration, independently, while there is an absence of insertion of the locking pin within the keeper, the mounting of the movable sash to the sill configuration is with effect that the movable sash is movable relative to the sill configuration.

In another aspect, there is provided parts for an assembly for a fenestration, comprising: a movable sash assembly including: a sash including an access port; and a sash wheel assembly, mounted to the sash, including sash wheels and a positioning mechanism; a sill configuration including a track; wherein: the movable sash is configured for mounting to the sill configuration such that the sash wheels are mounted to the track of the sill configuration for movement along the track, such that the movement of the sash wheels along the track is transmitted to the movable sash, such that movability of the movable sash relative to the sill configuration is established by the mounting of the sash wheels to the track; and the mounting of the sash wheels, to the movable sash, is adjustable such that the sash wheels are vertically positionable relative to the movable sash, with effect that the movable sash is vertically positionable relative to the sill configuration between an upper position and a lower position; a mounting bracket, including an opening, the mounting bracket mountable to the movable sash, wherein the mounting of the mounting bracket to the movable sash is such that the access port is accessible by a tool through the opening; a first lock counterpart mountable to the mounting bracket, wherein the mounting of the first lock counterpart to the mounting bracket is such that the first lock counterpart is disposed in a snap fit relationship with the mounting bracket; wherein, while the mounting bracket is mounted to the movable sash: while there is an absence of mounting of the first lock counterpart to the mounting bracket, the positioning mechanism of the sash wheel assembly is accessible by the tool, through the opening of the mounting bracket and through the access port, for effecting the adjustment to the sash wheel assembly; while the first lock counterpart is mounted to the mounting bracket: the access port is occluded such that the accessibility of the sash wheel assembly, by the tool, through the access port, is absent; while the movable sash is mounted to the sill configuration such that the movable sash is disposed in the upper position relative to the sill configuration, the first lock counterpart, the movable sash, and the sill configuration are disposed in an upper position configuration; and while the movable sash is mounted to the sill configuration such that the movable sash is disposed in the lower position relative to the sill configuration, the first lock counterpart, the movable sash, and the sill configuration are disposed in a lower position configuration; and a fixed sash assembly configured for mounting to the sill configuration such that a mounted fixed sash configuration is established, wherein the fixed sash assembly includes: a fixed sash; and a second lock counterpart; wherein: the movable sash assembly, the first lock counterpart, the fixed sash assembly, and the sill configuration are co-operatively configured such that, while the mounted fixed sash configuration is established: while the upper position configuration is established, the second lock counterpart is disposed relative to the first lock counterpart for interacting with the first lock counterpart in response to a locking-effective actuation of the first lock counterpart, wherein the interacting is with effect that the movable sash assembly becomes locked to the fixed sash assembly in a first locked configuration; while the lower position configuration is established, the second lock counterpart is disposed relative to the first lock counterpart for interacting with the first lock counterpart in response to a locking-effective actuation of the first lock counterpart, wherein the interacting is with effect that the movable sash assembly becomes locked to the fixed sash assembly in a second locked configuration; and in each one of the upper position configuration and the lower position configuration, independently, while there is an absence of the interaction between the first and second lock counterparts, the mounting of the movable sash to the sill configuration is with effect that the movable sash assembly is movable relative to the sill configuration.

In another aspect, there is provided an assembly for a fenestration, comprising: a movable sash assembly including: a sash including an access port; and a sash wheel assembly, mounted to the sash, including sash wheels and a positioning mechanism; a mounting bracket, including an opening, the mounting bracket mounted to the movable sash, wherein the mounting of the mounting bracket to the movable sash is such that the access port is accessible by a tool through the opening; a sill configuration including a track; wherein: the movable sash is mounted to the sill configuration such that the sash wheels are mounted to the track of the sill configuration for movement along the track, such that the movement of the sash wheels along the track is transmitted to the movable sash, such that movability of the movable sash relative to the sill configuration is established by the mounting of the sash wheels to the track; and the mounting of the sash wheels, to the movable sash, is adjustable such that the sash wheels are vertically positionable relative to the movable sash, with effect that the movable sash is vertically positionable relative to the sill configuration between an upper position and a lower position; a first lock counterpart mountable to the movable sash assembly, wherein the mounting of the first lock counterpart to the movable sash assembly is such that the first lock counterpart is disposed in a snap fit relationship with the movable sash assembly; wherein: while there is an absence of mounting of the first lock counterpart to the movable sash assembly, the positioning mechanism of the sash wheel assembly is accessible by a tool, through the opening of the mounting bracket and through the access port, for effecting the adjustment to the sash wheel assembly; while the first lock counterpart is mounted to the mounting bracket: the access port is occluded such that the accessibility of the sash wheel assembly, by the tool, through the access port, is absent; while the movable sash is mounted to the sill configuration such that the movable sash is disposed in the upper position relative to the sill configuration, the first lock counterpart, the movable sash, and the sill configuration are disposed in an upper position configuration; and while the movable sash is mounted to the sill configuration such that the movable sash is disposed in the lower position relative to the sill configuration, the first lock counterpart, the movable sash, and the sill configuration are disposed in a lower position configuration; and a fixed sash assembly mounted to the sill configuration such that a mounted fixed sash configuration is established, wherein the fixed sash assembly includes: a fixed sash; and a second lock counterpart; wherein: the movable sash assembly, the first lock counterpart, the fixed sash assembly, and the sill configuration are co-operatively configured such that, while the mounted fixed sash configuration is established: while the upper position configuration is established, the second lock counterpart is disposed relative to the first lock counterpart for interacting with the first lock counterpart in response to a locking-effective actuation of the first lock counterpart, wherein the interacting is with effect that the movable sash assembly becomes locked to the fixed sash assembly in a first locked configuration; while the lower position configuration is established, the second lock counterpart is disposed relative to the first lock counterpart for interacting with the first lock counterpart in response to a locking-effective actuation of the first lock counterpart, wherein the interacting is with effect that the movable sash assembly becomes locked to the fixed sash assembly in a second locked configuration; and in each one of the upper position configuration and the lower position configuration, independently, while there is an absence of the interaction between the first and second lock counterparts, the mounting of the movable sash to the sill configuration is with effect that the movable sash assembly is movable relative to the sill configuration.

Other aspects will be apparent from the description and drawings provided herein.

BRIEF DESCRIPTION OF DRAWINGS

In the figures, which illustrate example embodiments.

DETAILED DESCRIPTION

Figure 1:
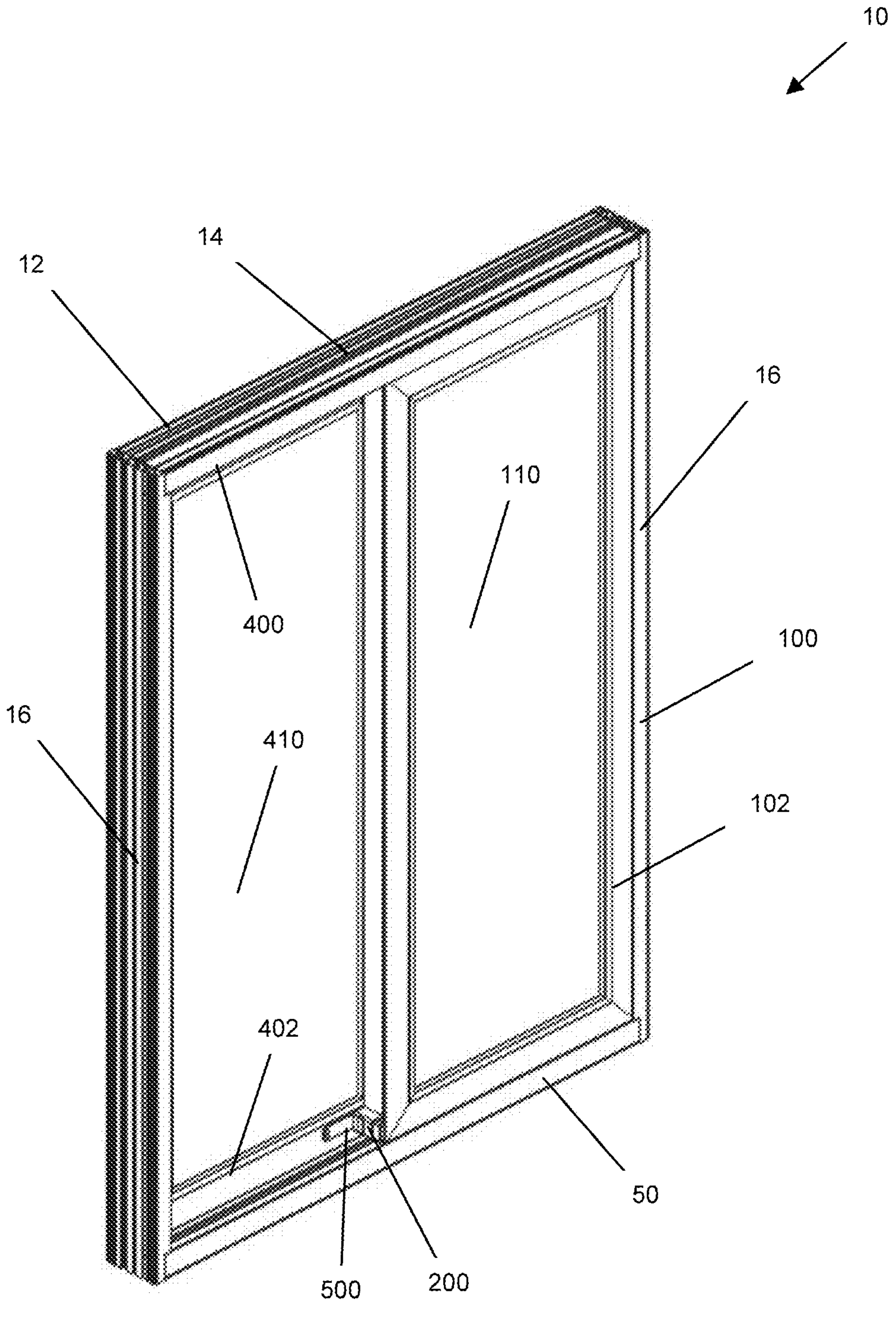
FIG. 1 is perspective view of an example embodiment of an assembly for a fenestration in a closed position.
Figure 2:
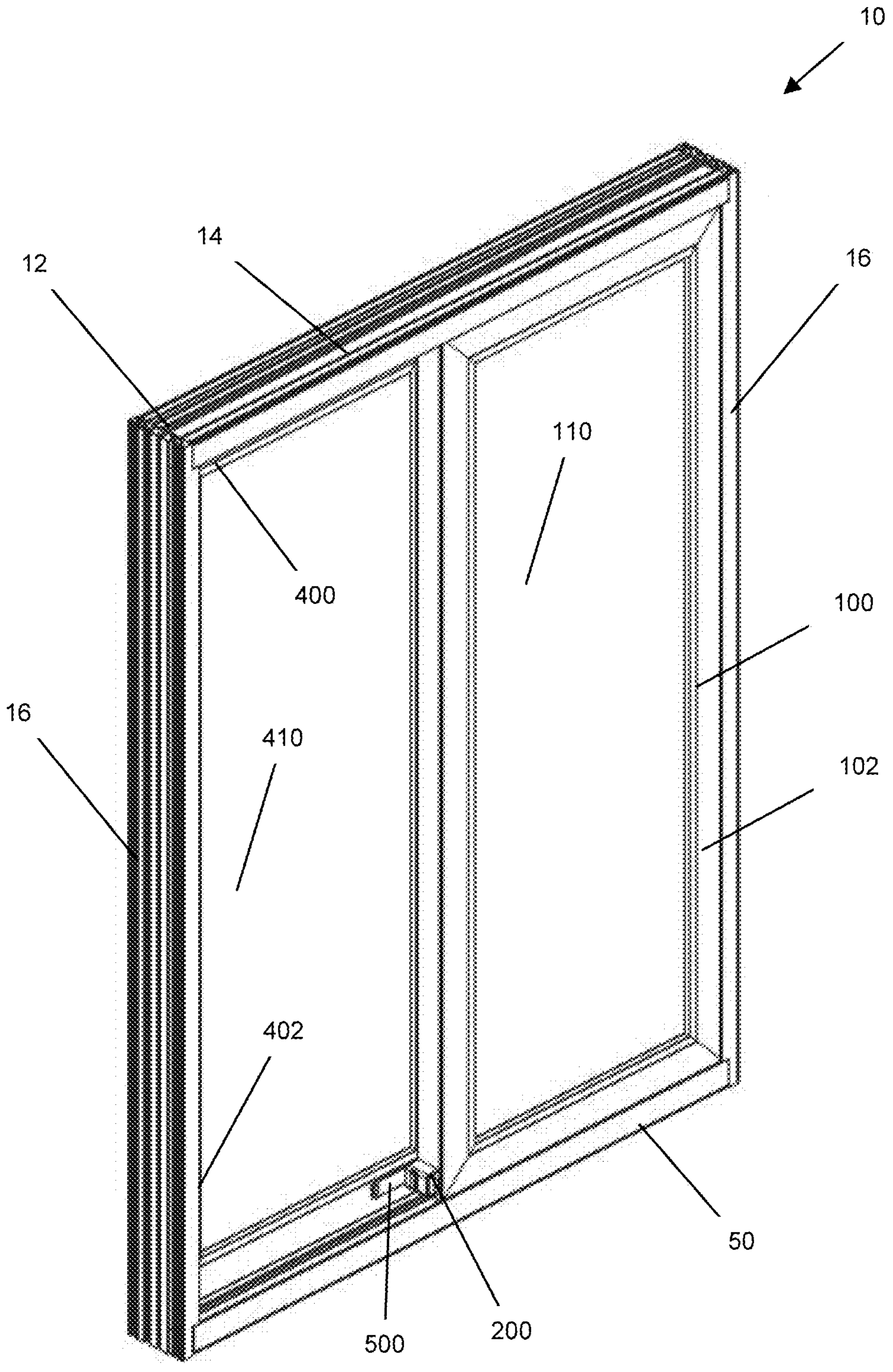
FIG. 2 is a perspective view of the assembly of FIG. 1 locked in the closed position.
Figure 3:
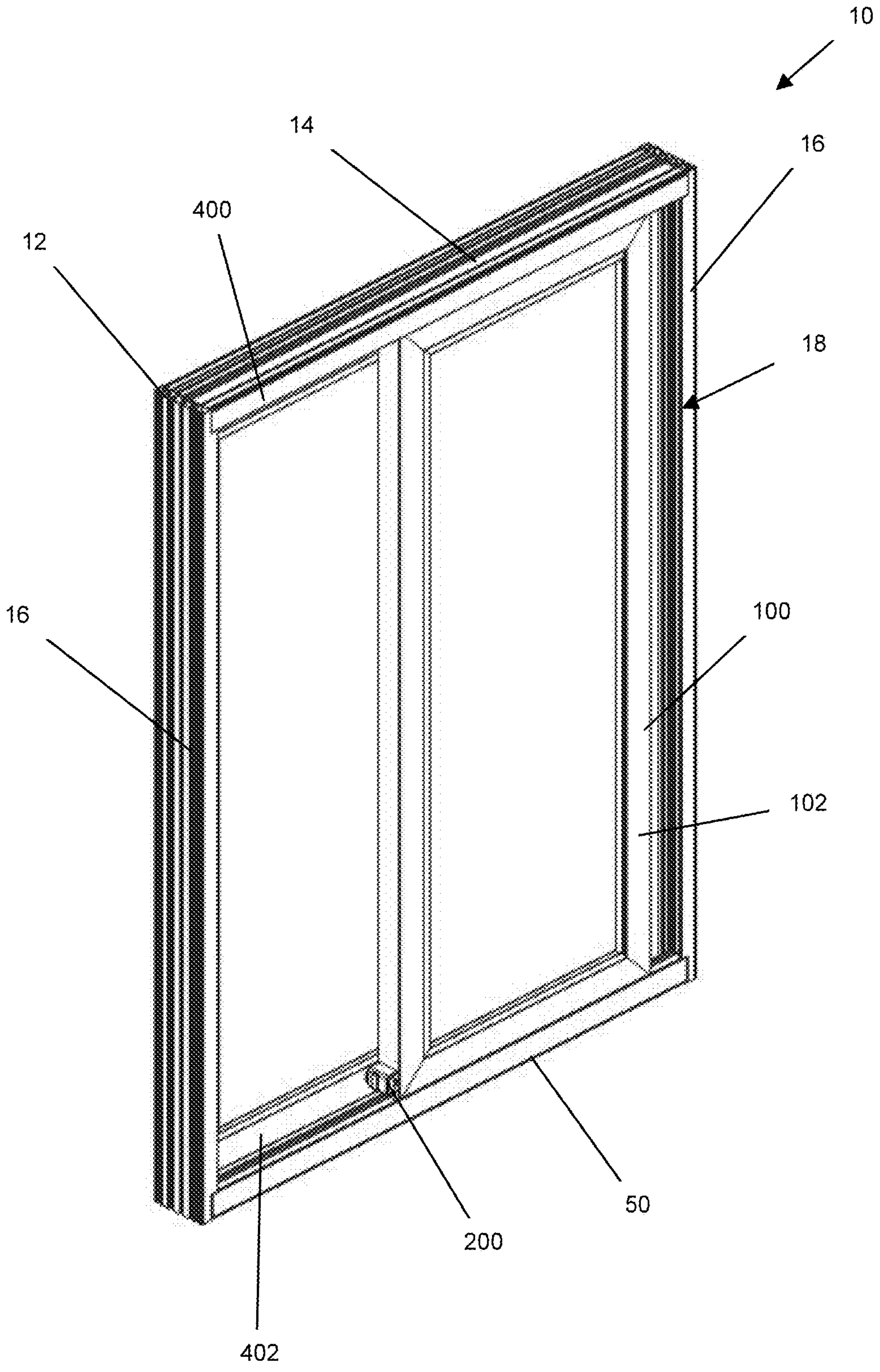
FIG. 3 is a perspective view of the assembly of FIG. 1 locked in a partially open position.
Figure 4:
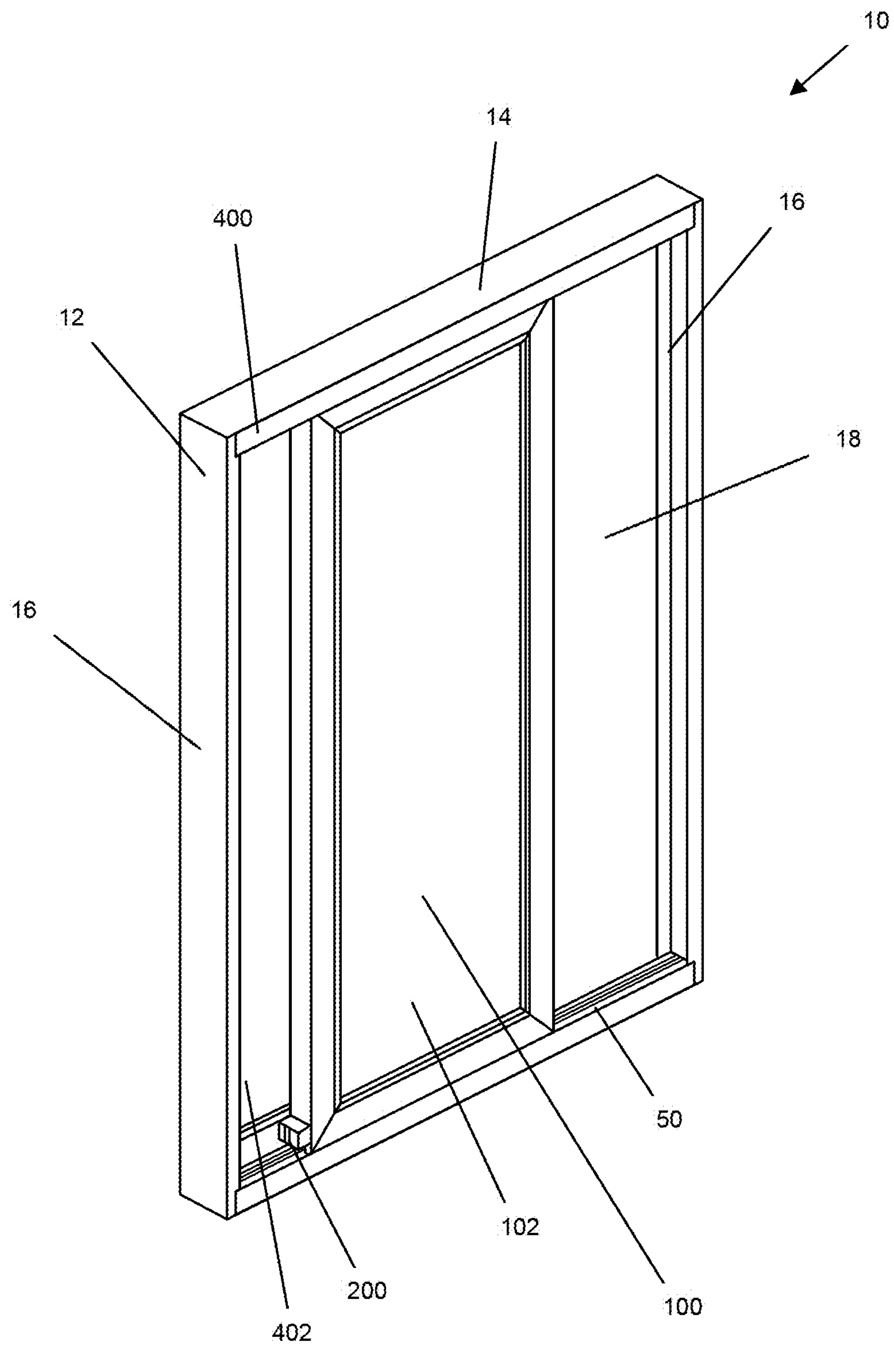
FIG. 4 is a perspective view of the assembly of FIG. 1 in a an open position.

FIG. 1 to FIG. 4 depict an example embodiment of an assembly 10 for a fenestration. The assembly 10 includes a framework 12, a movable sash assembly 100, and a fixed sash assembly 500. The framework 12 of the assembly 10 includes a header 14, a sill configuration 50, and two jambs 16 extending between the header 14 and the sill configuration 50. The movable sash assembly 100 and the fixed sash assembly 400 are received in the framework 12. In some embodiments, for example, the movable sash assembly 100 and the fixed sash assembly 400 are mountable to the sill configuration, such that the movable sash assembly 100 and the fixed sash assembly 400 are supportable by the sill configuration 50. While the movable sash assembly 100 and the fixed sash assembly 400 are mounted to the sill configuration 50, the movable sash assembly 100 is displaceable, for example, slidable, relative to the sill configuration 50 and relative to the fixed sash assembly 400. The assembly 10 is configurable in different configurations, including an open position, a partially open position, and a closed configuration. In the open position, as depicted in FIG. 4, and the partially open position, as depicted in FIG. 3, an opening 18 is defined between the movable sash assembly 100 and the framework 12. The opening 18 defined between the movable sash assembly 100 and the framework 12, while the assembly 10 is configured in the open position, is larger than the opening 18 defined between the movable sash assembly 100 and the framework 12, while the assembly 10 is configured in the partially open position. In some embodiments, for example, while the assembly 10 is configured in the open configuration, the opening 18 is fully open. In the closed configuration, as depicted in FIG. 1 and FIG. 2, the opening 18 between the movable sash assembly 100 and the framework 12 is closed. In some embodiments, for example, wherein the assembly 10 is a patio door assembly, the patio door assembly can be installed within an opening defined within a wall of a building. While the patio door assembly is configured in some of the different configurations, including the open position, the opening 18 is sufficiently large such that a person can walk through the opening 18, for example, to walk from inside the building to outside the building, or to walk from outside the building to inside the building. While the patio door assembly is configured in some of the different configurations, including the open position or the partially open position, fluid communication is established between the inside and the outside of the building via the opening 18. While the patio door assembly is configured in some of the different configurations, including the closed position or the partially open position, a person is prevented from walking through the opening 18. In some embodiments, for example, the assembly 10 is transitionable between the different configurations, including the open configuration, partially open configuration, and the closed configuration, via displacement of the movable sash assembly 100 relative to sill configuration 50. In some embodiments, for example, the assembly 10 is transitionable between the different configurations, including the open configuration, partially open configuration, and the closed configuration, via displacement of the movable sash assembly 100 relative to the fixed sash assembly 400.

As depicted in FIG. 1 to FIG. 4, while the movable sash assembly 100 and the fixed sash assembly 400 are received in the framework 12, the movable sash assembly 100 and the fixed sash assembly 400 are disposed in offset relationship, such that the movable sash assembly 100 is displaceable relative to the fixed sash assembly 400, for example, to transition between the different configurations of the assembly 10.

Figure 6:
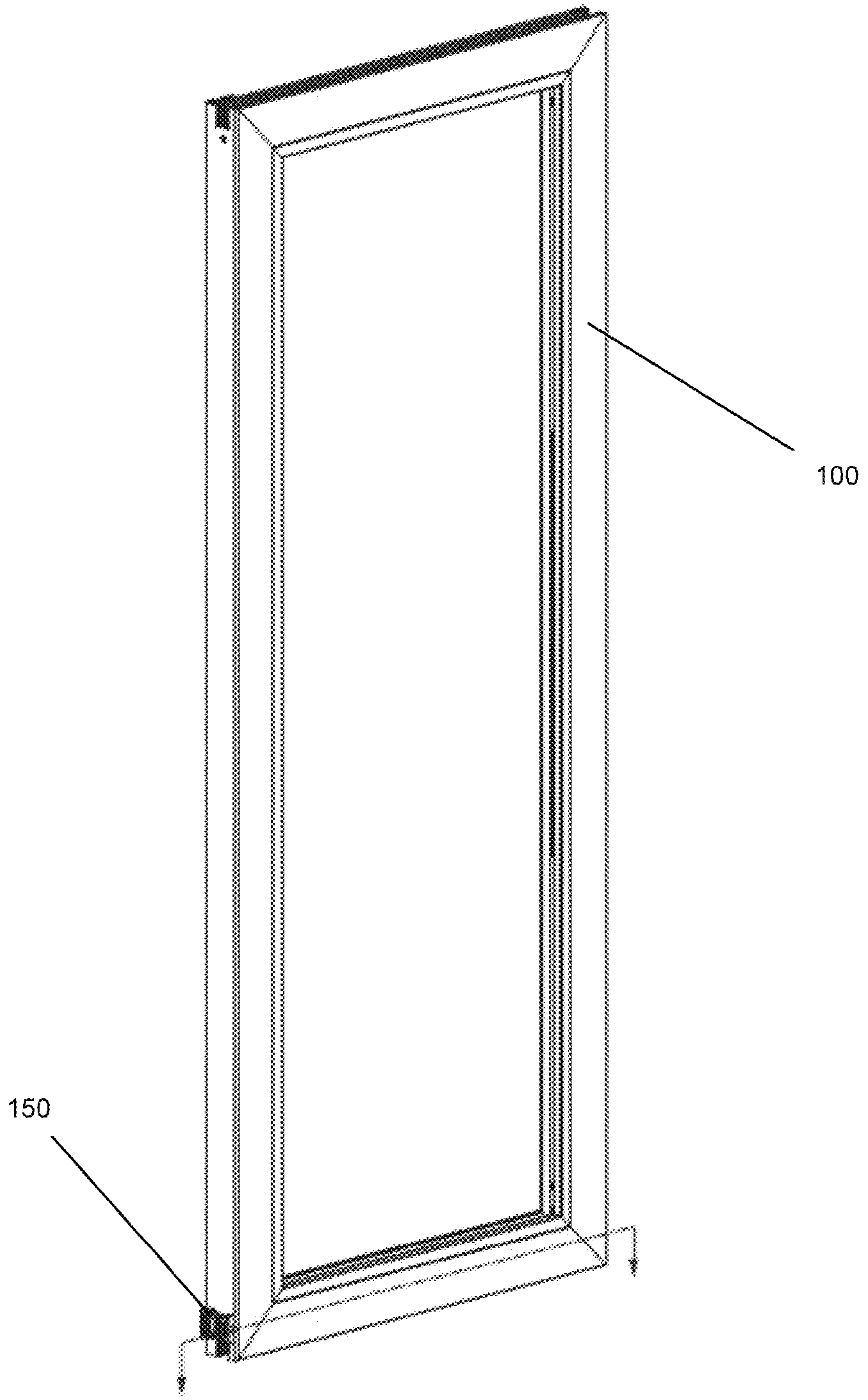
FIG. 6 is a perspective view of a movable sash assembly of FIG. 1.
Figure 7:
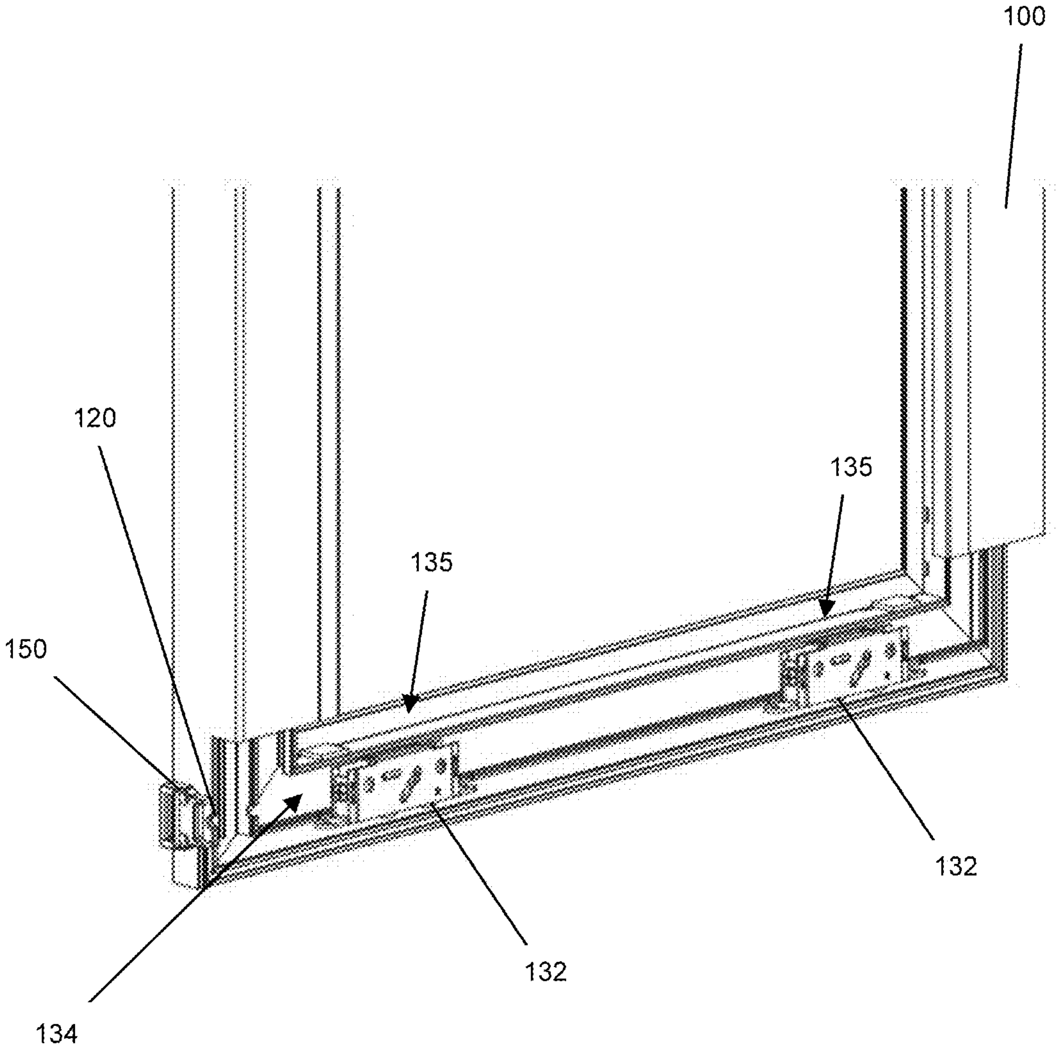
FIG. 7 is a perspective view of the movable sash assembly of FIG. 6, with a cutaway along the cutaway line shown in FIG. 6.
Figure 36:
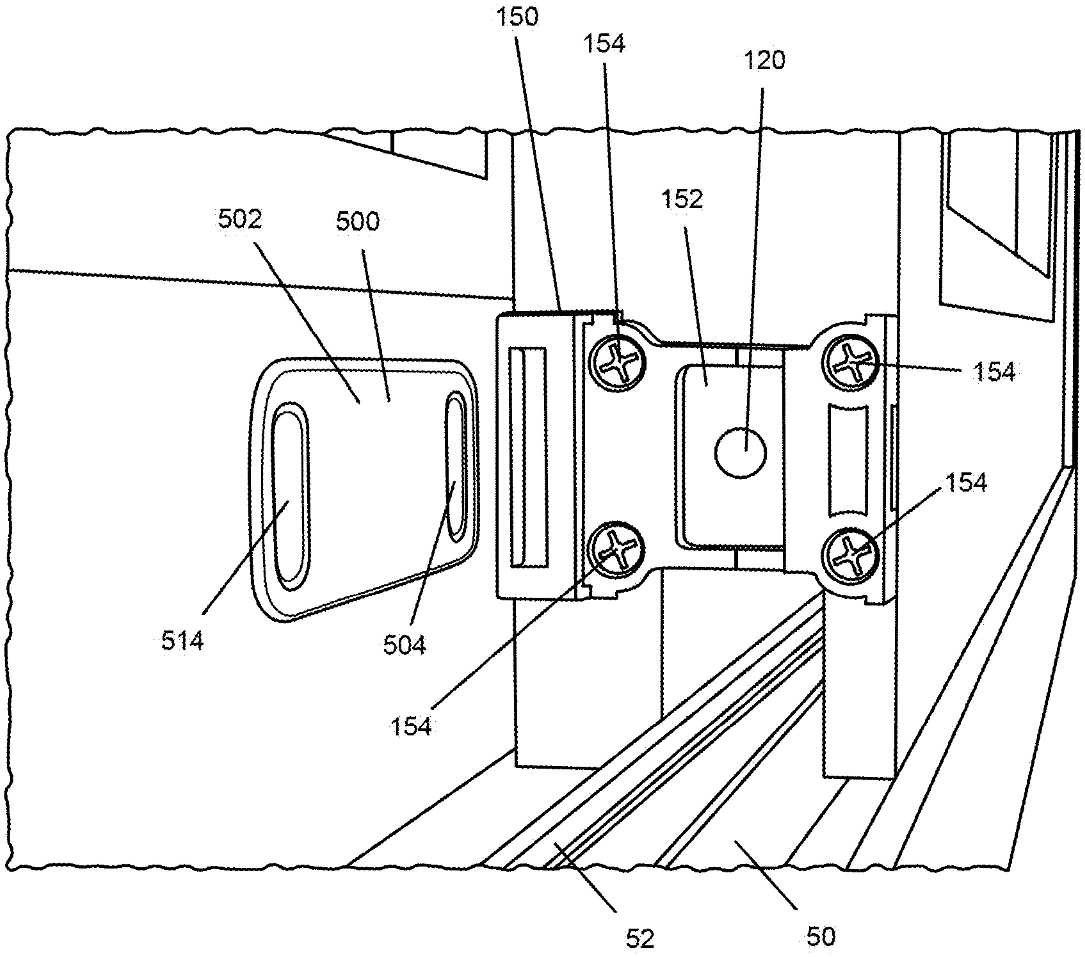
FIG. 36 is a perspective view of the mounting bracket mounted to the movable sash assembly, and the second lock counterpart defined by the fixed sash assembly.

In some embodiments, for example, as depicted in FIG. 6, FIG. 7, and FIG. 36, the movable sash assembly 100 includes a movable sash 102 that includes an access port 120, and a sash wheel assembly 130 that is mounted to the movable sash 102, the sash wheel assembly 130 includes sash wheels 132 and a positioning mechanism 134. In some embodiments, for example, the mounting of the sash wheel assembly 130 to the movable sash 102 is such that, while there is an absence of occlusion of the access port 120, the positioning mechanism 134 of the sash wheel assembly 130 is accessible by a tool, such as a screw driver, through the access port 120. The movable sash 102 includes a first side defining a first surface 104, a second side disposed on an opposite side of the movable sash 102 relative to the first side 104 defining a second surface, and a side surface 108 extending between the first surface 104 and the second surface. While the assembly 10 is installed within the opening within the wall of the building, the first surface 104 is configured to face the inside of the building, and the second surface is configured to face the outside of the building. As depicted in FIG. 6, FIG. 7, and FIG. 36, in some embodiments, for example, the access port 120 is defined on the side surface 108 of the movable sash 102. As depicted in FIG. 1, the movable sash 20 is configured to support one or more glass panels 110, through which line of sight through the movable sash 20 is provided.

Figure 8:
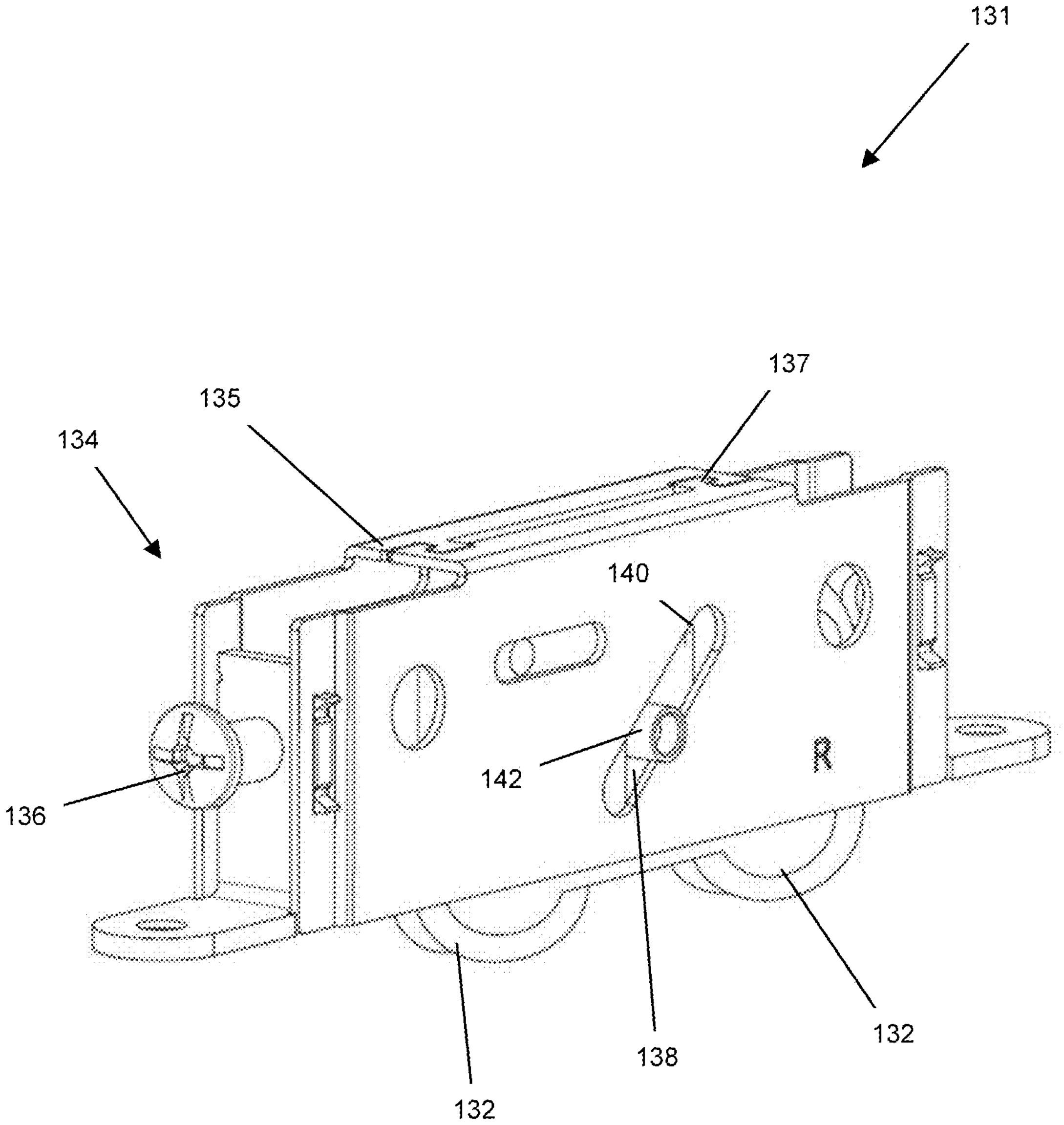
FIG. 8 is a perspective view of an adjustable sash wheel.
Figure 9:
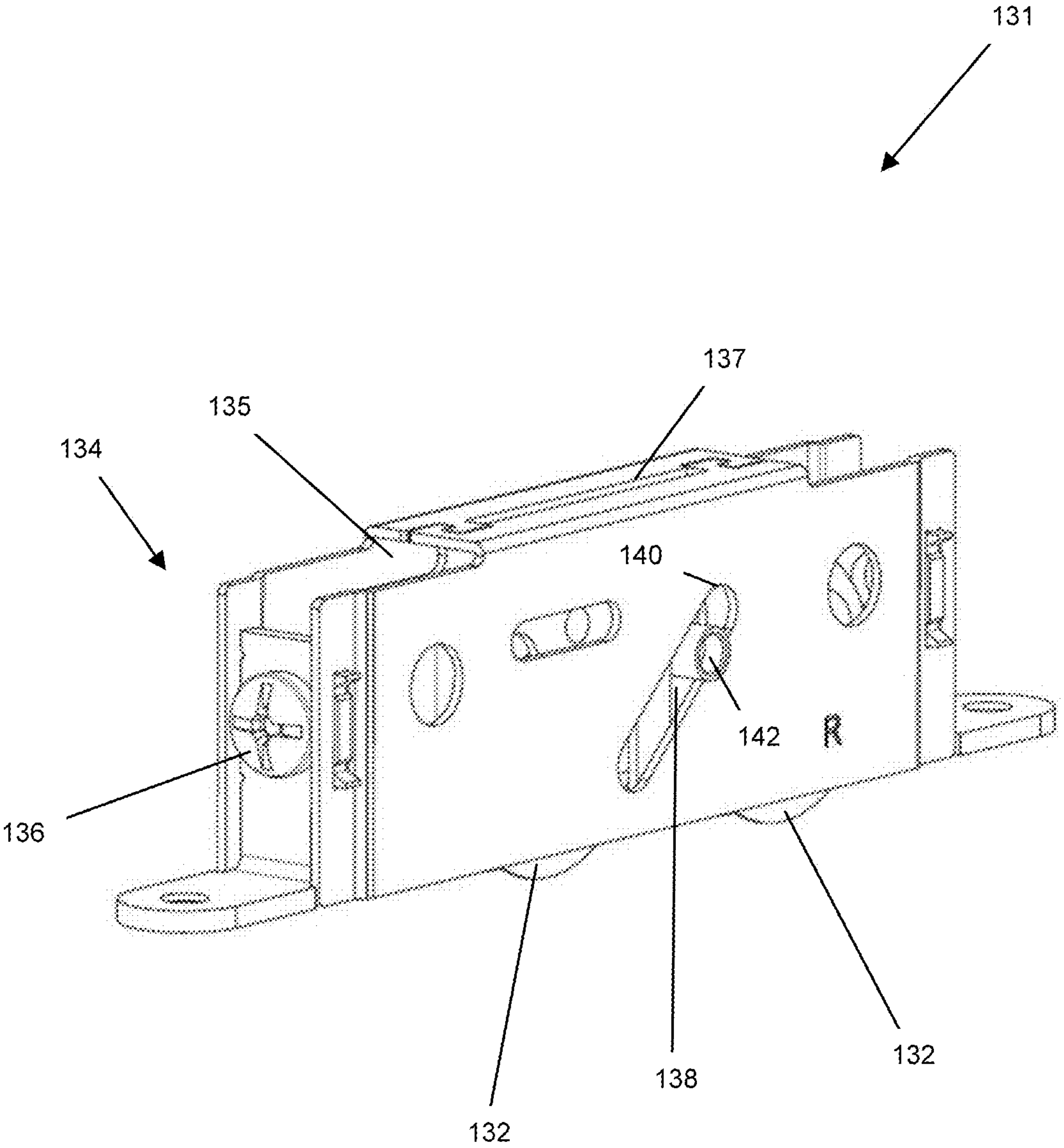
FIG. 9 is another perspective view of the adjustable sash wheel.

In some embodiments, for example, as depicted in FIG. 7 to FIG. 9, the sash wheel assembly 130 includes sash wheels 132 and the positioning system 134. In some embodiments, for example, the positioning system 134 includes one or more height adjusters 135. In some embodiments, for example, the sash wheel assembly 130 includes an adjustable sash wheel 131, wherein the adjustable sash wheel 131 includes one or more of the sash wheels 132 and one of the one or more height adjusters 135 of the positioning system 134.

As depicted in FIG. 8 and FIG. 9, the adjustable sash wheel 131 includes two sash wheels 132 and the height adjuster 135. The height adjuster 135 includes a positioning screw 136, a frame 137, and a wheel housing 138 that is connected to the sash wheels 132. The wheel housing 138 includes one or more connectors 142, for example, a pin or a rivet, that extends from the wheel housing 138. In some embodiments, for example, for each one of the one or more connectors 142 of the wheel housing 138, the frame 137 defines a slot 140 to receive the connector 142. In some embodiments, for example, for each one of the one or more connectors 142, the connector 142 is extendible through a respective slot 140. In some embodiments, for example, as depicted, the wheel housing 138 includes two connectors 142 and the frame 137 defines two slots 140, wherein each one of the two connectors 142 is extending through a respective one of the two slots 140. In some embodiments, for example, the frame 137 and the wheel housing 138 are connected together such that the wheel housing 138 and the frame 137 are displaceable, for example, slidable, relative to one another. In some embodiments, for example, the extending of each one of the connectors 142 through a respective one of the slots 140 effects the connection of the wheel housing 138 and the frame 137. The height adjuster 135, for example, the frame 137, is connectible to the movable sash 102, for example, by snap fit, friction fit, or interference fit, or with a mechanical fastener, such as a screw, nuts and bolts, pins, nails, and the like. In response to rotation of the positioning screw 136, the frame 137 and the wheel housing 138 are displaced relative to each other, with effect that the sash wheels 132 are displaced relative to the frame 137. The displacement of the sash wheels 132 relative to the frame 137 is with effect that the height of the adjustable sash wheel 131 is adjusted. In some embodiments, for example, in response to rotation of the positioning screw 136 in a first direction, for example, a clockwise direction, the frame 137 and the wheel housing 138 are displaced away from each other to each other, with effect that the sash wheels 132 are displaced away from to the frame 137, such that the height of the adjustable sash wheel 131 is increased, as depicted in FIG. 8. In some embodiments, for example, in response to rotation of the positioning screw 136 in a second direction that is opposite the first direction, for example, a counter clockwise direction, the frame 137 and the wheel housing 138 are displaced towards each other, with effect that the sash wheels 132 are displaced towards from to the frame 137, such that the height of the adjustable sash wheel 131 is decreased, as depicted in FIG. 9.

In some embodiments, for example, the mounting of the adjustable sash wheel 131 to the movable sash 102 is such that, while there is an absence of occlusion of the access port 120, the height adjuster 135 of the adjustable sash wheel 131, for example, the positioning screw 136, is accessible by a tool, such as a screw driver, through the access port 120.

In some embodiments, for example, the sash wheel assembly 130 includes a plurality of adjustable sash wheels 131, wherein each of the plurality of adjustable sash wheels 131, independently, includes one or more of the sash wheels 132 and a respective one of the one or more height adjusters 135 of the positioning system 134. In such embodiments, for example, the movable sash 102 defines a respective access port 120 for each one of the plurality of adjustable sash wheels 131. In such embodiments, for example, for each one of the plurality of adjustable sash wheels 131, independently, the mounting of the adjustable sash wheel 131 to the movable sash 102 is such that, while there is an absence of occlusion of the respective access port 120, the height adjuster 135 of the adjustable sash wheel 135 is accessible by a tool, such as a screw driver, through the respective access port 120.

Figure 5:
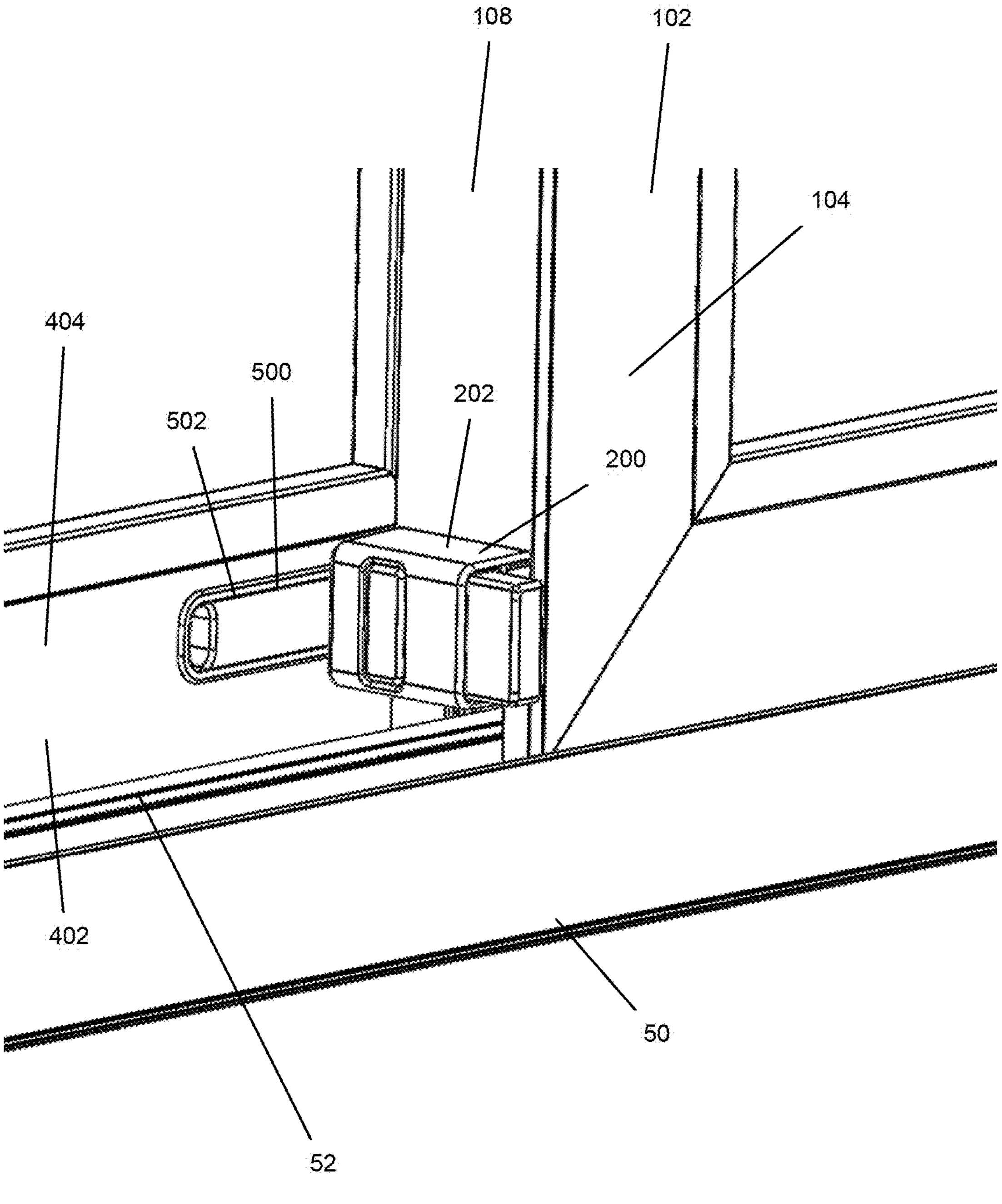
FIG. 5 is a perspective view of a first lock counterpart and second lock counterpart of the assembly of FIG. 1, the first lock counterpart mounted at a bottom end of a movable sash assembly, and the second lock counterpart mounted at a bottom end of a fixed sash assembly.
Figure 37:
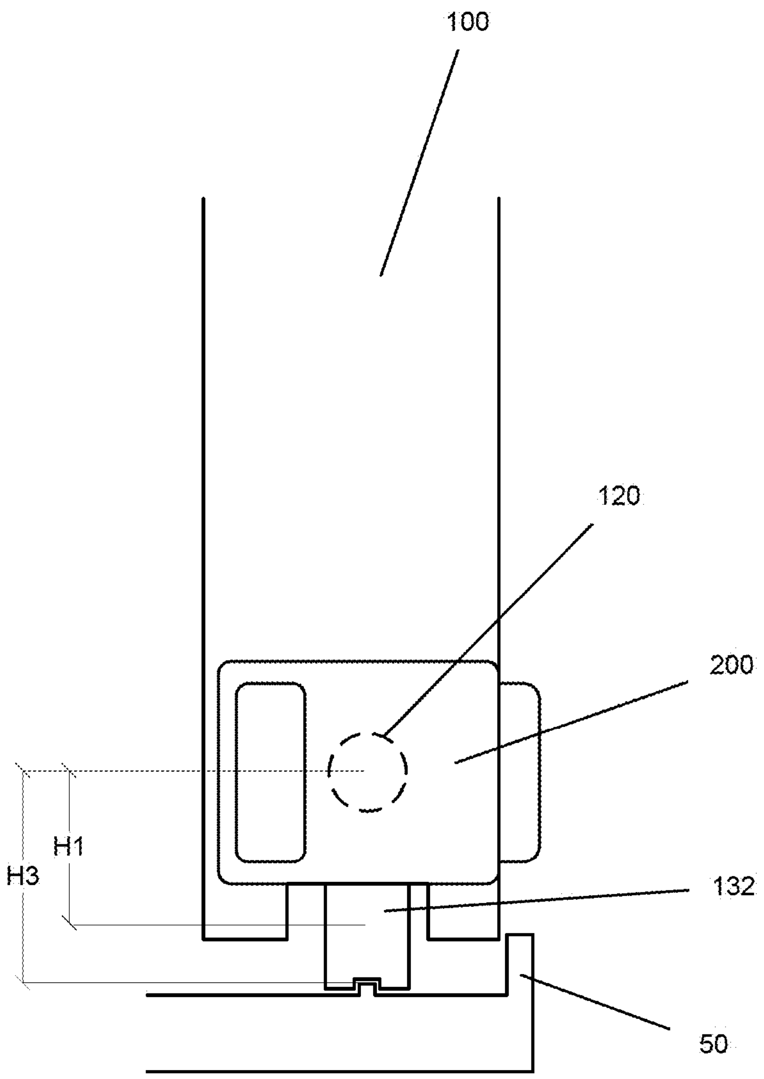
FIG. 37 is an elevation view of the first lock counterpart, the movable sash, and the sill configuration disposed in an upper position configuration.
Figure 39:
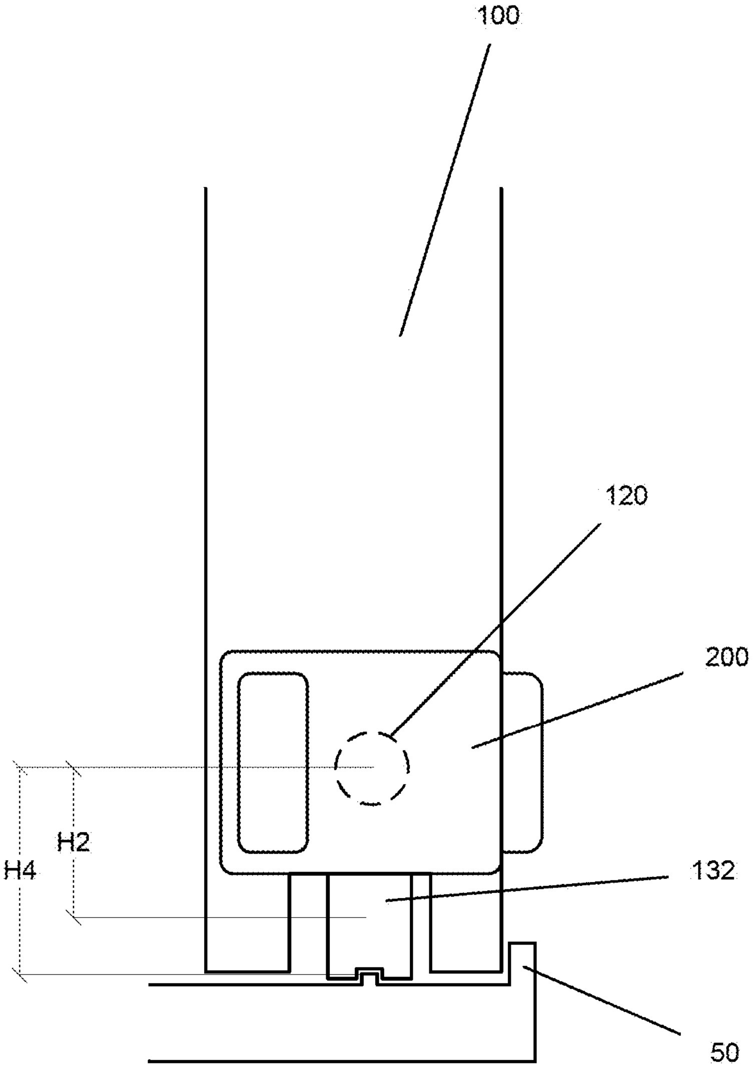
FIG. 39 is an elevation view of the first lock counterpart, the movable sash, and the sill configuration disposed in a lower position configuration.

As depicted in FIG. 5, the sill configuration 50 includes a track 52. In some embodiments, for example, the movable sash 102 is configured for mounting to the sill configuration 50 such that the sash wheels 132 are mounted to the track 52 of the sill configuration 50 for movement along the track 52, such that the movement of the sash wheels 132 along the track 52 is transmitted to the movable sash 102, such that movability of the movable sash 102 relative to the sill configuration 50 is established by the mounting of the sash wheels 132 to the track 52. In some embodiments, for example, the mounting of the movable sash assembly 100 to the sill configuration 50 is effected by the mounting of the sash wheels 132 to the track 52. In some embodiments, for example, the mounting of the sash wheels 132, to the movable sash 102, is adjustable such that the sash wheels 132 are vertically positionable relative to the movable sash 102, with effect that the movable sash 102 is vertically positionable relative to the sill configuration 50 between an upper position, as depicted in FIG. 37 and a lower position, as depicted in FIG. 39. In some embodiments, for example, the vertical distance H1 between the center of the access port 120 and the center of the sash wheel 132, while the movable sash 102 is positioned relative to the sill configuration 50 in the upper position, is greater than the vertical distance H2 between the center of the access port 120 and the center of the sash wheel 132, while the movable sash 102 is positioned relative to the sill configuration 50 in the lower position. In some embodiments, for example, the adjusting of the mounting of the sash wheels 132 is effectible by adjusting the height of the adjustable sash wheel 135.

Figure 41:
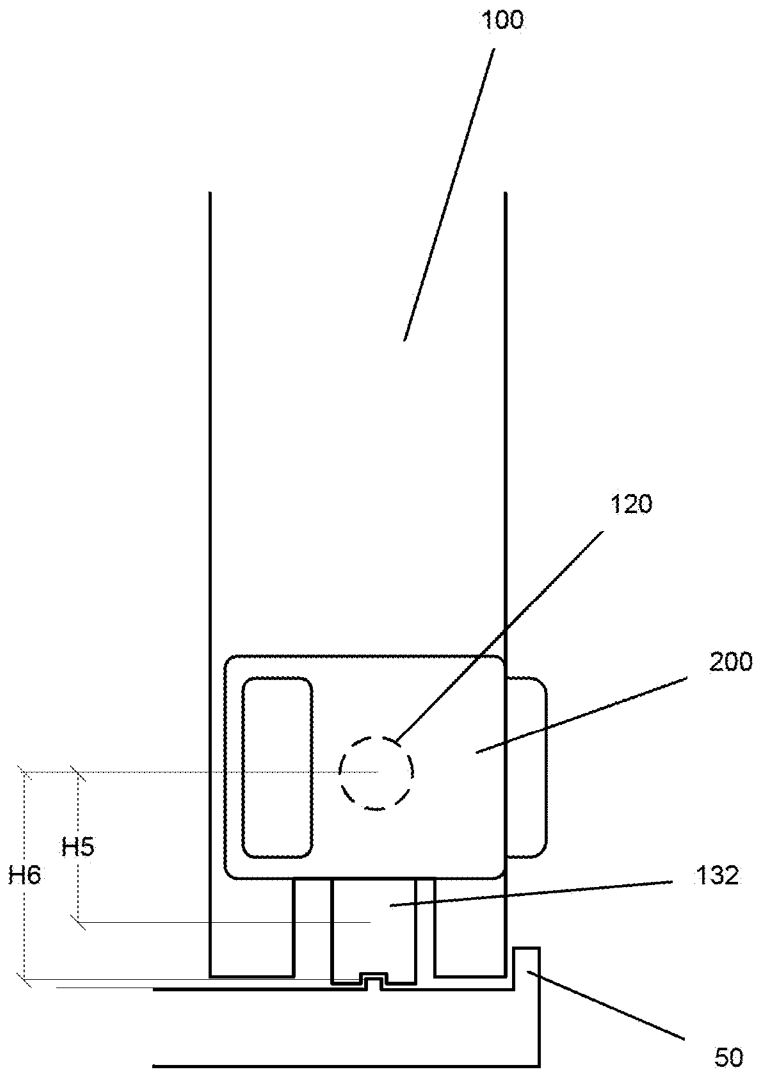
FIG. 41 is an elevation view of the first lock counterpart, the movable sash, and the sill configuration disposed in an intermediate position configuration.

In some embodiments, for example, the mounting of the sash wheels 132, to the movable sash 102, is adjustable such that the sash wheels 132 are vertically positionable relative to the movable sash 102, with effect that the movable sash 102 is vertically positionable relative to the sill configuration 50 to an intermediate position, as depicted in FIG. 41. In some embodiments, for example, the vertical distance H5 between the center of the access port 120 and the center of the sash wheel 132, while the movable sash 102 is positioned relative to the sill configuration 50 in the intermediate position, is greater than the vertical distance H2 between the center of the access port 120 and the center of the sash wheel 132, while the movable sash 102 is positioned relative to the sill configuration 50 in the lower position, and lesser than the vertical distance H1 between the center of the access port 120 and the center of the sash wheel 132, while the movable sash 102 is positioned relative to the sill configuration 50 in the upper position.

In some embodiments, for example, the movable sash assembly 100 and the sill configuration 50 are co-operatively configured such that the minimum vertical displacement of the movable sash 102, in transitioning between the upper position and the lower position, is at least ⅛ inches.

In some embodiments, for example, as depicted in FIG. 10 to FIG. 22 and FIG. 32 to FIG. 35, the assembly 10 includes a first lock counterpart 200. In some embodiments, for example, the first lock counterpart 200 includes a lock assembly 202. In some embodiments, for example, the lock assembly 202 is configured to co-operate with a keeper 502 of a second lock counterpart 500 to lock the movable sash assembly 100 to the fixed sash assembly 400. The lock assembly 202 defines a first side 2021 and a second side 2022 disposed on an opposite side of the lock assembly 202 relative to the first side 2021. In some embodiments, for example, the lock assembly 202 includes a body 204 defining a first wall 205 and a second wall 207, each of the first wall 205 and the second wall 207, independently, defining an opening, a locking pin configuration 201 including a retaining ring 210, a locking pin 206 extending from a first side of the retaining ring 210, and a connecting member 203 extending from a second side of the retaining ring 210 that is disposed opposite the first side of the retaining ring 210, In some embodiments, for example, the diameter of the retaining ring 210 is greater than the diameter of the connecting member 203. In some embodiments, for example, the dimeter of the retaining ring 210 substantially corresponds to the dimeter of the locking pin 206 a plug 212, a locking actuator 220, a release actuator 230 defining a channel 232 extending through the release actuator 230, a first spring 242, and a second spring 244. In some embodiments, for example, the locking pin configuration 201 has a generally cylindrical shape. At least a portion of the locking pin configuration 201 is disposed in the body 24, such that the portion of the locking pin configuration 201 that is disposed in the body 204 is extending through: (i) the opening of the first wall 205, (ii) the opening of the second wall 207, and the channel 232 of the release actuator 230. In some embodiments, for example, the connecting member 203 extends through the opening of the first wall 205. In some embodiments, for example, the diameter of the opening of the first wall 205 substantially corresponds to the diameter of the connecting member 203. In some embodiments, for example, the locking pin 206 extends through the opening of the second wall 207. In some embodiments, for example, the diameter of the opening of the second wall 207 substantially corresponds to the diameter of the retaining ring 210. As depicted, in some embodiments, for example, the opening of the first wall 205 and the opening of the second wall 207 are disposed in alignment. As depicted, the connecting member 203 of the locking pin configuration 201 is connected the lock actuator 220, for example, via snap fit, friction fit, or interference fit, or via a mechanical fastener. As depicted, the plug 212 is connected to the body 204, for example, to an opening defined on the second side 2022 of the lock assembly 202. In some embodiments, for example the plug 212 is connected to the body 204 via snap fit, friction fit, or interference fit, or via a mechanical fastener. The locking pin 206 of the locking pin configuration 201 is disposed in an opening defined by the plug 212 and extendible through the opening of the plug 212. The plug 212 is configured to abut against the retaining ring 210 to displacement of the lock actuator 220 and the locking pin configuration 201, relative to the body 204, in a direction towards the second side 2022 of the lock assembly 202. The lock actuator 220 is disposed on the first side 2021 of the lock assembly 2021, and at least a portion of the lock actuator 220 is disposed in the body 204. As depicted, the first spring 242 is disposed around a portion of the locking pin configuration 201, and disposed in compression between the lock actuator 220 and the first wall 205. The release actuator 230 is disposed between the first wall 205 and the second wall 207, and at least a portion of the release actuator 230 is disposed in the body 204. As depicted, the second spring 244 is disposed below the release actuator 230, and disposed in compression between the release actuator 230 and the body 204. In some embodiments, for example, the locking assembly 202 is a spring-loaded locking assembly.

Figure 11:
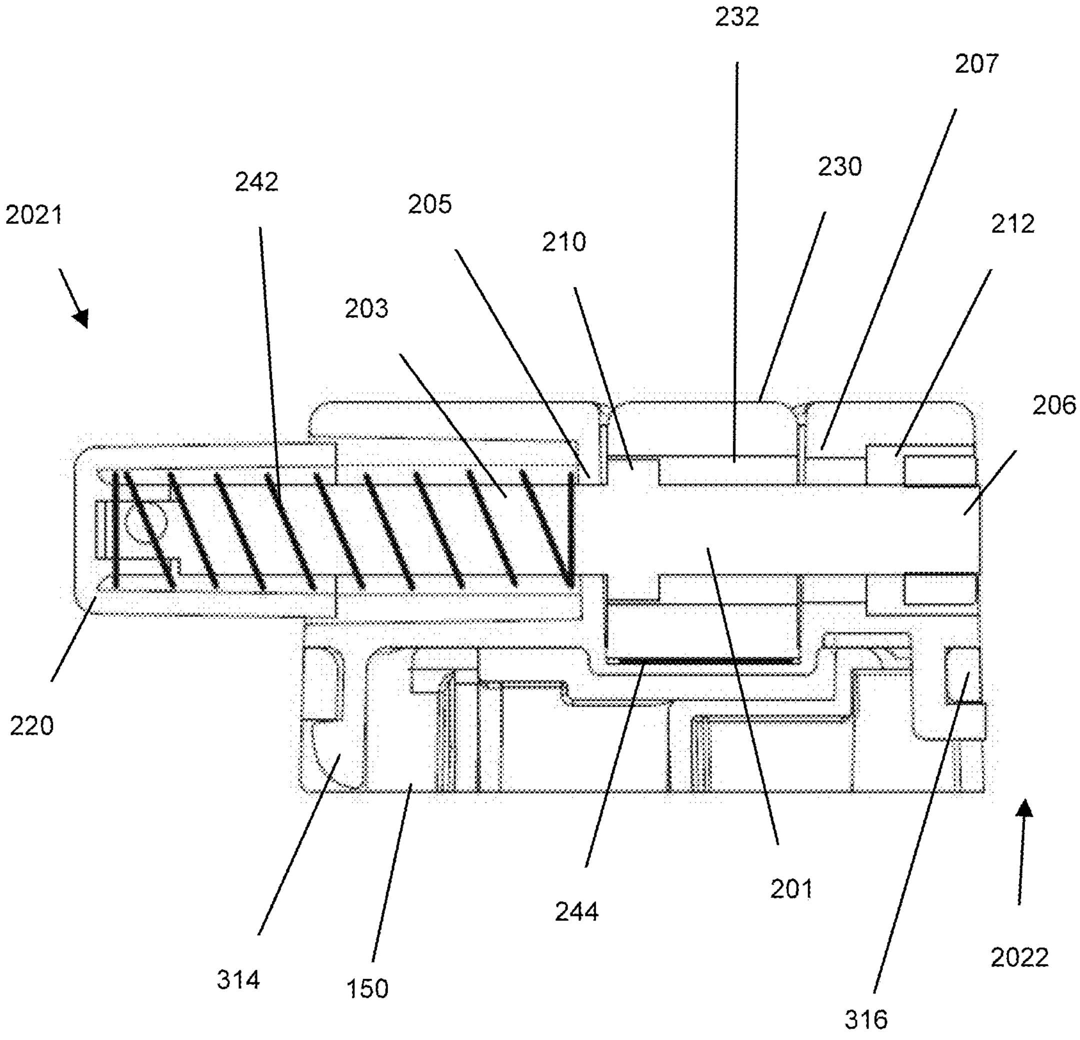
FIG. 11 is a cross-sectional view of the first lock counterpart and the mounting bracket of the assembly of FIG. 1, the first lock counterpart in an unlocked configuration.
Figure 12:
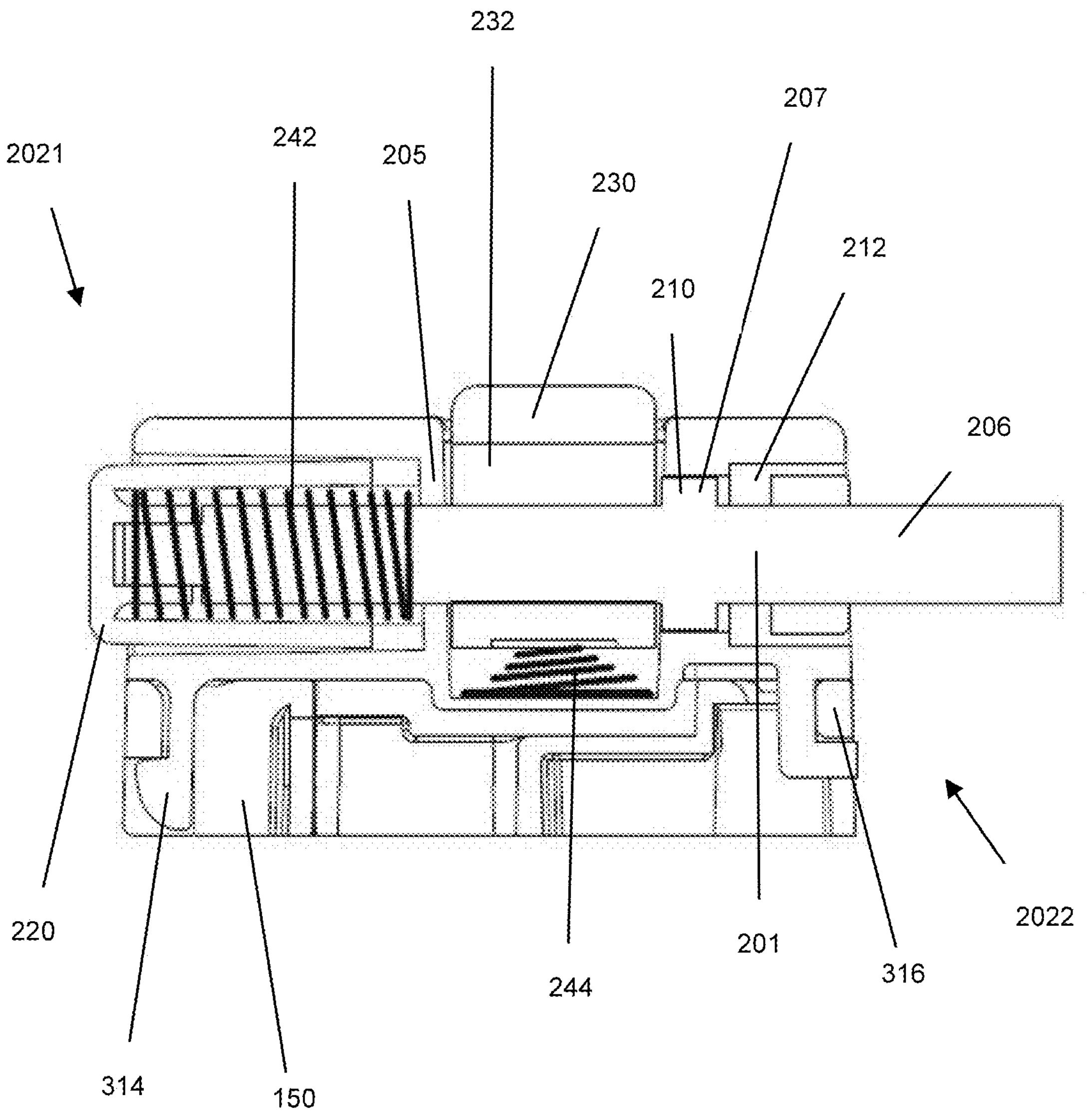
FIG. 12 is an exploded view of the first lock counterpart and the mounting bracket of the assembly of FIG. 1, the first lock counterpart in a locked configuration.
Figure 13:
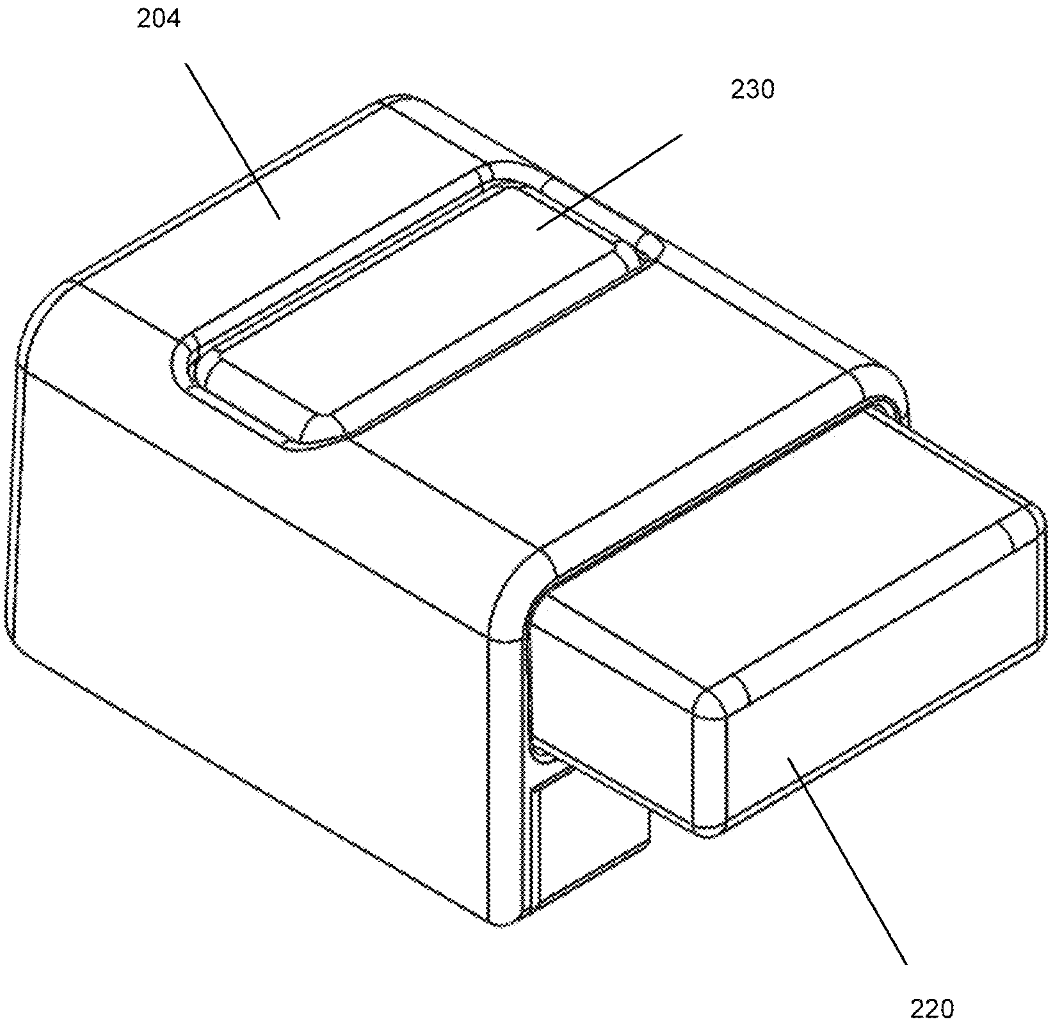
FIG. 13 is a front perspective view of the first lock counterpart mounted to the mounting bracket of the assembly of FIG. 1, the first lock counterpart in the unlocked configuration.
Figure 14:
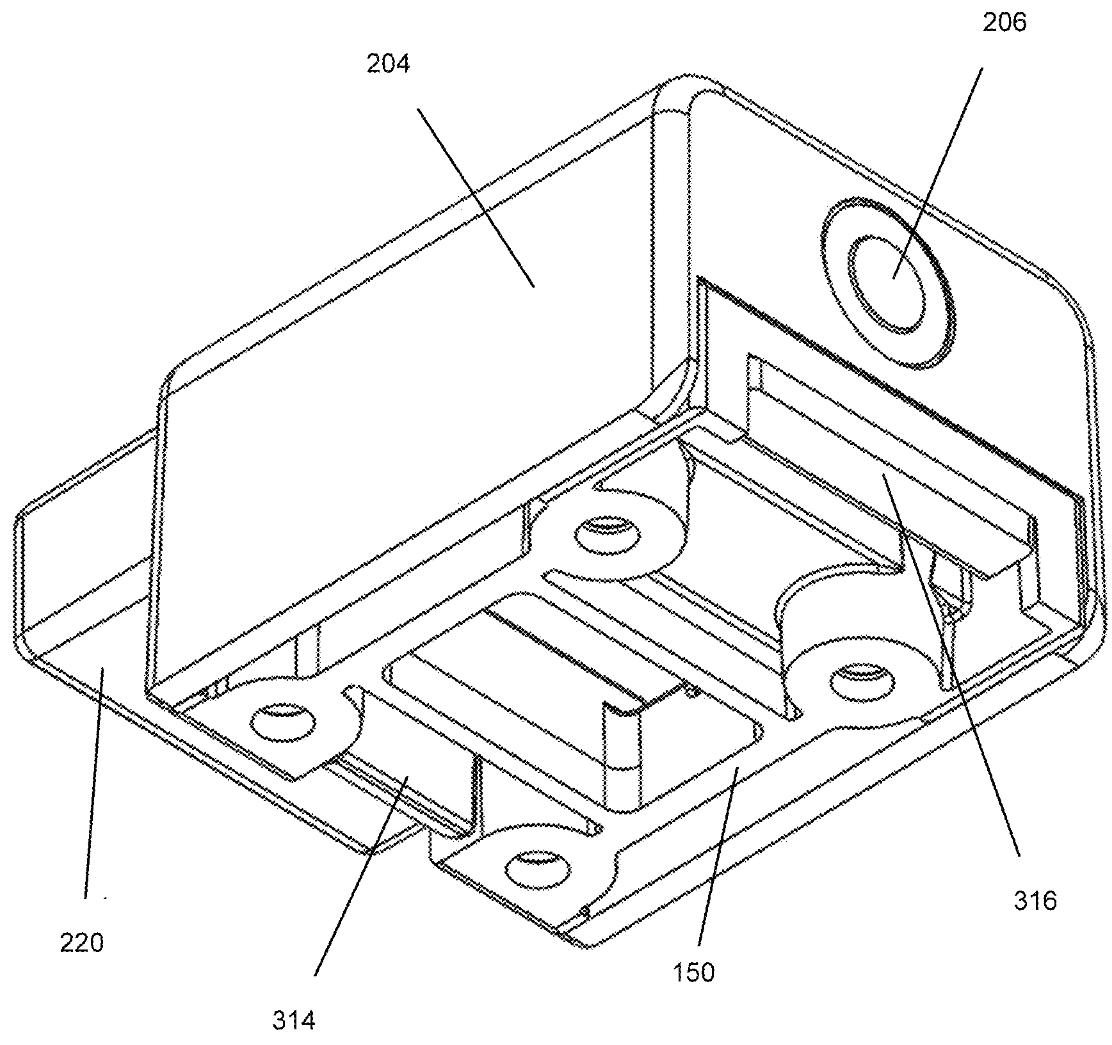
FIG. 14 is a rear perspective view of the first lock counterpart mounted to the mounting bracket of FIG. 13.
Figure 15:
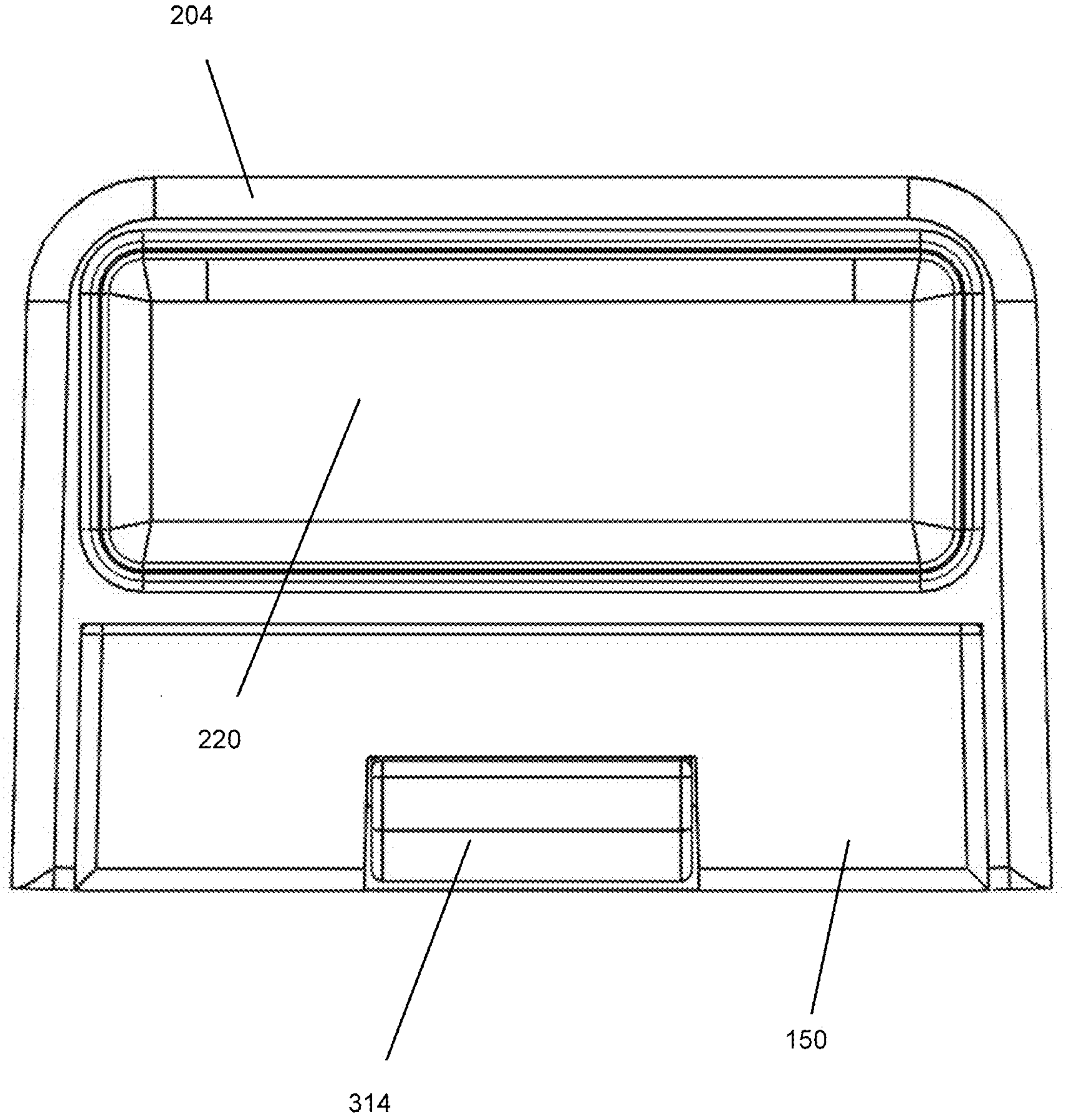
FIG. 15 is front elevation view of the first lock counterpart mounted to the mounting bracket of FIG. 13.
Figure 16:
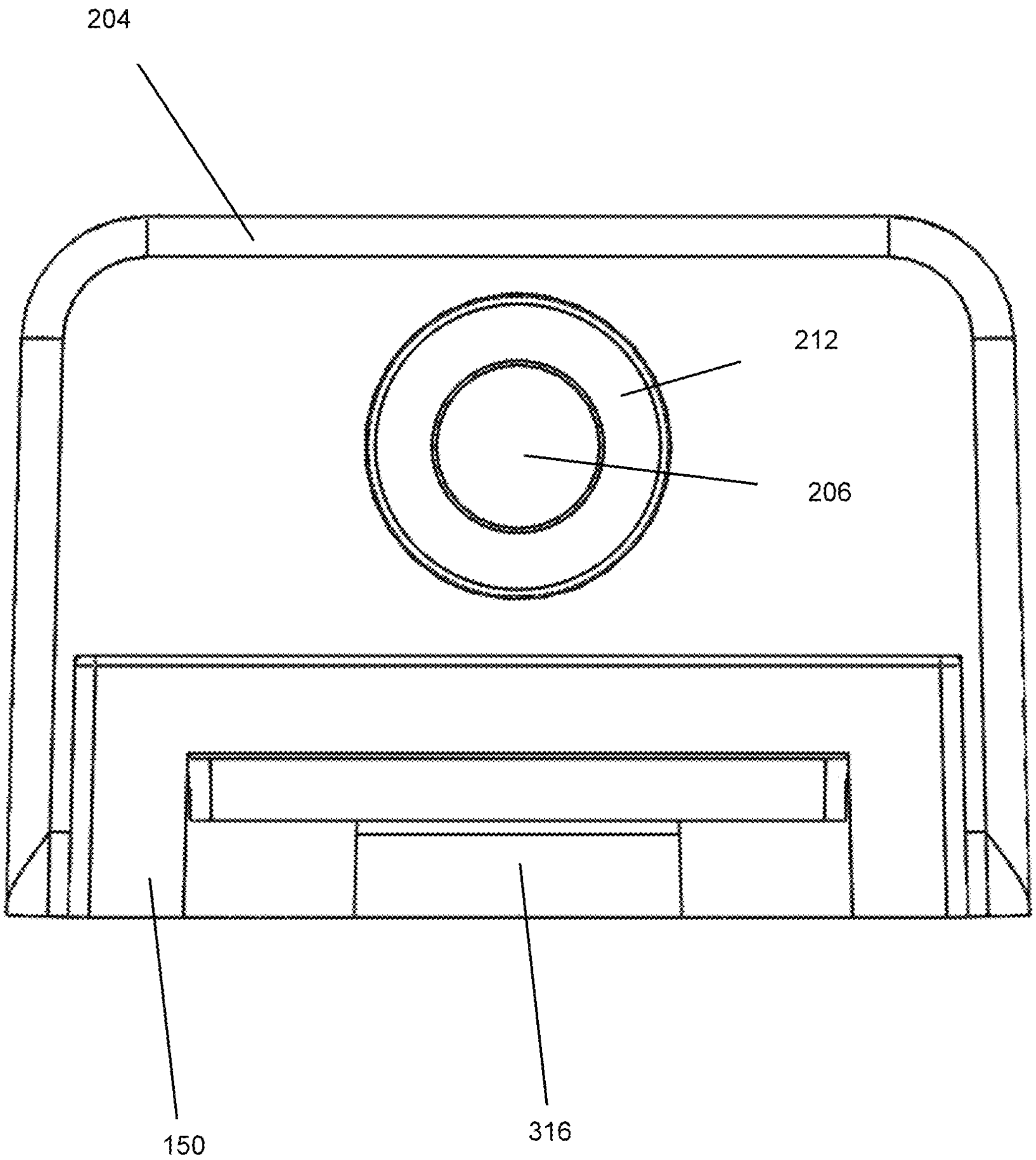
FIG. 16 is rear elevation view of the first lock counterpart mounted to the mounting bracket of FIG. 13.
Figure 17:
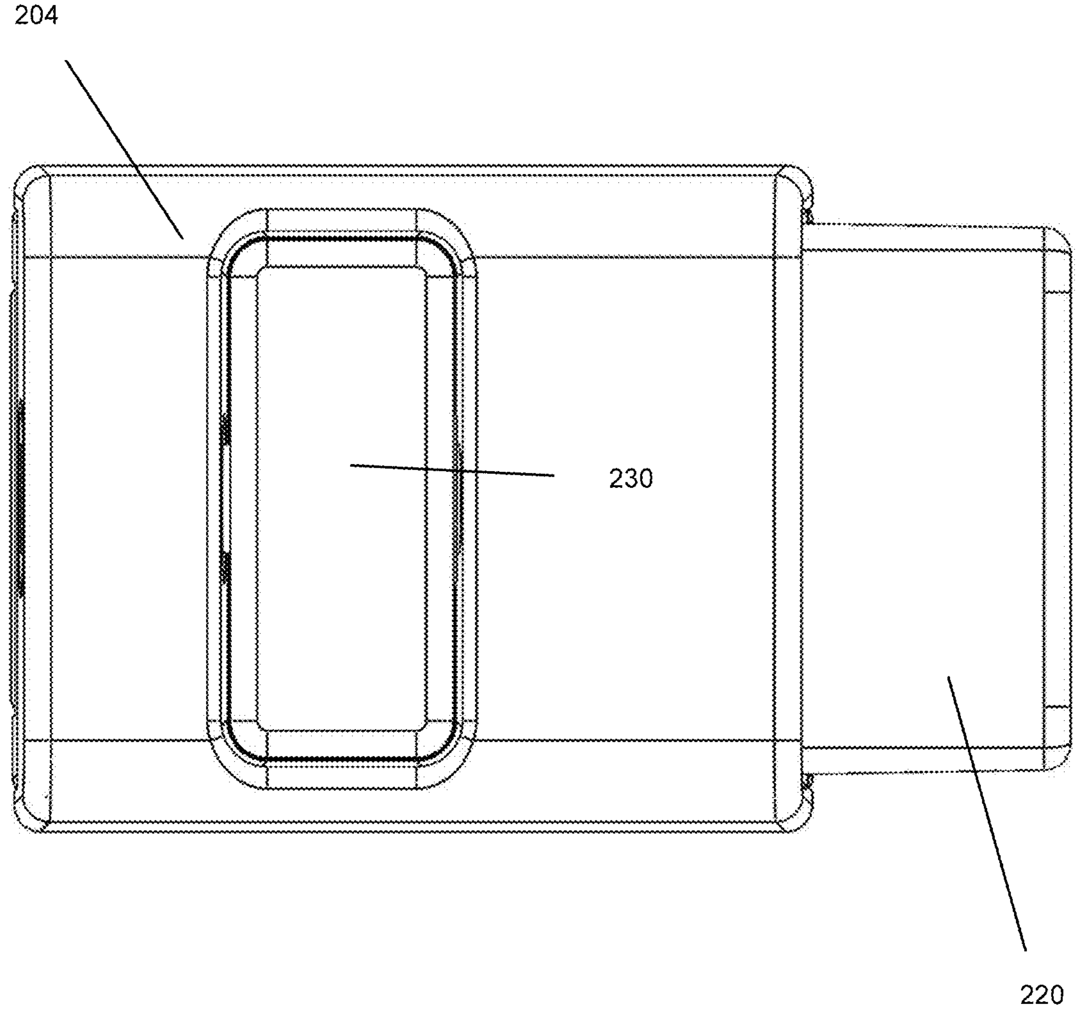
FIG. 17 is top elevation view of the first lock counterpart mounted to the mounting bracket of FIG. 813
Figure 18:
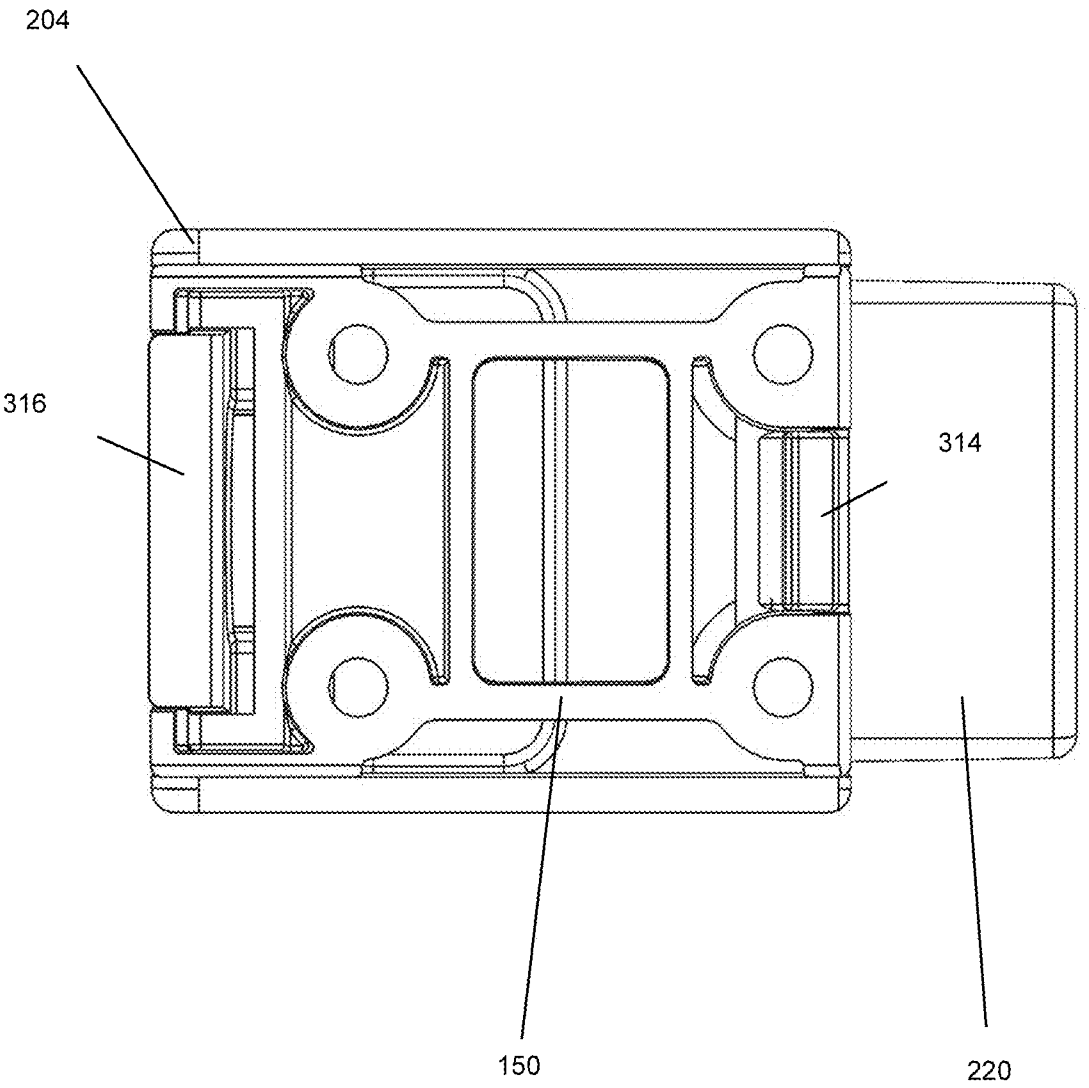
FIG. 18 is bottom elevation view of the first lock counterpart mounted to the mounting bracket of FIG. 13.
Figure 19:
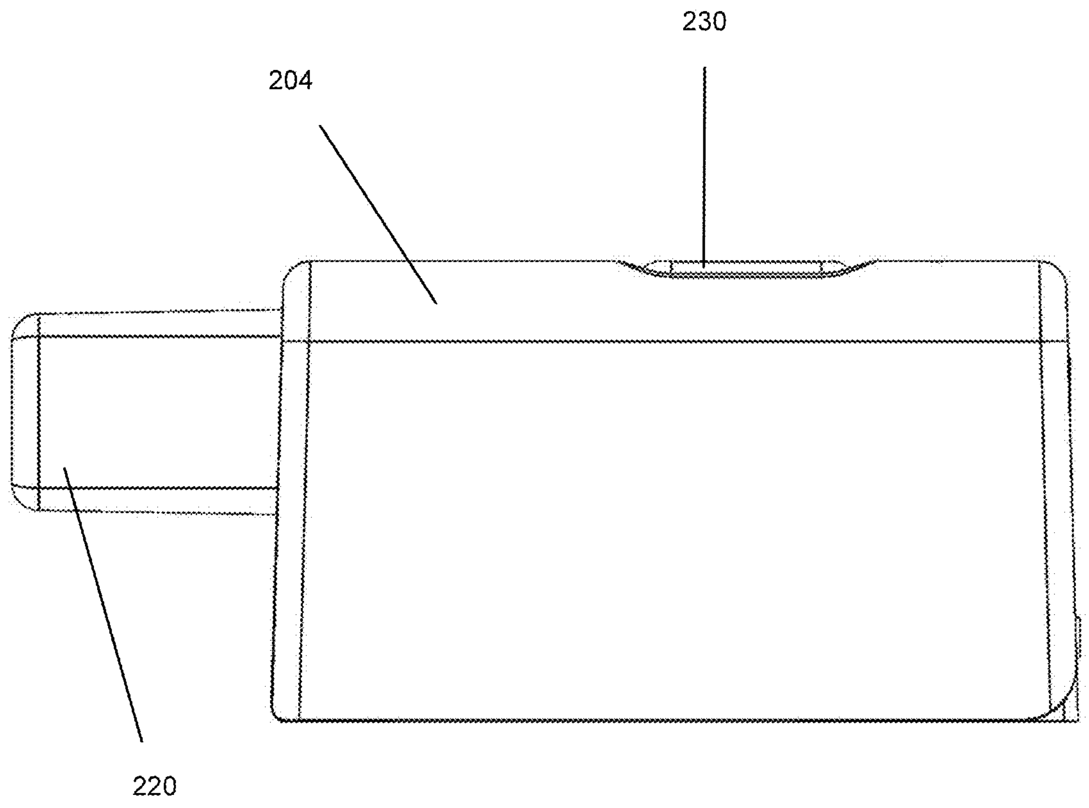
FIG. 19 is left side elevation view of the first lock counterpart mounted to the mounting bracket of FIG. 13.
Figure 20:
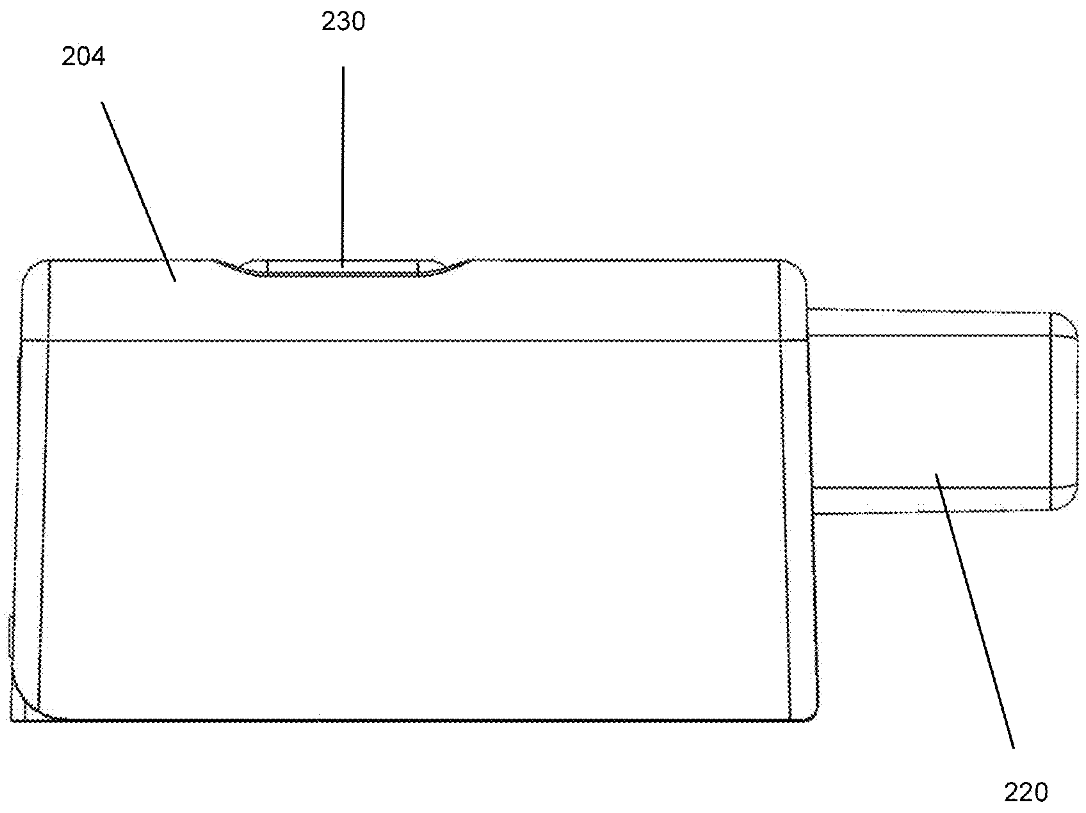
FIG. 20 is right side elevation view of the first lock counterpart mounted to the mounting bracket of FIG. 13.
Figure 21:
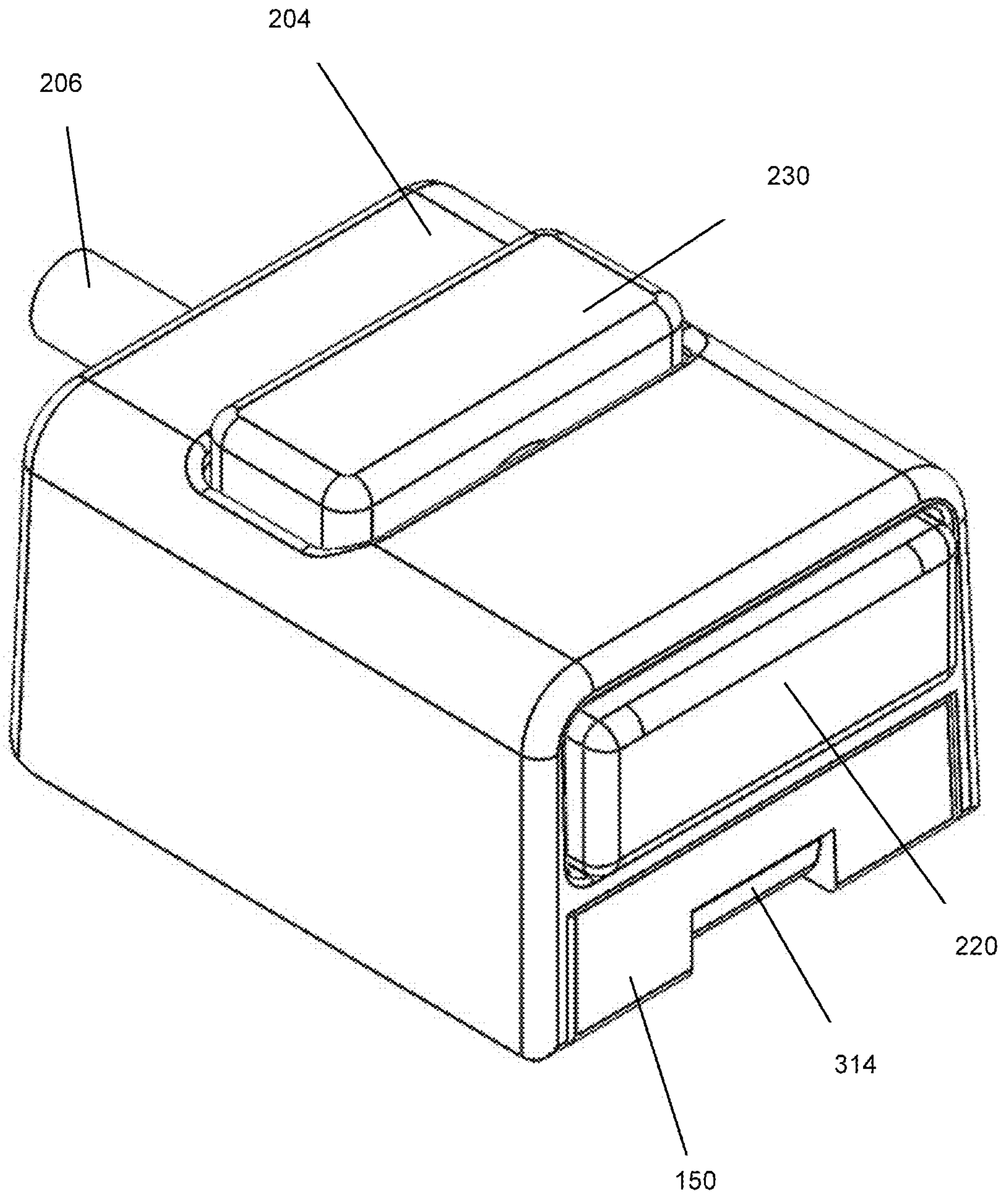
FIG. 21 is a front perspective view of the first lock counterpart mounted to the mounting bracket of the assembly of FIG. 1, the first lock counterpart in a locked configuration.
Figure 22:
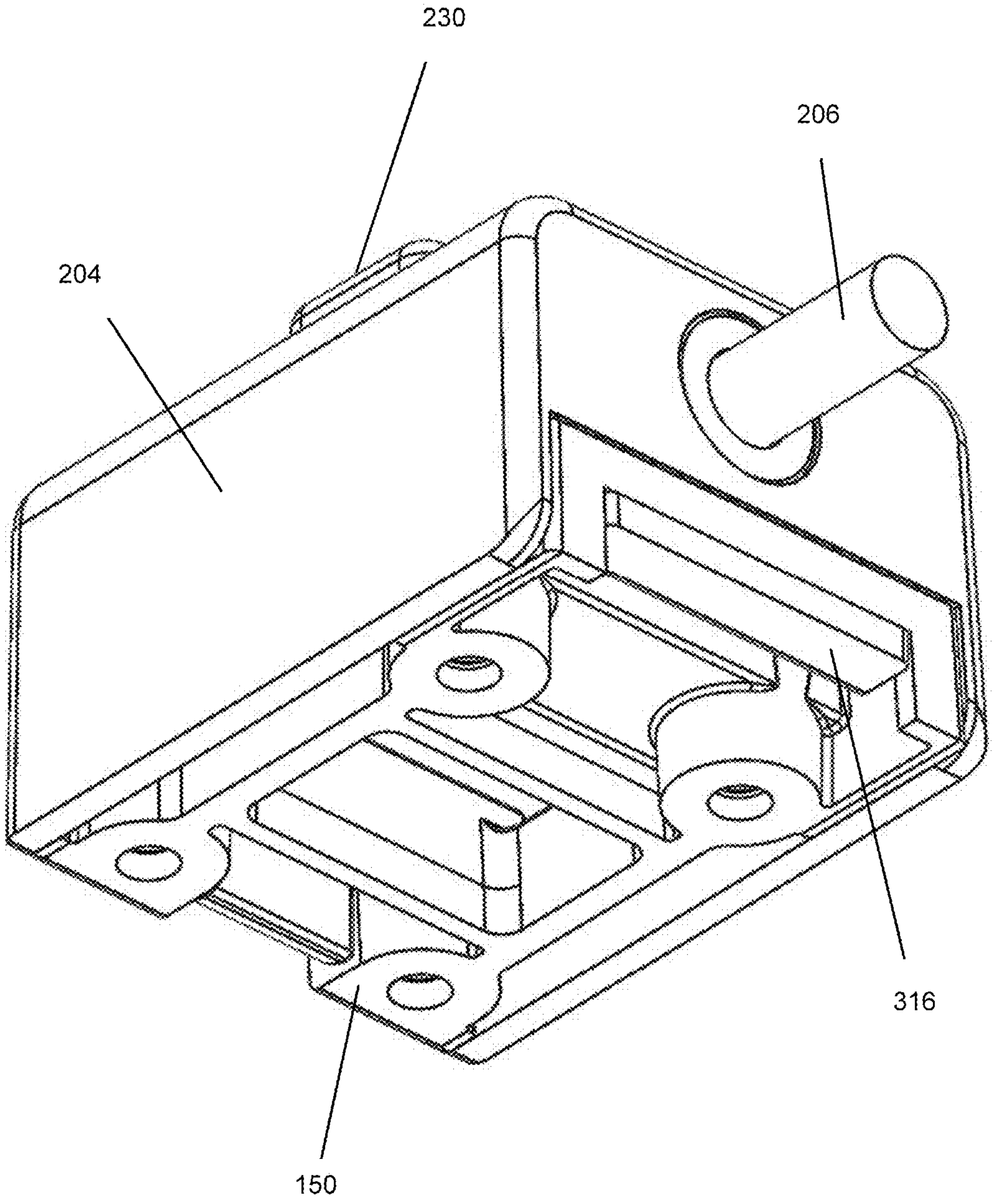
FIG. 22 is a rear perspective view of the first lock counterpart mounted to the mounting bracket of FIG. 21.
Figure 32:
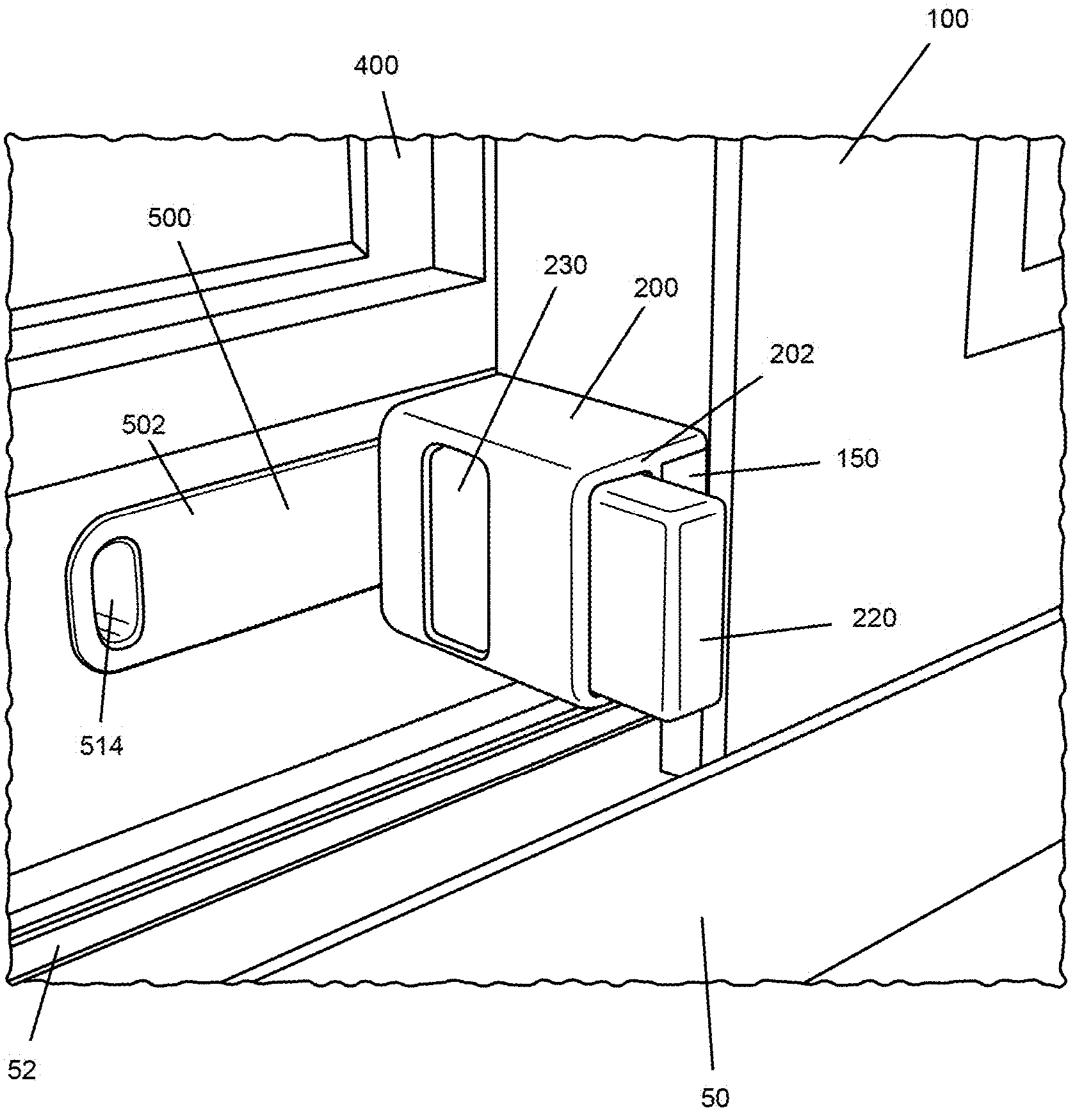
FIG. 32 is a front perspective view of the first lock counterpart mounted to the movable sash assembly, and the second lock counterpart defined by the fixed sash assembly, the first lock counterpart in an unlocked configuration.
Figure 33:
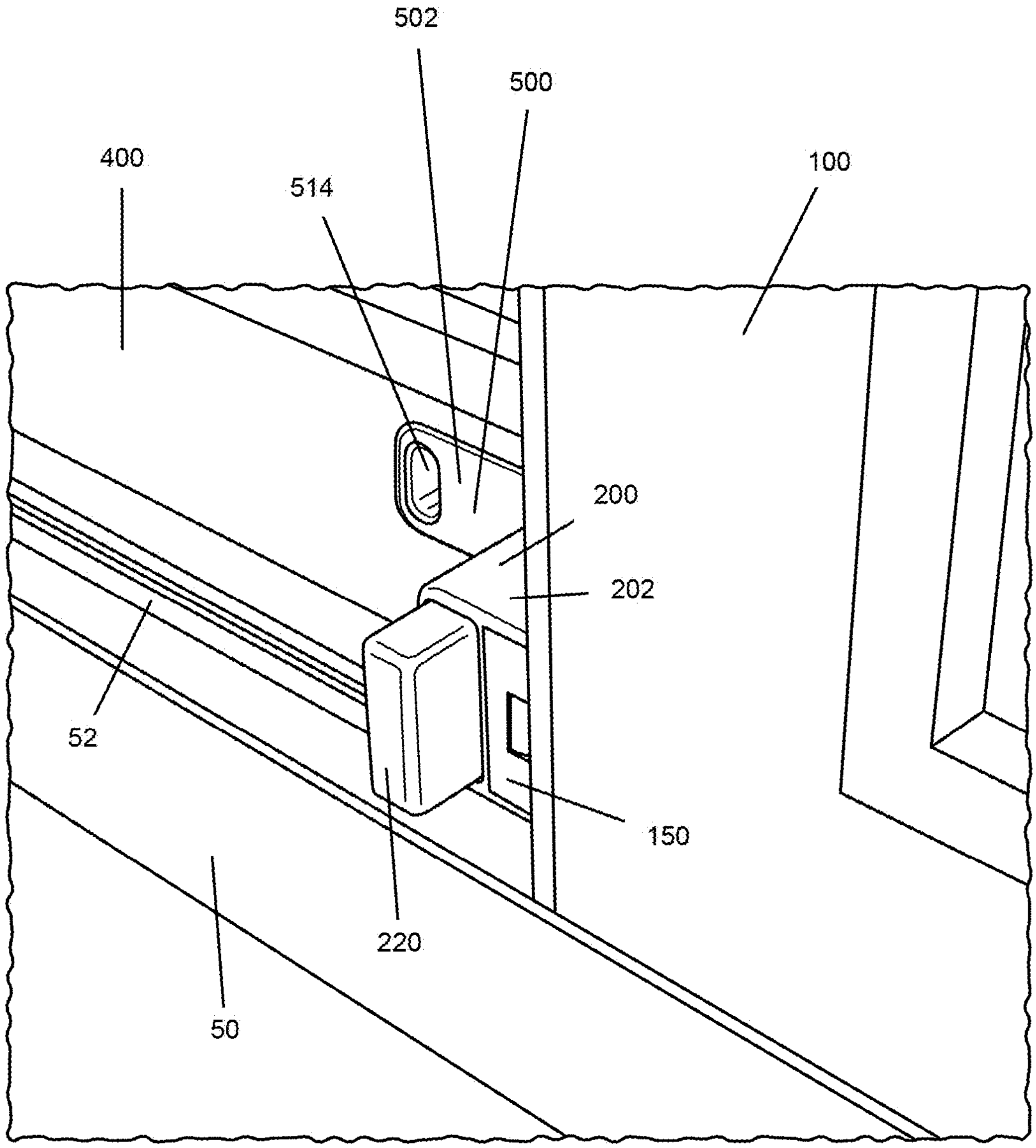
FIG. 33 is a rear perspective view of the first lock counterpart mounted to the movable sash assembly, and the second lock counterpart defined by the fixed sash assembly, the first lock counterpart in an unlocked configuration.
Figure 34:
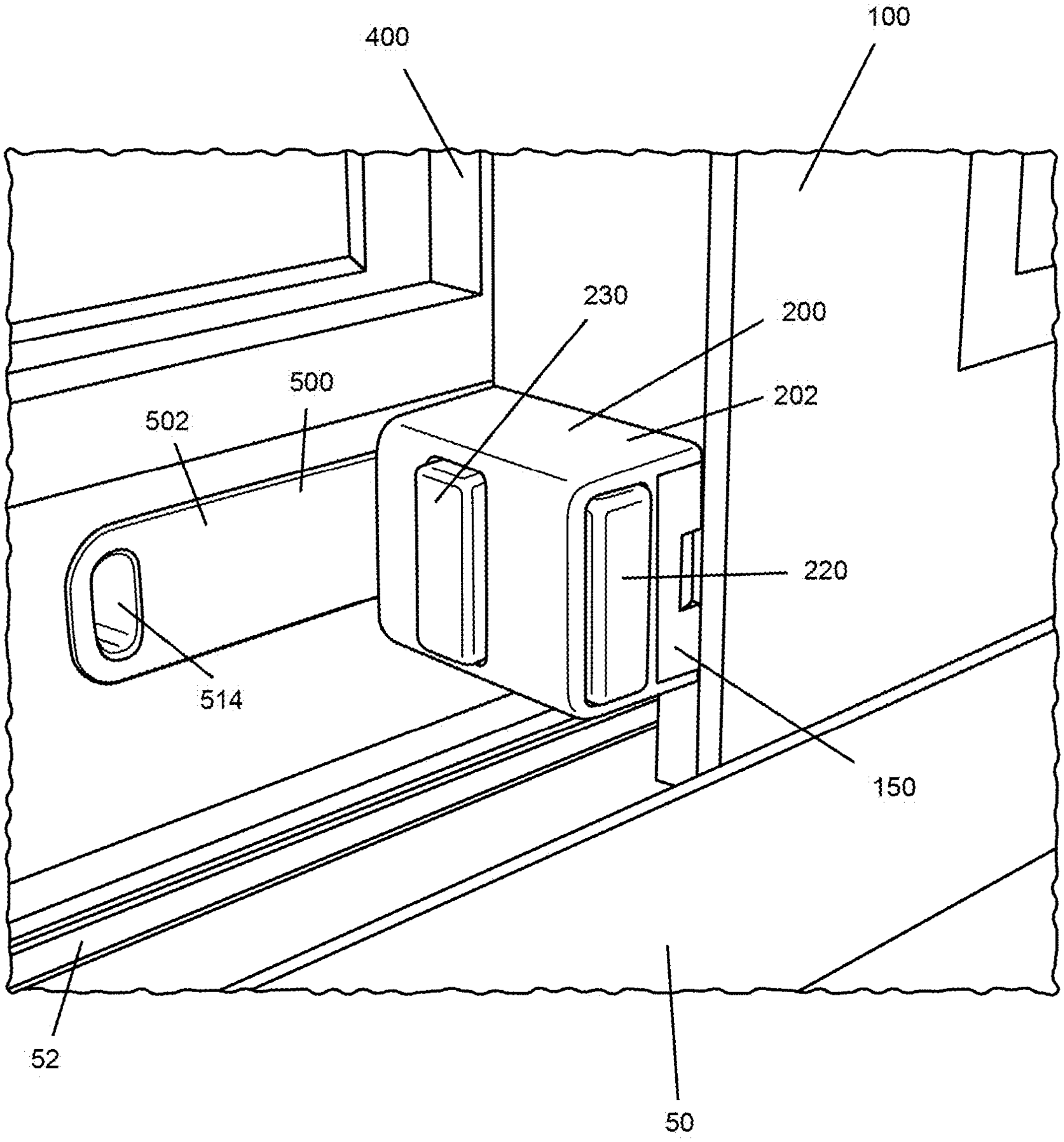
FIG. 34 is a front perspective view of the first lock counterpart mounted to the movable sash assembly, and the second lock counterpart defined by the fixed sash assembly, the first lock counterpart in a locked configuration.
Figure 35:
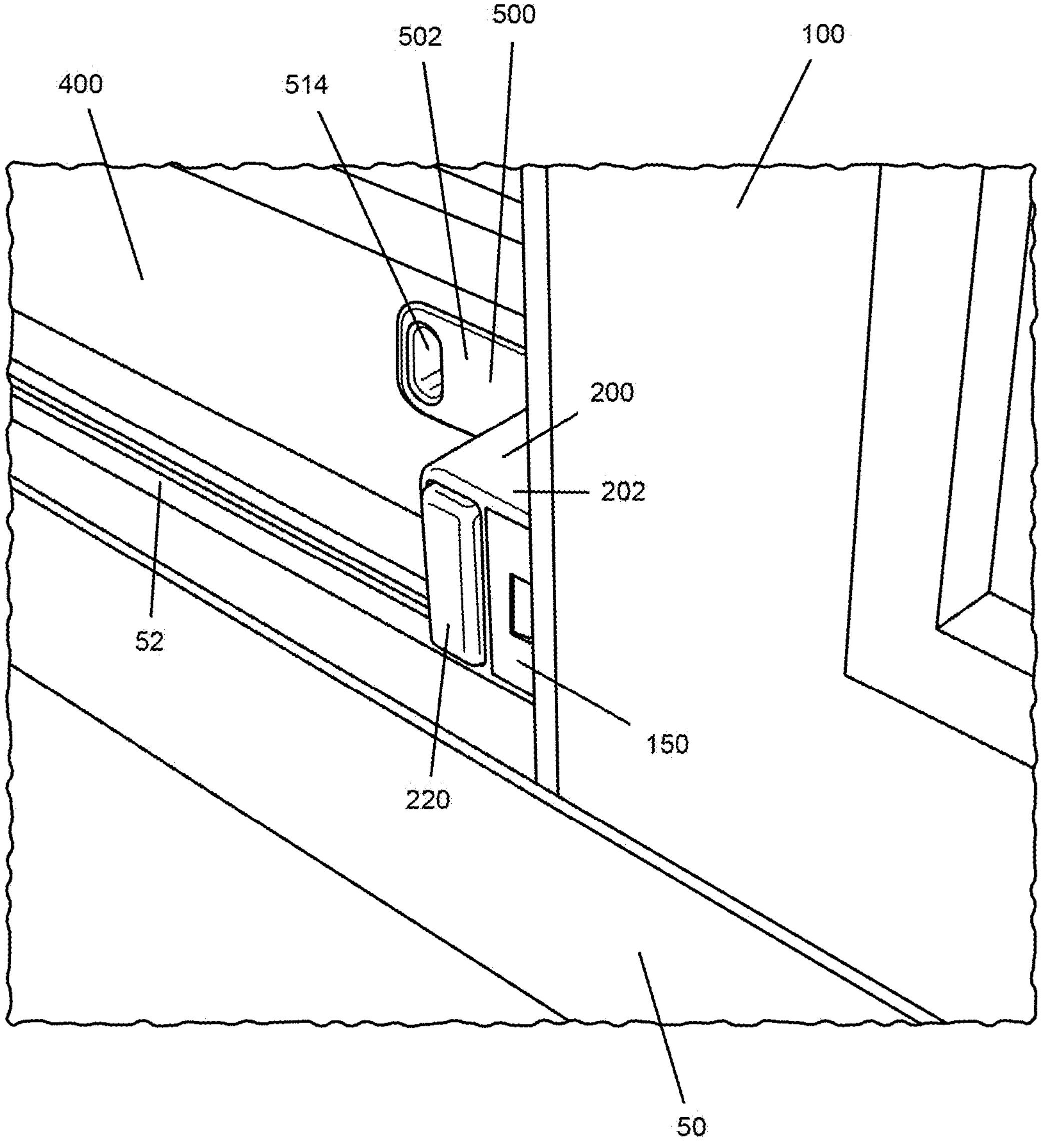
FIG. 35 is a rear perspective view of the first lock counterpart mounted to the movable sash assembly, and the second lock counterpart defined by the fixed sash assembly, the first lock counterpart in a locked configuration.

In some embodiments, for example, the lock assembly 202 is configurable in an unlocked configuration, as depicted in FIG. 11, FIG. 32, and FIG. 33, and a locked configuration, as depicted in FIG. 12, FIG. 34, and FIG. 35.

While the lock assembly 202 is disposed in the unlocked configuration, the locking pin 206 is disposed in a retracted position, wherein the locking pin 206 is retracted within the body 204. While the lock assembly 202 is disposed in the unlocked configuration, the lock actuator 220 is disposed in a locking ready configuration. As depicted, while the lock actuator 220 is disposed in the locking ready configuration, at least a portion of the lock actuator 220 is disposed outside of the body 204. While the lock assembly 202 is disposed in the unlocked configuration, the release actuator 230 is disposed in a release effective configuration. As depicted, while the release actuator 230 is disposed in a release effective configuration, at least a portion of the lock actuator 220 is disposed inside of the body 204. While the release actuator 230 is disposed in a release effective configuration, the channel 232 is disposed in alignment with the retaining ring 210.

As depicted, while the lock assembly 202 is disposed in the unlocked configuration, the retaining ring 210 is disposed between the first wall 205 and the second wall 207, and disposed in the channel 232. While the retaining ring 210 is disposed in the channel 232, the first wall 205, the connecting member 203, the retaining ring 210, and the release actuator 230 are co-operatively configured to interfere with displacement of the release actuator 230, relative to the body 204, in response to the spring force applied by the second spring 244 to the release actuator 230, such that the release actuator 230 is retained in the release effective configuration.

As depicted, in some embodiments, for example, the retaining ring 210 is disposed in abutting relationship relative to the first wall 205. While the retaining ring 210 is abutting against the first wall 205, the first wall 205, the retaining ring 210, and the lock actuator 220 are co-operatively configured to interfere with displacement of the lock actuator 220 and the locking pin configuration 201, relative to the body 204, in response to the spring force applied by the first spring 242 to the lock actuator 220, such that the lock actuator 220 is retained in the locking ready configuration, and the locking pin 206 is retained in the retracted position.

While the lock assembly 202 is disposed in the locked configuration, the locking pin 206 is disposed in an extended position, wherein the locking pin 206 is extended outside the body 204. While the lock assembly 202 is disposed in the locked configuration, the lock actuator 220 is disposed in a locking effective configuration. Relative to the locking ready configuration, the lock actuator 220 is disposed in the locking effective configuration, a greater portion of the lock actuator 220 is disposed within the body 204. While the lock assembly 202 is disposed in the locked configuration, the release actuator 230 is disposed in a release ready configuration. Relative to the release effective configuration, while the release actuator 230 is disposed in the release ready configuration, a greater portion of the release actuator 230 is disposed outside the body 204. While the lock assembly 202 is disposed in the locked configuration, the channel 232 is disposed in offset relationship relative to the retaining ring 210. While the lock assembly 202 is disposed in the locked configuration, the retaining ring 210 is disposed outside of the release actuator 230. In some embodiments, for example, while the lock assembly 202 is disposed in the locked configuration, the retaining ring 210 is disposed in the opening of the second wall 207.

As depicted, while the lock assembly 202 is disposed in the unlocked configuration, the retaining ring 210 is disposed outside of the release actuator 230. While the retaining ring 210 is disposed outside of the release actuator 230, the connecting member 203, the release actuator 230, and the first wall 205 are co-operatively configured to interfere with displacement of the release actuator 230, relative to the body 204, in response to the spring force applied by the second spring 244 to the release actuator 230, such that the release actuator 230 is retained in the release ready configuration.

As depicted, in some embodiments, for example, the retaining ring 210 is disposed in abutting relationship relative to the release actuator 230 that is disposed in the release ready configuration. While the retaining ring 210 is abutting against the release actuator 230 that is disposed in the release ready configuration, the retaining ring 210 and the release actuator 230 are co-operatively configured to interfere with displacement of the lock actuator 220 and the locking pin configuration 201, relative to the body 204, in response to the spring force applied by the first spring 242 to the lock actuator 220, such that the lock actuator 220 is retained in the locking effective configuration, and that the locking pin 206 is retained in the extended position.

The lock assembly 202 is transitionable from the unlocked configuration to the locked configuration in response to a locking-effective actuation of the lock actuator 220. The actuation of the lock actuator 220, while the lock assembly 202 is disposed in the unlocked configuration, is effectible by application of a pushing force to the lock actuator 220, for example, by a user.

In response to the locking effective actuation of the lock actuator 220, while the lock assembly 202 is disposed in the unlocked configuration, the lock actuator 220 and the locking pin configuration 201 are displaced, relative to the body 204, in a direction towards the second side 2022 of the locking assembly 2022. In some embodiments, for example, the lock actuator 220 and the locking pin configuration 201 are displaced, relative to the body 204, in a direction towards the second side 2022 of the locking assembly 2022 until the retaining ring 210 is disposed in abutting engagement with the plug 212.

The displacement of the lock actuator 220 and the locking pin configuration 201, relative to the body 204, in a direction towards the second side 2022 of the locking assembly 2022, is with effect that: (i) the lock actuator 220 becomes disposed in the locking effective configuration, (ii) the locking pin 206 becomes disposed in the extended position, and (iii) the retaining ring 210 becomes disposed outside of the release actuator 230, for example, disposed in the opening of the second wall 207.

In response to disposition of the retaining ring 210 outside of the release actuator 230, the interfering of the displacement of the release actuator 230 in response to the spring force applied by the second spring 244 to the release actuator 230, the interfering effected by the co-operative configuration of the first wall 205, the connecting member 203, the retaining ring 210, and the release actuator 230, becomes defeated. The defeating of said interfering is with effect that the release actuator 230 is displaced, relative to the body 204, in response to the spring force applied by the second spring 244 to the release actuator 230, such that the release actuator 230 becomes disposed in the release ready configuration.

While the retaining ring 210 is disposed outside of the release actuator 230, the connecting member 203, the release actuator 230, and the first wall 205 are co-operatively configured to interfere with displacement of the release actuator 230 in response to the spring force applied by the second spring 244 to the release actuator 230, such that the release actuator 230 is retained in the release ready configuration.

In some embodiments, for example, the disposition of the retaining ring 210 outside of the release actuator 230 is indicated by the displacement of the release actuator 230, relative to the body 204, from the release effective configuration to the release ready configuration.

After the retaining ring 210 is disposed outside of the release actuator 230, the force applied to the lock actuator 220, to effect the locking effective actuator, is released. In response to the release of the force, the lock actuator 220 and the locking pin configuration 201 are displaced, relative to the body 204, for example, in a direction towards the first side 2021 of the locking assembly 202, in response to the spring force applied by the first spring 242 to the lock actuator 220, until the retaining ring 210 becomes disposed in abutting engagement with the release actuator 230 that is disposed in the release ready configuration. The retaining ring 210 is disposable in abutting engagement with the release actuator 230 that is disposed in the release ready configuration because the channel 232 is offset relative to the retaining ring 210 while the release actuator 230 is disposed in the release ready configuration.

While the retaining ring 210 is abutting against the release actuator 230 that is disposed in the release ready configuration, the retaining ring 210 and the release actuator 230 are co-operatively configured to interfere with displacement of the lock actuator 220 and the locking pin configuration 201 in response to the spring force applied by the first spring 242 to the lock actuator 220, such that the lock actuator 220 is retained in the locking effective configuration, and that the locking pin 206 is retained in the extended position.

At this point, the locking assembly 202 is retained in the locked configuration.

The lock assembly 202 is transitionable from the locked configuration to the unlocked configuration in response to a releasing-effective actuation of the release actuator 230. The actuation of the release actuator 230, while the lock assembly 202 is disposed in the locked configuration, is effectible by application of a pushing force to the release actuator 230, for example, by a user.

In response to the releasing effective actuation of the release actuator 230, the release actuator 230 is displaced, relative to the body 204, in a direction towards the second spring 244, such that the release actuator 230 becomes disposed in the release effective configuration, wherein the channel 232 is disposed in alignment with the retaining ring 210.

The alignment of the channel 232 and the retaining ring 210, is with effect that the interfering of the displacement of the lock actuator 220 and the locking pin configuration 201 in response to the spring force applied by the first spring 242 to the lock actuator 220, the interfering effected by the co-operative configuration of the retaining ring 210 and the release actuator 230, becomes defeated. The defeating of said interfering is with effect that the lock actuator 220 and the locking pin configuration 201 are displaced, relative to the body 204, in response to the spring force applied by the first spring 242 to the lock actuator 220, such that the lock actuator 220 and the locking pin configuration 201 are displaced, relative to the body 204, in a direction towards the first side 2021 of the locking assembly 202.

The displacement of the lock actuator 220 and the locking pin configuration 201, relative to the body 204, in a direction towards the first side 2021 of the locking assembly 2022, is with effect that: (i) the lock actuator 220 becomes disposed in the locking ready configuration, (ii) the locking pin 206 becomes disposed in the retracted position, and (iii) the retaining ring 210 becomes disposed within the release actuator 230, for example, within the passage 232.

While the retaining ring 210 is disposed in the channel 232, the first wall 205, the connecting member 203, the retaining ring 210, and the release actuator 230 are co-operatively configured to interfere with displacement of the release actuator 230 in response to the spring force applied by the second spring 244 to the release actuator 230, such that the release actuator 230 is retained in the release effective configuration.

In some embodiments, for example, the lock actuator 220 and the locking pin configuration 201 are displaced by the spring force applied by the first spring 242 to the lock actuator 220 until the retaining ring 210 is disposed in abutting engagement with the first wall 205. While the retaining ring 210 is abutting against the first wall 205, the first wall 205, the retaining ring 210, and the lock actuator 220 are co-operatively configured to interfere with displacement of the lock actuator 220 and the locking pin configuration 201 in response to the spring force applied by the first spring 242 to the lock actuator 220, such that the lock actuator 220 is retained in the locking ready configuration, and the locking pin 206 is retained in the retracted position.

At this point, the locking assembly 202 is retained in the unlocked configuration. The locking assembly 202 can again transition to the locked configuration as described above.

Figure 23:
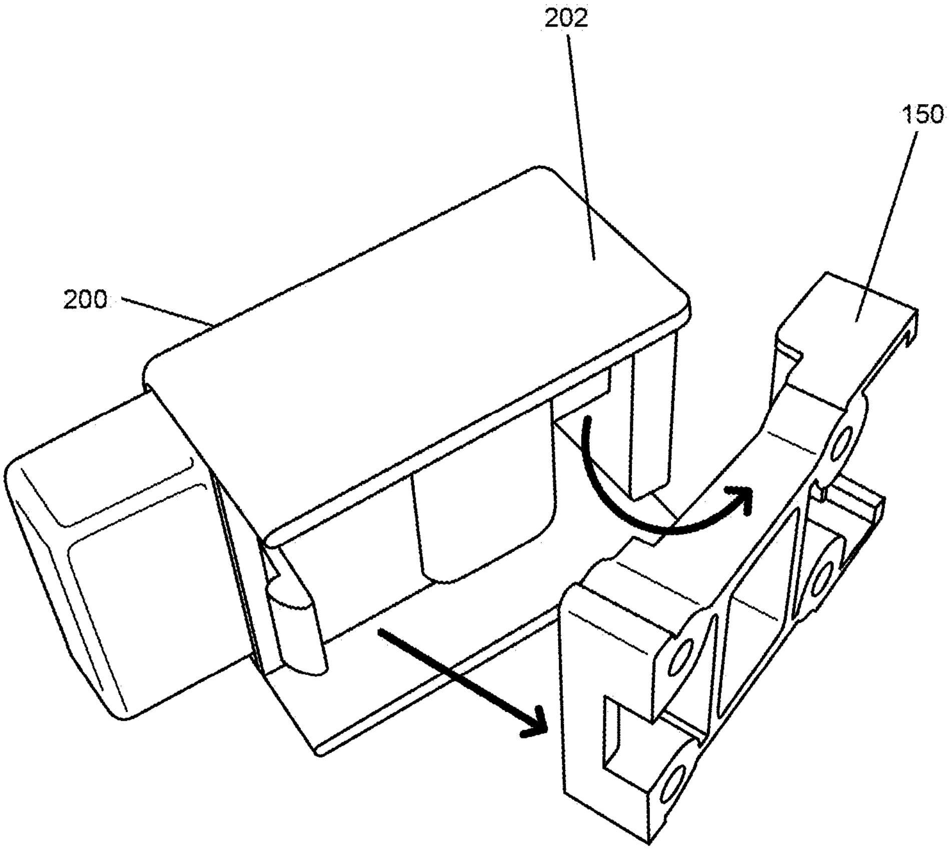
FIG. 23 is a schematic of the first lock counterpart and the mounting bracket of the assembly of FIG. 1.

The first lock counterpart 200 is mountable to the movable sash assembly 100, as depicted in FIG. 23, wherein the mounting of the first lock counterpart 200 to the movable sash assembly 100 is such that the first lock counterpart 200 is disposed in a snap fit relationship with the movable sash assembly 100. In some embodiments, for example, the snap fit engagement of the first lock counterpart 200 to the movable sash assembly 100 is effected by snap fit engagement of the first lock counterpart 200 to a mounting bracket 150 of the movable sash assembly 100. In this respect, in some embodiments, for example, the first lock counterpart 200 is mountable to the movable sash 102 of the movable sash assembly 100 via the mounting bracket 150.

Figure 10:
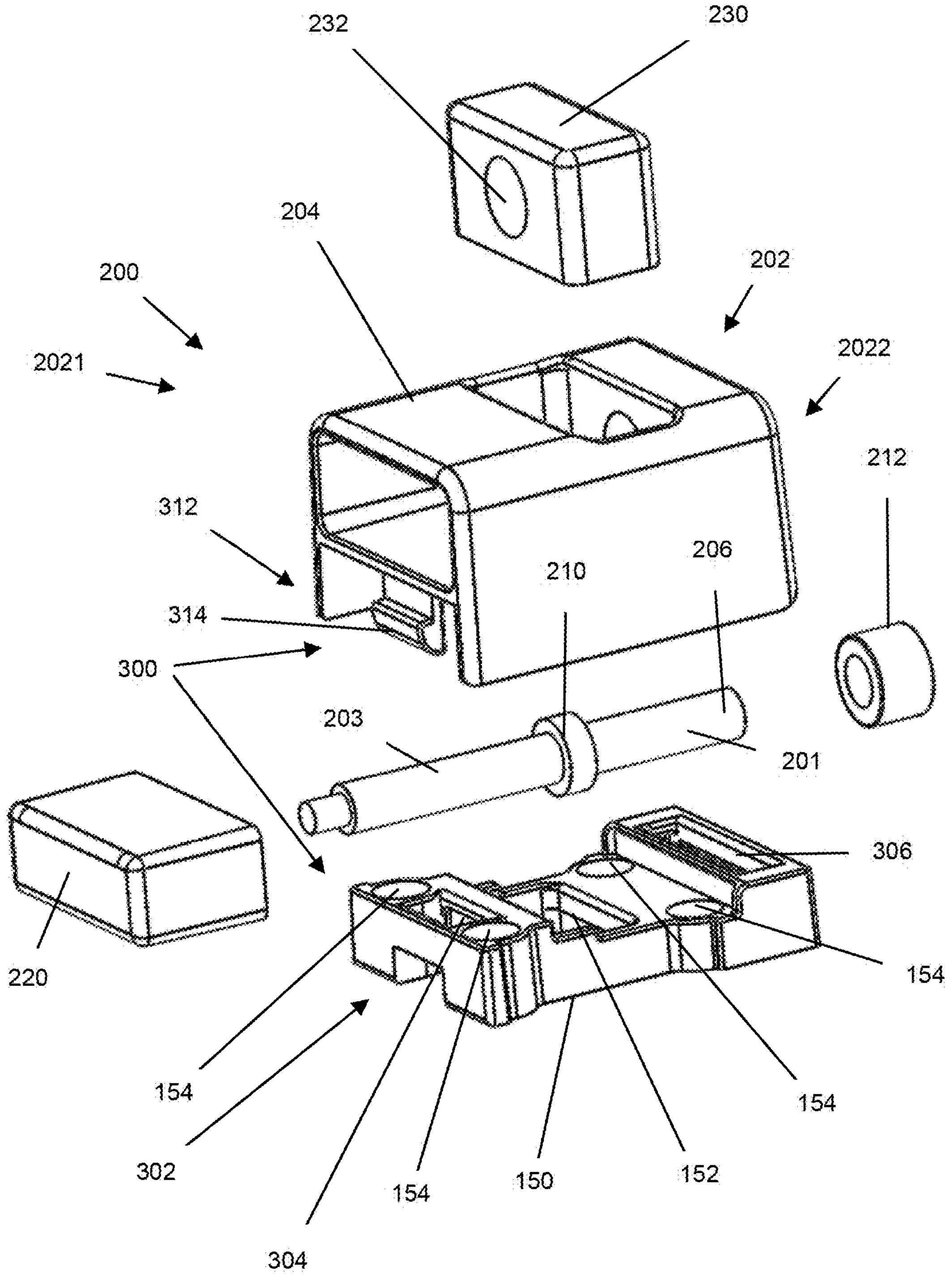
FIG. 10 is an exploded view of the first lock counterpart and the mounting bracket of the assembly of FIG. 1.

FIG. 10 and FIG. 32 to FIG. 36 depict an embodiment of the mounting bracket 150 of the movable sash assembly 100. The mounting bracket 150 includes an opening 152 and one or more fastener receiving ports 154. As depicted in FIG. 10, the mounting bracket 150 includes four receiving ports 154. Each of the one or more fastener receiving ports, independently 154, is configured to receive a mechanical faster for mounting the mounting bracket 150 to the movable sash 102, for example, to the side surface 108 of the movable sash 102. In some embodiments, for example, the mounting bracket 150 is mountable to the movable sash 102, for example, via fasteners received in the ports 154, wherein the mounting of the mounting bracket 150 to the movable sash 102 is such that the access port 120 is accessible by a tool, for example, a screw driver, through the opening 152.

In some embodiments, for example, the first lock counterpart 200 is mountable to the side surface 108 of the movable sash 102, for example, via mounting the first lock counterpart 200 to the mounting bracket 150 that is mounted to the side surface 108 of the movable sash.

The first lock counterpart 200 is mountable to the mounting bracket 150, wherein the mounting of the first lock counterpart 200 to the mounting bracket 150 is such that the first lock counterpart 200 is disposed in a snap fit relationship with the mounting bracket 150.

In some embodiments, for example, the mounting of the first lock counterpart 200 to the mounting bracket 150 is effectible by a connection system 300, as depicted in FIG. 10 to FIG. 22. In some embodiments, for example the mounting of the first lock counterpart 200 to the mounting bracket 150 is a releasable mounting of the first lock counterpart 200 to the mounting bracket 150. In some embodiments, for example, the mounting of the first lock counterpart 200 to the mounting bracket 150 is effectible by snap fit, friction fit, or interference fit, or a combination thereof. The connection system 300 includes a mounting bracket-defined connection system counterpart 302 and a lock assembly defined connection system counterpart 312. In some embodiments, for example, the mounting bracket-defined connection system counterpart 302 includes a slot 304 and a slot 306, and the lock assembly defined connection system counterpart 312 includes a prong 314 and a tab 316. As depicted, in some embodiments, for example, the prong 314 is disposed on the first side 2021 of the locking assembly 202, and the tab 316 is disposed on the second side 2022 of the locking assembly 202.

In some embodiments, for example, the slot 304 and the prong 314 are co-operatively configured such that, in response to insertion of the prong 314 in the slot 304, the prong 314 is snapped into the slot 304, such that the prong 314 and the slot 304 become disposed in a snap fit relationship. In some embodiments, for example, the disposition of the first lock counterpart 200 and the mounting bracket 150 in the snap fit relationship is effected by disposition of the prong 314 and the slot 304 in the snap fit relationship. In some embodiments, for example, the snap fit connection is effectible on the first side 2022 of the locking assembly 202.

In some embodiments, for example, the slot 306 and the tab 316 are co-operatively configured such that, in response to insertion of the tab 316 in the slot 306, the tab 316 and the slot 306 become disposed in a friction fit or interference fit relationship. In some embodiments, for example, disposition of the first lock counterpart 200 and the mounting bracket 150 in a friction fit or interference fit relationship is effected by disposition of the prong 314 and the slot 304 in the friction fit or interference fit relationship.

In some embodiments, for example, to unmount the first lock counterpart 200 from the mounting bracket 150, the prong 314 is displaced, relative to the slot 304, to release the prong 314 and the slot 304 from the snap fit connection. With the prong 314 and the slot 304 released from the snap fit connection, the first lock counterpart 200 is displaced, relative to the mounting bracket 150, to release the tab 316 and the slot 306 from the friction fit or interference fit connection, with effect that the first lock counterpart 200 becomes unmounted from the mounting bracket 150.

In some embodiments, for example, while the mounting bracket 150 is mounted to the movable sash 102, while there is an absence of mounting of the first lock counterpart 200 to the mounting bracket 150, the positioning mechanism 134 of the sash wheel assembly 130, for example, the positioning screw 136, is accessible by a tool, for example, a screw driver, through the opening 152 of the mounting bracket 150 and through the access port 120, for effecting the adjustment to the sash wheel assembly 130, for example, adjustment to the height of the sash wheel assembly 130.

In some embodiments, for example, while the mounting bracket 150 is mounted to the movable sash 102, while the first lock counterpart 150 is mounted to the mounting bracket 150, the access port 120 is occluded such that the accessibility of the sash wheel assembly 130, by the tool, through the access port 120, is absent. In some embodiments, for example, the occlusion of the access port 120 is with further effect that the positioning mechanism 134 of the sash wheel assembly 130 is concealed.

In some embodiments, for example, while the first lock counterpart 200 is mounted to the movable sash 102 of the movable sash assembly 100, for example, via mounting to the mounting bracket 150 of the movable sash assembly 100: (i) while the movable sash 102 is mounted to the sill configuration 50 such that the movable sash 102 is disposed in the upper position relative to the sill configuration 50, the first lock counterpart 200, the movable sash 102, and the sill configuration 50 are disposed in an upper position configuration, as depicted in FIG. 37; and (ii) while the movable sash 102 is mounted to the sill configuration 50 such that the movable sash 102 is disposed in the lower position relative to the sill configuration 50, the first lock counterpart 200, the movable sash 102, and the sill configuration 50 are disposed in a lower position configuration, as depicted in FIG. 39. In some embodiments, for example, the vertical distance H3 between the center of the access port 120 and the top of the track 52, while the first lock counterpart 200, the movable sash 102, and the sill configuration 50 are disposed in the upper position configuration, is greater than the vertical distance H4 between the center of the access port 120 and the top of the track 52, while the first lock counterpart 200, the movable sash 102, and the sill configuration 50 are disposed in the lower position configuration.

In some embodiments, for example, while the first lock counterpart 200 is mounted to the movable sash 102 of the movable sash assembly 100, for example, via mounting to the mounting bracket 150 of the movable sash assembly 100: (i) while the movable sash 102 is mounted to the sill configuration 50 such that the movable sash 102 is disposed in the intermediate position relative to the sill configuration 50, the first lock counterpart 200, the movable sash 102, and the sill configuration 50 are disposed in an intermediate position configuration, as depicted in FIG. 41. In some embodiments, for example, the vertical distance H6 between the center of the access port 120 and the top of the track 52, while the first lock counterpart 200, the movable sash 102, and the sill configuration 50 are disposed in the intermediate position configuration, is greater than the vertical distance H4 between the center of the access port 120 and the top of the track 52, while the first lock counterpart 200, the movable sash 102, and the sill configuration 50 are disposed in the lower position configuration, and lesser than the vertical distance H3 between the center of the access port 120 and the top of the track 52, while the first lock counterpart 200, the movable sash 102, and the sill configuration 50 are disposed in the upper position configuration.

In some embodiments, for example, the first lock counterpart 200, the movable sash assembly 100, and the sill configuration 50 are co-operatively configured such that, the minimum vertical displacement of the movable sash 102, in transitioning between the upper position configuration and the lower position configuration, is at least ⅛ inches.

In some embodiments, for example, as depicted in FIG. 1 to FIG. 4 and FIG. 32 to FIG. 36, the assembly 10 includes a fixed sash assembly 400 configured for mounting to the sill configuration 50 such that a mounted fixed sash configuration is established. The fixed sash assembly 400 includes a fixed sash 402 and a second lock counterpart 500.

As depicted in FIG. 5, the fixed sash 402 includes a first side defining a first surface 404, a second side disposed on an opposite side of the fixed sash 402 relative to the first side defining a second surface, and a side surface extending between the first surface 404 and the second surface. While the assembly 10 is installed within the opening within the wall of the building, the first surface 404 is configured to face the inside of the building, and the second surface is configured to face the outside of the building. As depicted in FIG. 1, the fixed sash 402 is configured to support one or more glass panels 410, through which line of sight through the fixed sash 402 is provided.

As depicted in FIG. 1, FIG. 5, and FIG. 32 to FIG. 36, in some embodiments, for example, the second lock counterpart 500 is defined on the first surface 404 of the fixed sash 402.

Figure 24:
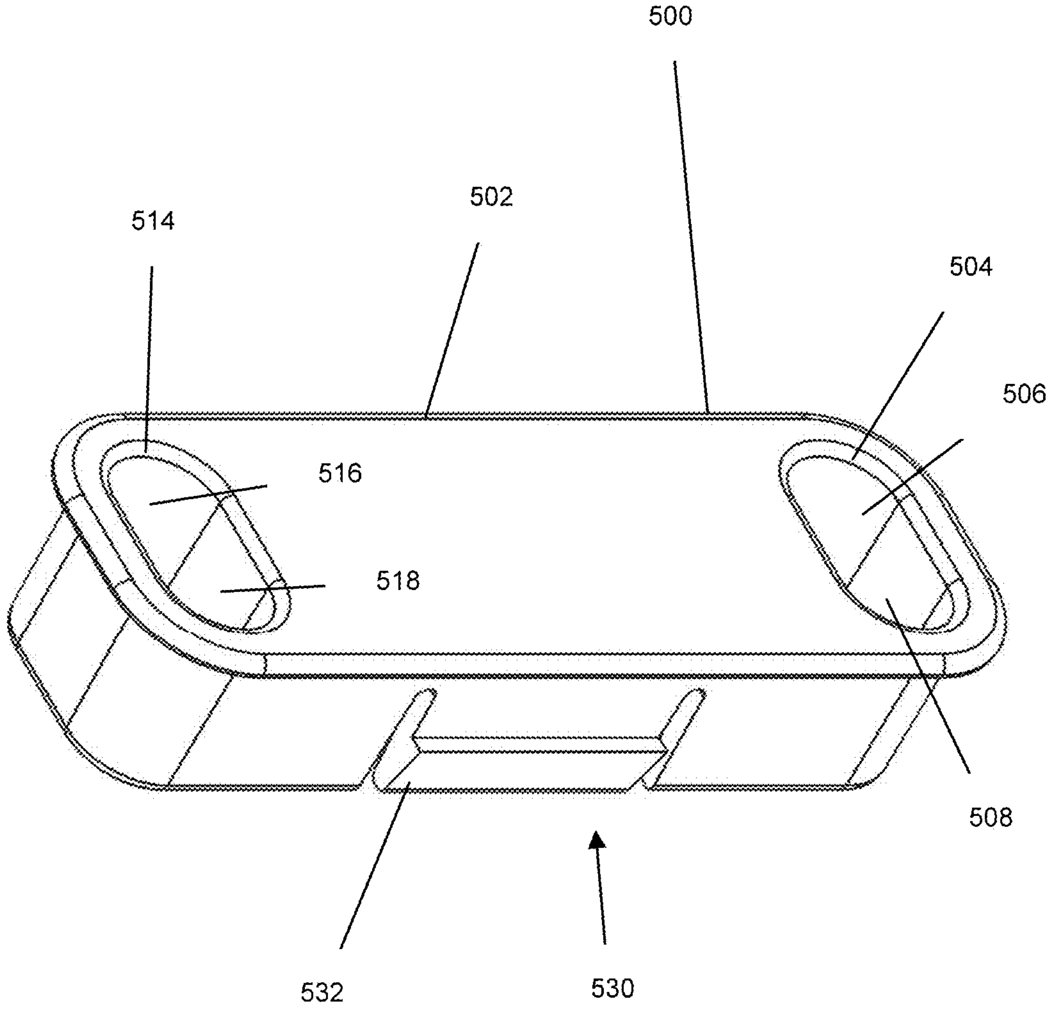
FIG. 24 is a front perspective view of a second lock counterpart of the assembly of FIG. 1.
Figure 25:
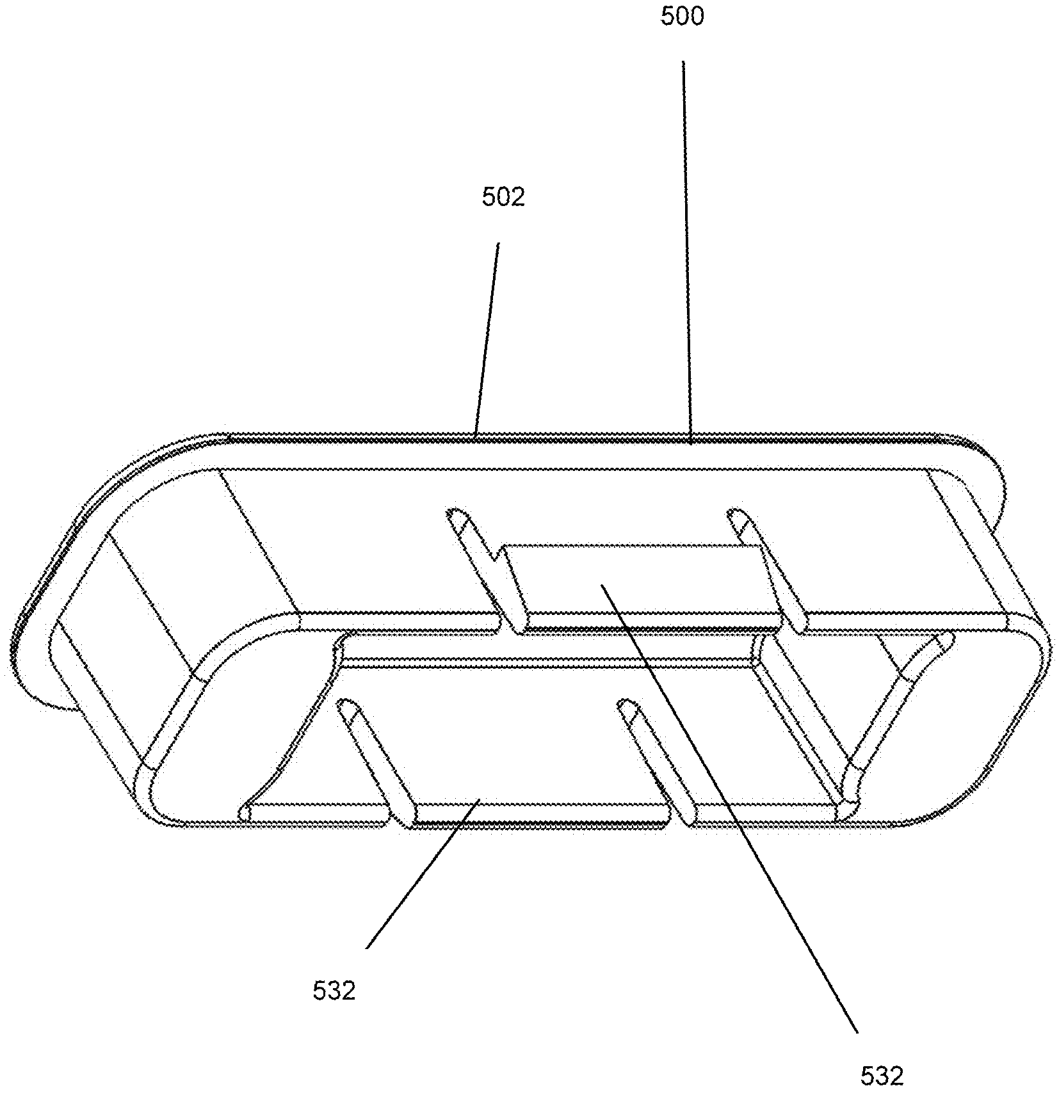
FIG. 25 is a rear perspective view of the second lock counterpart of FIG. 24.
Figure 26:
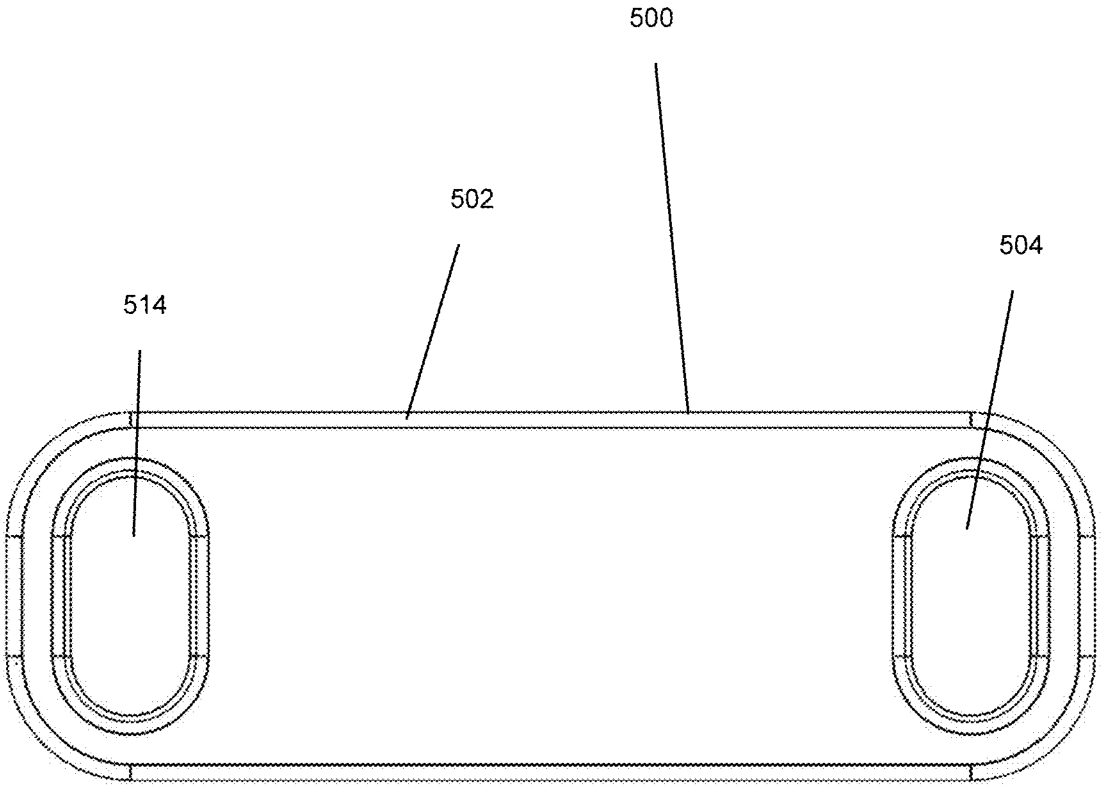
FIG. 26 is a top elevation view of the second lock counterpart of FIG. 24.
Figure 27:
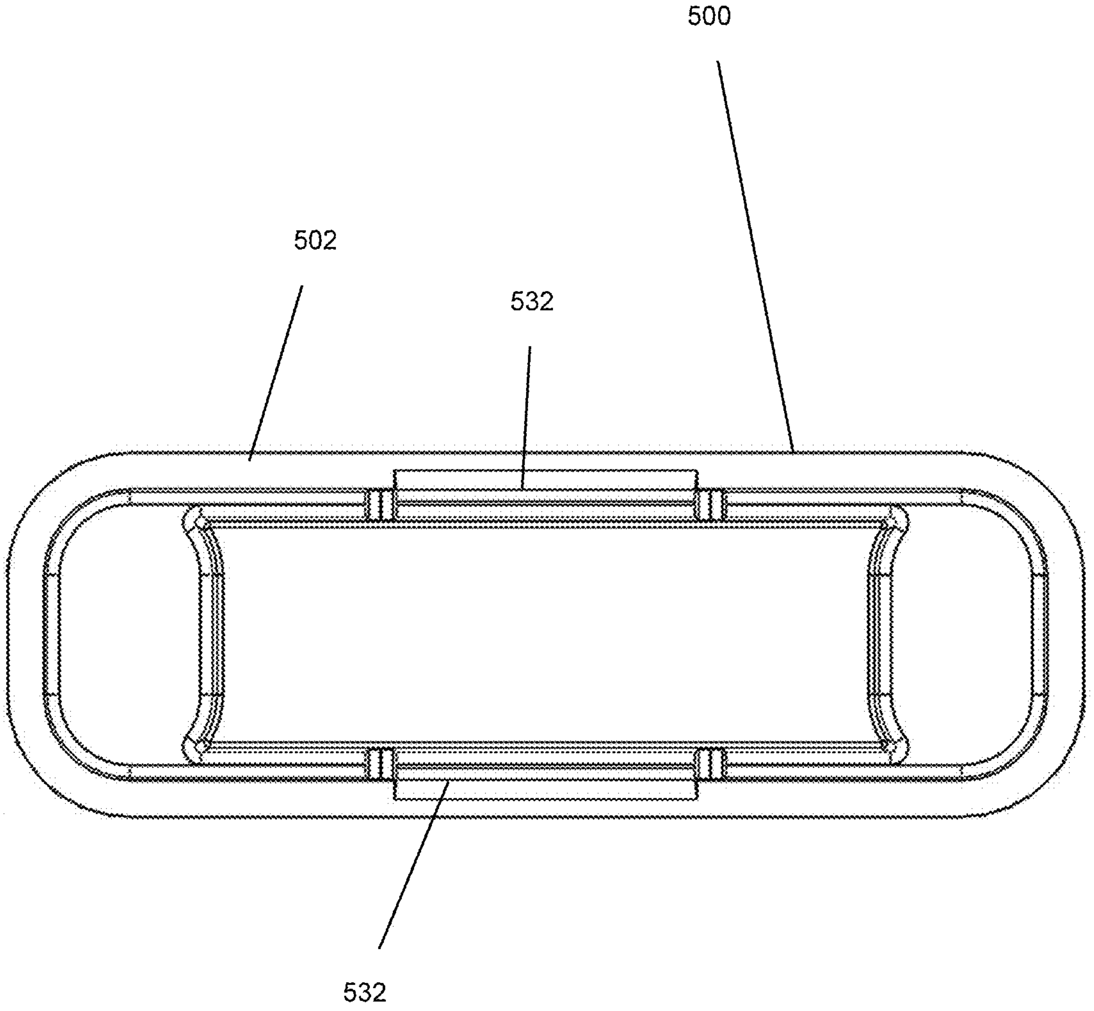
FIG. 27 is a bottom elevation view of the second lock counterpart of FIG. 24.
Figure 28:
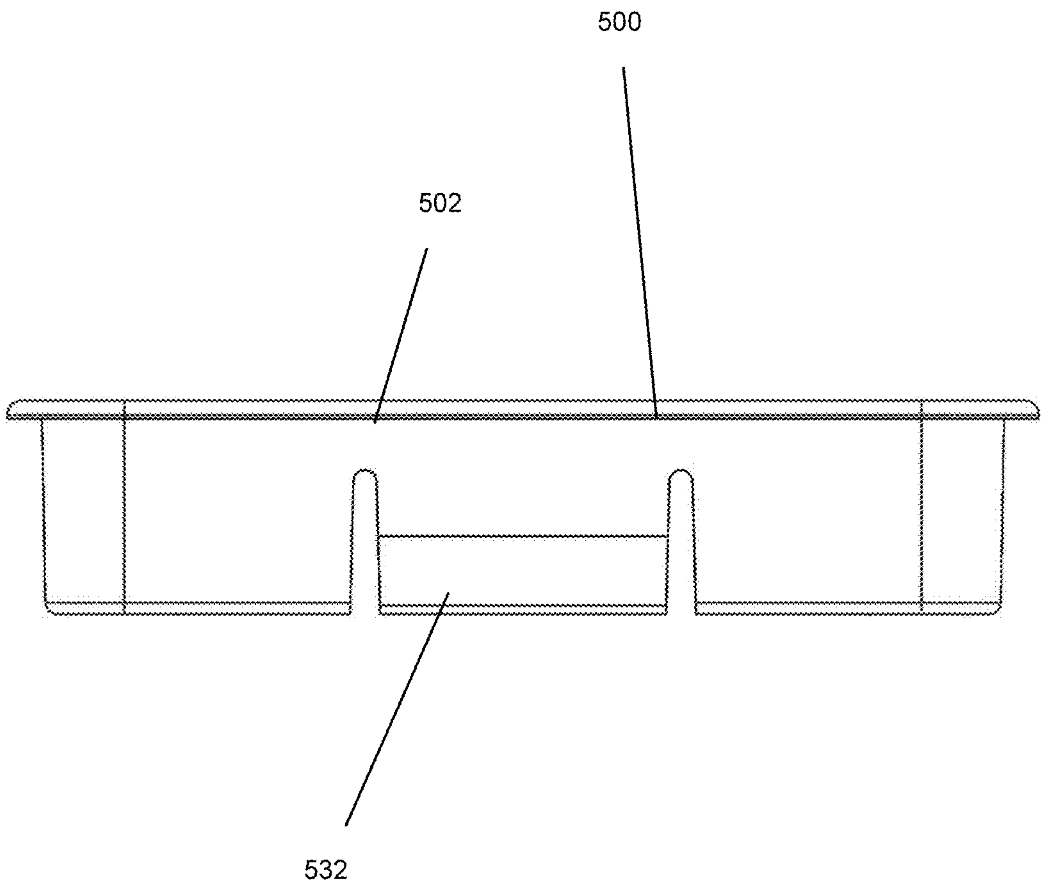
FIG. 28 is a front elevation view of the second lock counterpart of FIG. 24.
Figure 29:
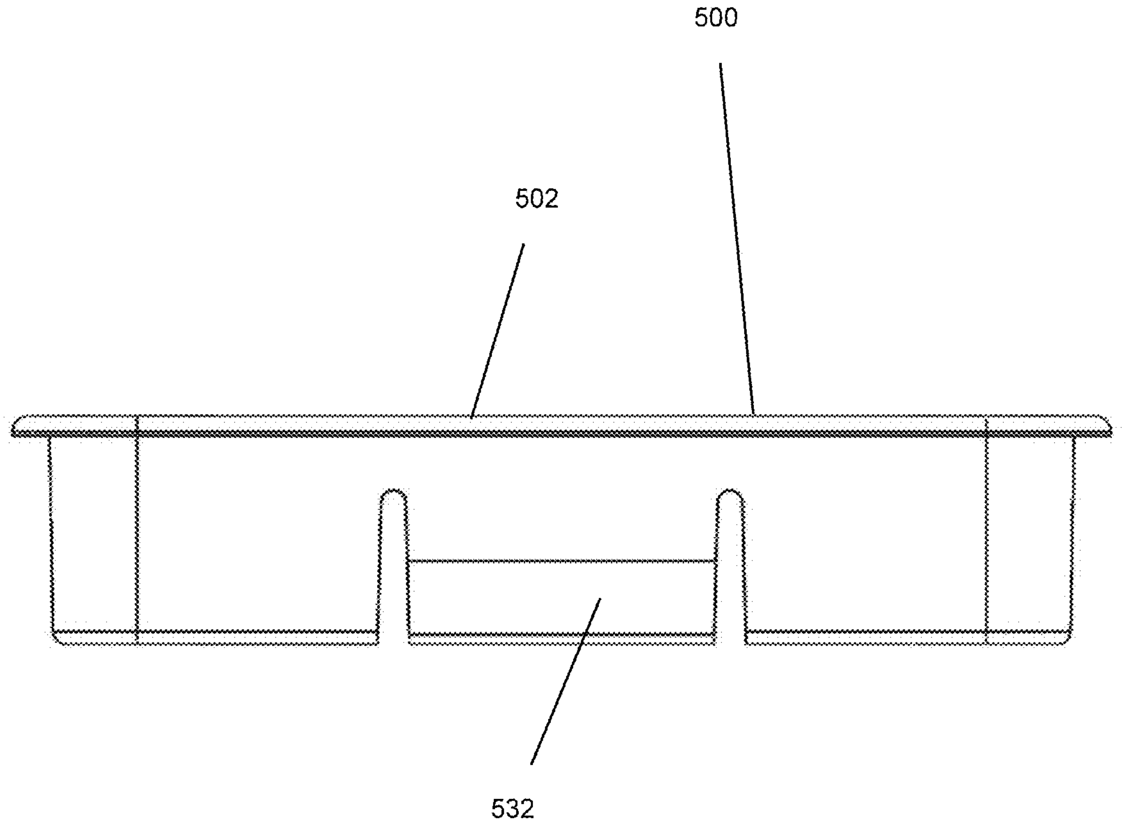
FIG. 29 is a back elevation view of the second lock counterpart of FIG. 24.
Figure 30:
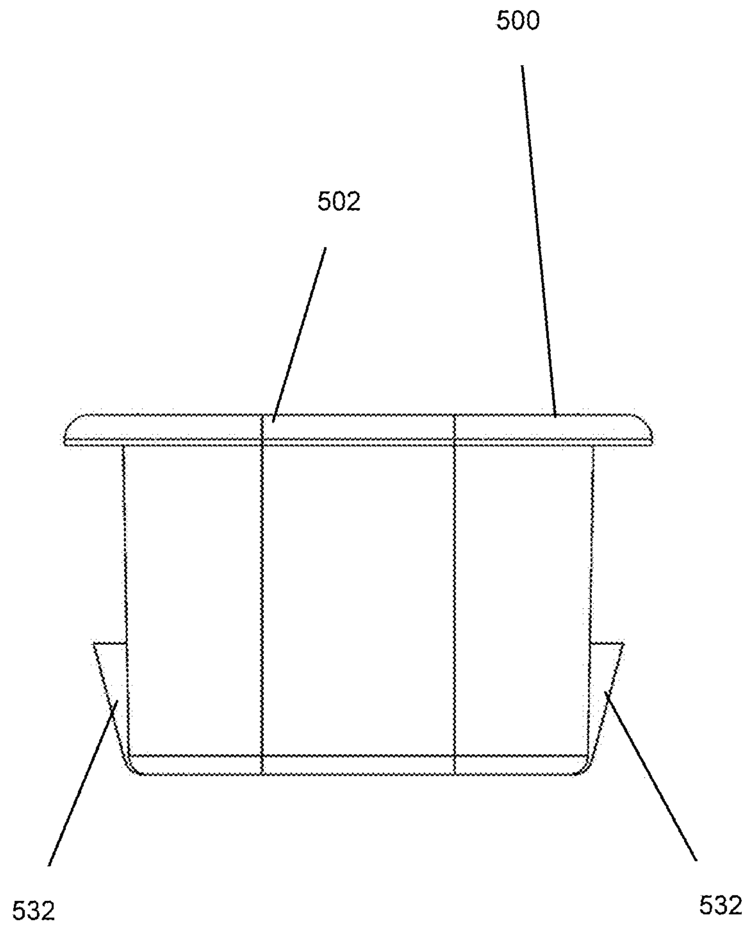
FIG. 30 is a left elevation view of the second lock counterpart of FIG. 24.
Figure 31:
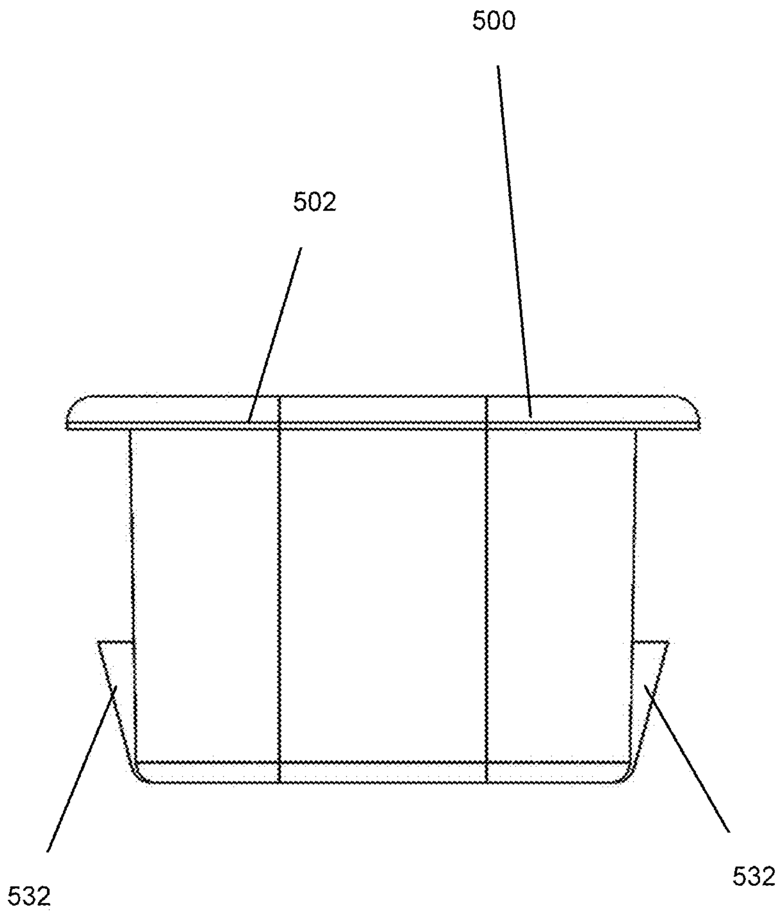
FIG. 31 is a right elevation view of the second lock counterpart of FIG. 24.

In some embodiments, for example, the second lock counterpart 500 of the fixed sash assembly 500 includes a keeper 502, the keeper 502 being defined by at least one elongated aperture. In some embodiments, for example, the keeper 502 of the second lock counterpart 500 is configured to co-operate with the lock assembly 202 of the first lock counterpart 200 to lock the movable sash assembly 100 to the fixed sash assembly 400. As depicted in FIG. 24 to FIG. 31 and FIG. 36, the keeper 502 includes an elongated aperture 504 and the elongated aperture 514. Each elongated aperture of the keeper 502, independently, is configured to receive the locking pin 206 of the locking assembly 202. As depicted in FIG. 24; (i) the elongated aperture 504 includes an upper portion 506 and a lower portion 508, wherein, while the second lock counterpart 500 is connected to the fixed sash 402, the upper portion 506 of the elongated aperture 504 is disposed above the lower portion 508 of the elongated aperture 504, and (ii) the elongated aperture 514 includes an upper portion 516 and a lower portion 518, wherein, while the second lock counterpart 500 is connected to the fixed sash 402, the upper portion 516 of the elongated aperture 514 is disposed above the lower portion 518 of the elongated aperture 514.

In some embodiments, for example, the second lock counterpart 500 is connected to the fixed sash 402, for example, via snap fit, friction fit, or interference fit. In some embodiments, for example, the connection of the second lock counterpart 500 to the fixed sash 402 is effectible by a connection system 530, the connection system 530 including prongs 532. In some embodiments, to connect the second lock counterpart 500 to the fixed sash 402, a hole is cut into a wall member of the fixed sash 402 that defines the first surface 404 of the fixed sash 402, and the connection system 530 is pushed into the hole. In some embodiments, for example, the hole is cut via a punch. In some embodiments, for example, the punching of the hole is a secondary process after extrusion of the fixed sash 402. The pushing of the connection system 530 into the hole is with effect that the prongs 532 become disposed in a snap fit, friction fit, or interference fit connection with the surface of hole, such that the second lock counterpart 500 is connected to the fixed sash 402, for example, via snap fit, friction fit, or interference fit. In some embodiments, for example, the connection of the second lock counterpart 500 to the fixed sash 402 is effected by connected of the second lock counterpart 500 to the wall member of the fixed sash 40 that defines the first surface 404.

In some embodiments, for example, for each of the elongated apertures of the keeper 502, independently, alignment of the locking pin 206 of the lock assembly 202 to the elongated aperture is with effect that the assembly 10 becomes configured in a respective position. In this respect, each of the elongated apertures, independently, is associated with a particular position in which the assembly 10 is configurable. In some embodiments, for example, while fixed sash assembly 400 and the movable sash assembly 100 are mounted to the sill configuration 50, and the locking pin 206 is aligned with the elongated aperture 504, the assembly 10 is disposed in the closed position. In some embodiments, for example, while fixed sash assembly 400 and the movable sash assembly 100 are mounted to the sill configuration 50, and the locking pin 206 is aligned with the elongated aperture 514, the assembly 10 is disposed in the partially open position.

In some embodiments, for example, the elongated aperture 504 has a minimum height of at least ⅜ inches. In some embodiments, for example, the elongated aperture 514 has a minimum height of at least ⅜ inches.

Figure 38:
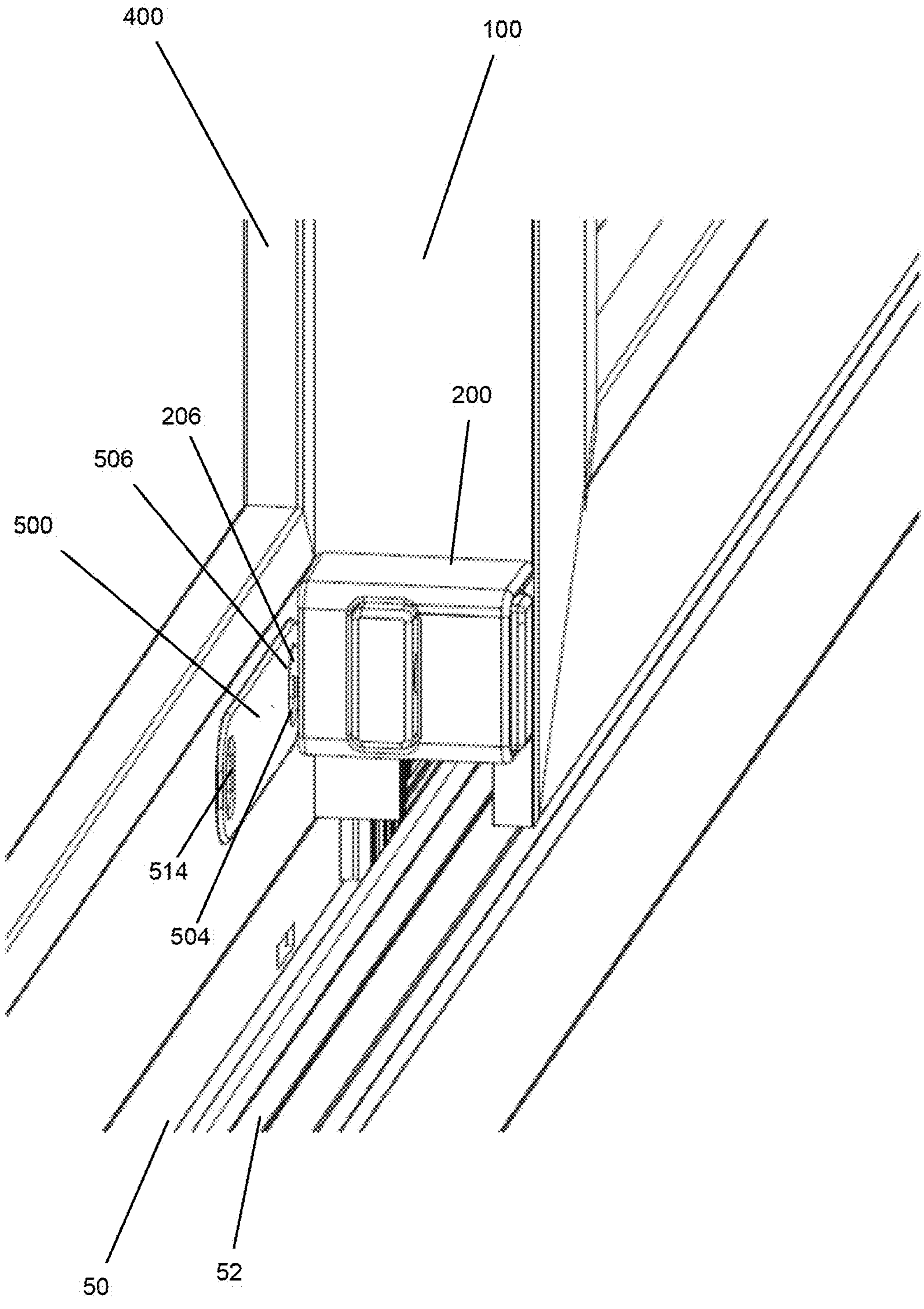
FIG. 38 is a perspective view of the movable sash assembly locked to the fixed sash assembly in a first locked configuration.
Figure 40:
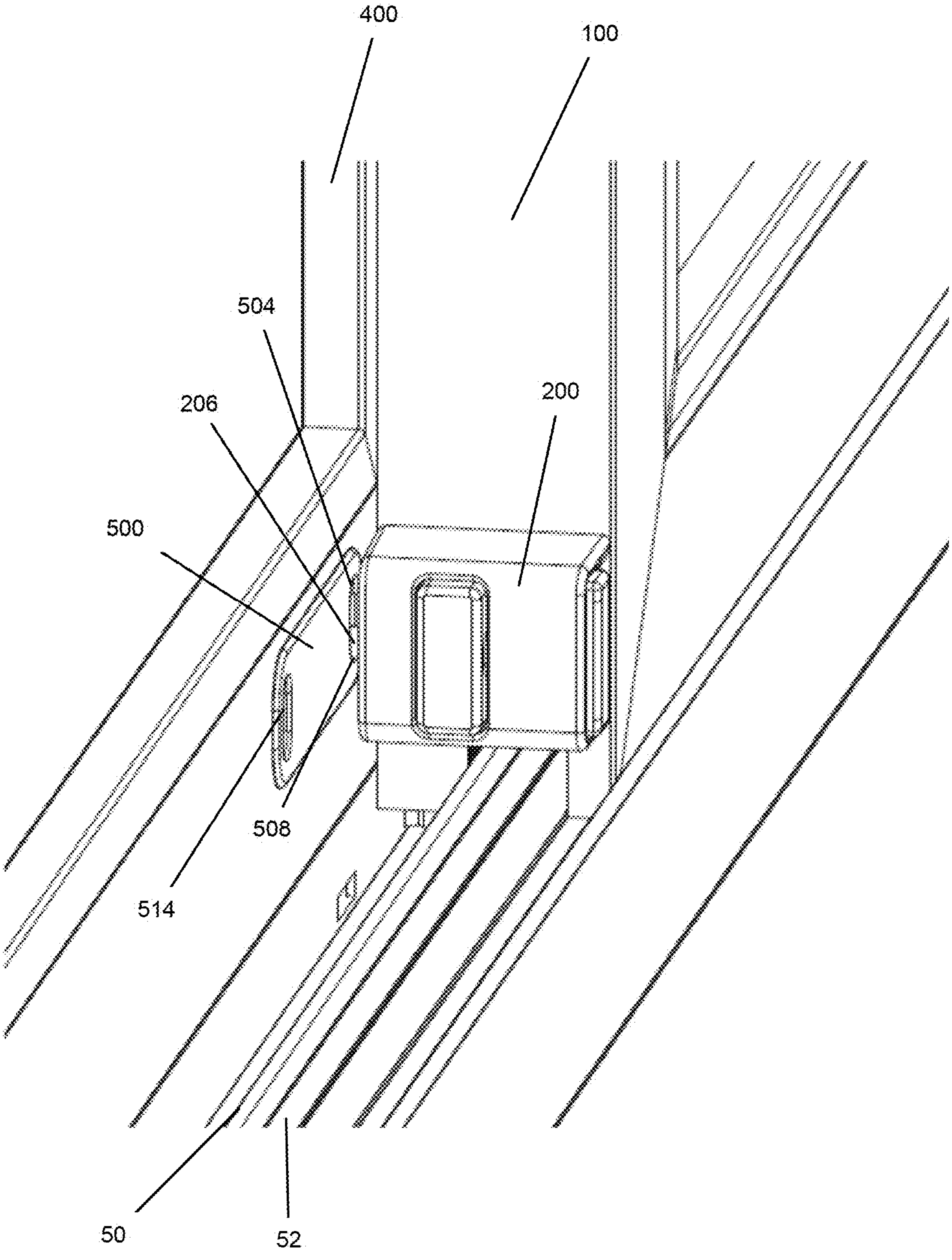
FIG. 40 is a perspective view of the movable sash assembly locked to the fixed sash assembly in a second locked configuration.

In some embodiments, for example, the movable sash assembly 100, the first lock counterpart 200, the fixed sash assembly 400, and the sill configuration 50 are co-operatively configured such that, while the mounted fixed sash configuration is established: (i) while the upper position configuration is established, as depicted in FIG. 37, the second lock counterpart 500 is disposed relative to the first lock counterpart 200 for interacting with the first lock counterpart 200 in response to a locking-effective actuation of the first lock counterpart 200, wherein the interacting is with effect that the movable sash assembly 100 becomes locked to the fixed sash assembly 400 in a first locked configuration, as depicted in FIG. 38, (ii) while the lower position configuration is established, as depicted in FIG. 39 the second lock counterpart 500 is disposed relative to the first lock counterpart 200 for interacting with the first lock counterpart 200 in response to a locking-effective actuation of the first lock counterpart 200, wherein the interacting is with effect that the movable sash assembly 100 becomes locked to the fixed sash assembly 400 in a second locked configuration, as depicted in FIG. 40, and (iii) in each one of the upper position configuration and the lower position configuration, independently, while there is an absence of the interaction between the first lock counterpart 200 and the second lock counterpart 500, the mounting of the movable sash 102 to the sill configuration 50 is with effect that the movable sash assembly 100 is movable relative to the sill configuration 50. In some embodiments, for example, transitioning from the first locked configuration to the second locked configuration is effectible in absence of re-positioning of the second lock counterpart 500 relative to the fixed sash assembly 400. In some embodiments, for example, transitioning from the first locked configuration to the second locked configuration is effectible in absence of re-positioning of the first lock counterpart 200 relative to the movable sash assembly 100.

Figure 42:
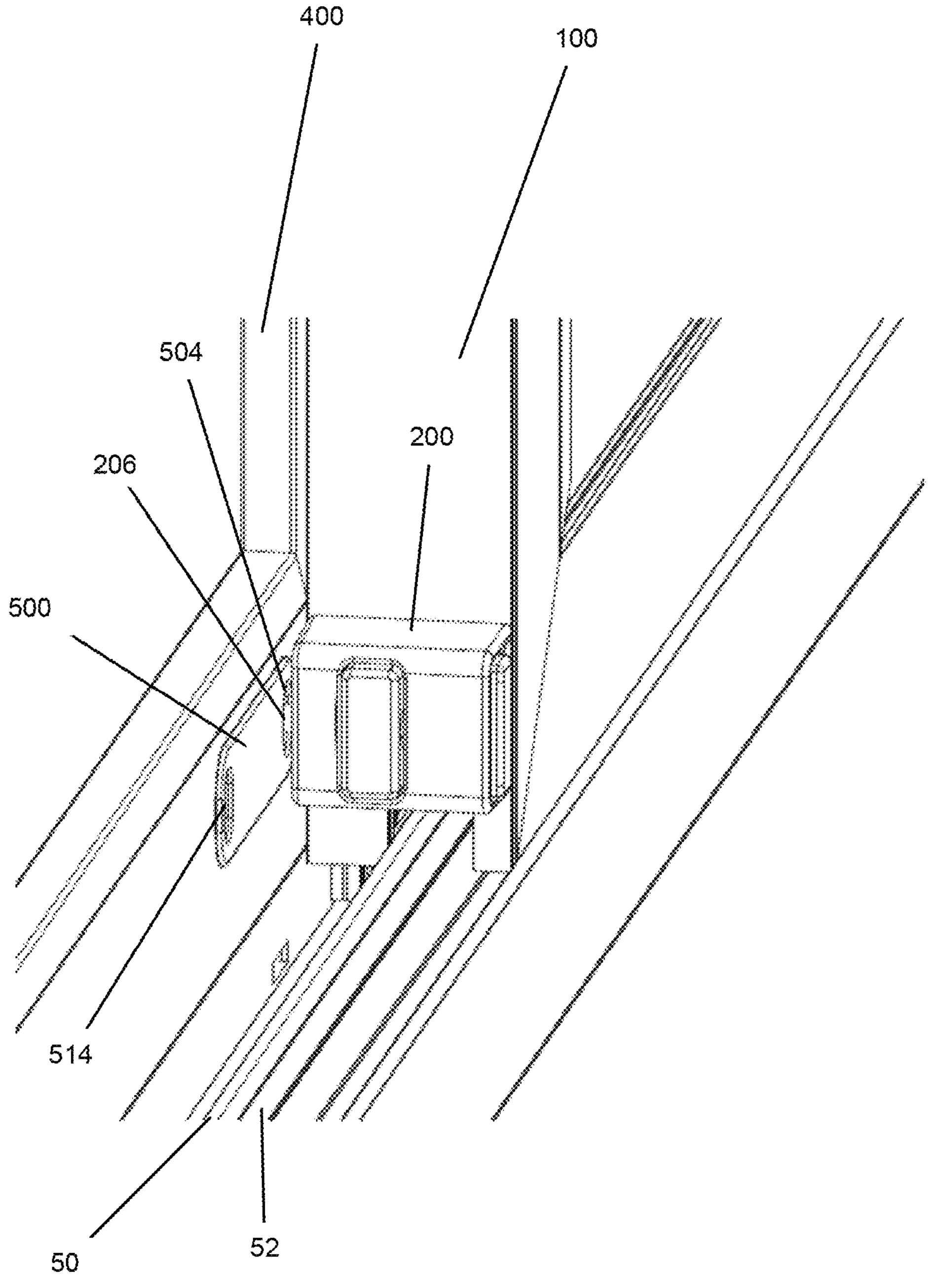
FIG. 42 is a perspective view of the movable sash assembly locked to the fixed sash assembly in a third locked configuration.

In some embodiments, for example, the movable sash assembly 100, the first lock counterpart 200, the fixed sash assembly 400, and the sill configuration 50 are co-operatively configured such that, while the mounted fixed sash configuration is established, and while the intermediate position configuration is established, as depicted in FIG. 41, the second lock counterpart 500 is disposed relative to the first lock counterpart 200 for interacting with the first lock counterpart 200 in response to a locking-effective actuation of the first lock counterpart 200, wherein the interacting is with effect that the movable sash assembly 100 becomes locked to the fixed sash assembly 400 in a third locked configuration, as depicted in FIG. 42. In the intermediate position configuration, while there is an absence of the interaction between the first lock counterpart 200 and the second lock counterpart 500, the mounting of the movable sash 102 to the sill is with effect that the movable sash 102 is movable relative to the sill configuration 50. In some embodiments, for example, transitioning between the first locked configuration, the second locked configuration, and the third lock configuration is effectible in absence of re-positioning of the second lock counterpart 500 relative to the fixed sash assembly 400. In some embodiments, for example, transitioning between the first locked configuration, the second locked configuration, and the third lock configuration is effectible in absence of re-positioning of the first lock counterpart 200 relative to the movable sash assembly 100.

In some embodiments, for example, each one of the first, second, and third locked configurations, independently, is establishable while the assembly 10 is disposed in a closed position.

In some embodiments, for example, the first lock counterpart 200 includes the locking pin 206, and the second lock counterpart 500 includes the keeper 502 for receiving insertion of the locking pin 206 such that the interacting between the first lock counterpart 200 and the second lock counterpart 500 includes insertion of the locking pin 206 within the keeper 502, and the locking pin 206 is positionable in retracted and extended positions, wherein each one of the first, second, and third locked configurations, independently, is established while the locking pin 206 is disposed in the extended position.

In some embodiments, for example, the absence of interacting between the first lock counterpart 200 and the second lock counterpart 500 includes an absence of insertion of the locking pin 206 within the keeper 502, for example, within an elongate aperture of the keeper 502.

In some embodiments, for example, wherein the first lock counterpart 200 includes the lock assembly 202 and the second lock counterpart 500 includes the keeper 202, the movable sash assembly 100, the lock assembly 202, the fixed sash assembly 400, and the sill configuration 50 are co-operatively configured such that, while the mounted fixed sash configuration is established: (i) while the upper position configuration is established, as depicted in FIG. 37, the keeper 502 is disposed relative to the lock assembly 202 for receiving insertion of the locking pin 206, as the locking pin 206 is being moved from the retracted position to the extended position, such that the movable sash assembly 100 becomes locked to the fixed sash assembly 400 in a first locked configuration, as depicted in FIG. 38, while the locking pin 206 is inserted within the keeper 502, for example, within the elongated aperture 504, (ii) while the lower position configuration is established, as depicted in FIG. 39, the keeper 502 is also disposed relative to the lock assembly 202 for receiving insertion of the locking pin 206, as the locking pin 206 is being moved from the retracted position to the extended position, such that the movable sash assembly 100 becomes locked to the fixed sash assembly 100 in a second locked configuration, as depicted in FIG. 40, while the locking pin 206 is inserted within the keeper 502, and (iii) in each one of the upper position configuration and the lower position configuration, independently, while there is an absence of insertion of the locking pin 206 within the keeper 502, the mounting of the movable sash assembly 100 to the sill configuration 50 is with effect that the movable sash assembly 100 is movable relative to the sill configuration 50. In some embodiments, for example, transitioning from the first locked configuration to the second locked configuration is effectible in absence of re-positioning of the keeper 502 relative to the fixed sash assembly 400. In some embodiments, for example, transitioning from the first locked configuration to the second locked configuration is effectible in absence of re-positioning of the lock assembly 202 relative to the movable sash assembly 100.

In some embodiments, for example, the movable sash assembly 100, the lock assembly 202, the fixed sash assembly 400, and the sill configuration 50 are co-operatively configured such that, while the mounted fixed sash configuration is established, and while the intermediate position configuration is established, as depicted in FIG. 41, the keeper 502 is disposed relative to the lock assembly 202 for receiving insertion of the locking pin 206, as the locking pin 206 is being moved from the retracted position to the extended position, such that the movable sash assembly 100 becomes locked to the fixed sash assembly 400 in a third locked configuration, as depicted in FIG. 42, while the locking pin 206 is inserted within the keeper 502, for example, within the elongated aperture 504. In the intermediate position configuration, while there is an absence of insertion of the locking pin 206 within the keeper 502, the mounting of the movable sash assembly 100 to the sill configuration 50 is with effect that the movable sash assembly 100 is movable relative to the sill configuration 50. In some embodiments, for example, transitioning between the first locked configuration, the second locked configuration, and the third locked configuration is effectible in absence of re-positioning of the keeper 502 relative to the fixed sash assembly 400. In some embodiments, for example, transitioning between the first locked configuration, the second locked configuration, and the third locked configuration is effectible in absence of re-positioning of the lock assembly 202 relative to the movable sash assembly 100.

In some embodiments, for example, in the upper position configuration, the keeper 502 is disposed relative to the lock assembly 202 for receiving insertion of the locking pin 206 within an upper portion of an elongated aperture of the keeper 502, for example, the upper portion 506 of the elongated aperture 504 or the upper portion 516 of the elongated aperture 514, as depicted in FIG. 38. In some embodiments, for example, in the lower position configuration, the keeper 502 is disposed relative to the lock assembly 202 for receiving insertion of the locking pin 206 within a lower portion of an elongated aperture of the keeper 502, for example, the lower portion 508 of the elongated aperture 504 or the lower portion 518 of the elongated aperture 514, as depicted in FIG. 40. In some embodiments, for example, in the intermediate position configuration, the keeper 502 is disposed relative to the lock assembly 202 for receiving insertion of the locking pin 206 within an intermediate portion of an elongated aperture of the keeper 502, for example, the intermediate portion of the elongated aperture 504 or the intermediate portion of the elongated aperture 514. The intermediate portion of an elongated aperture of the keeper 502 is disposed between an upper portion and a lower portion of an elongated aperture of the keeper 502.

In some embodiments, for example, a kit fora lock of an assembly 10 of a fenestration includes the mounting bracket 150, the first lock counterpart 200, and the second lock counterpart 500.

In some embodiments, for example, if the mounting of the sash wheels 132 is to be adjusted to correct a misalignment of the movable sash 102 relative to the framework 12, the first lock counterpart 200 and the second lock counterpart 500 continue to be effective to lock the movable sash assembly 100 and the fixed sash 400, for example, due to the co-operative configuration of the locking pin 206 of the lock assembly 200 and the elongated apertures 504 and 514 of the keeper 502, such that uninstallation of the first lock counterpart 200 or the second lock counterpart 500 and reinstallation of first lock counterpart 200 or the second lock counterpart 500 to a different position of the movable sash assembly 100 or the fixed sash assembly 400 may be avoided.

In some embodiments, for example, the connection between the first lock counterpart 200 and the mounting bracket 150 is simple and quick to establish, for example, relative to a connection established by mechanical fasteners. In some embodiments, for example, the connection between the first lock counterpart 200 and the mounting bracket 150 is simple and quick to defeat, for example, relative to defeating of a connection established by mechanical fasteners. In some embodiments, for example, the connection between the first lock counterpart 200 and the mounting bracket 150 is effectible without separate fasteners, such as separate mechanical fasteners. In some embodiments, for example, due to the connection between the first lock counterpart 200 and the mounting bracket 150, which is mounted to the movable sash 102, if a user wants to access the access port 120 to adjust the mounting of the sash wheels 132, the user can unmount the first lock counterpart 200 from the mounting bracket 150 by defeating the connection, for example, the snap fit connection, between the first lock counterpart 200 and the second mounting bracket 150. The defeating of the snap fit connection between the first lock counterpart 200 and the second mounting bracket 150 may be simpler and easier than removing fasteners. Accordingly, access to the access port 120 for adjusting the mounting of the sash wheels 132 is relatively easier and less time consuming, as fasteners do not have to be removed or installed by the user to access the access port 120.

FIG. 32 to FIG. 36 depict the movable sash assembly 100 disposed relative to the fixed sash assembly 400, and the locking pin 206 of the lock assembly 202 of the first lock counterpart 200 is aligned with the elongated slot 504 of the keeper 502 of the second lock counterpart 500, such that the assembly 10 is configured in the closed position, and FIG. 38 and FIG. 40 depict the movable sash assembly 100 locked to the fixed sash assembly 400, such that the assembly 10 is locked in the closed position.

In some embodiments, for example, the movable sash assembly 100 disposable, relative to the fixed sash assembly 400, such that the locking pin 206 of the lock assembly 202 of the first lock counterpart 200 becomes aligned with one of the elongated slots of the keeper 502 of the second lock counterpart 500, such that the assembly 10 becomes configured in one of the different configurations and is lockable in said configuration. In some embodiments, for example, the movable sash assembly 100 can become disposed relative to the fixed sash assembly 400 to align the locking pin 206 of the lock assembly 202 of the first lock counterpart 200 with the elongated slot 514 of the keeper 502 of the second lock counterpart 500, such that the assembly 10 is configured in the partially open position, and the assembly 10 is lockable in the partially open position.

As depicted in FIG. 1, in some embodiments, for example, the mounting bracket 150 and the first lock counterpart 200 are mountable at a bottom end of the movable sash 102, and the second lock counterpart 500 is mountable at a bottom end of the fixed sash 402. In some embodiments, for example, the depicted first lock counterpart 200 is actable by a foot of a user.

Figure 43:
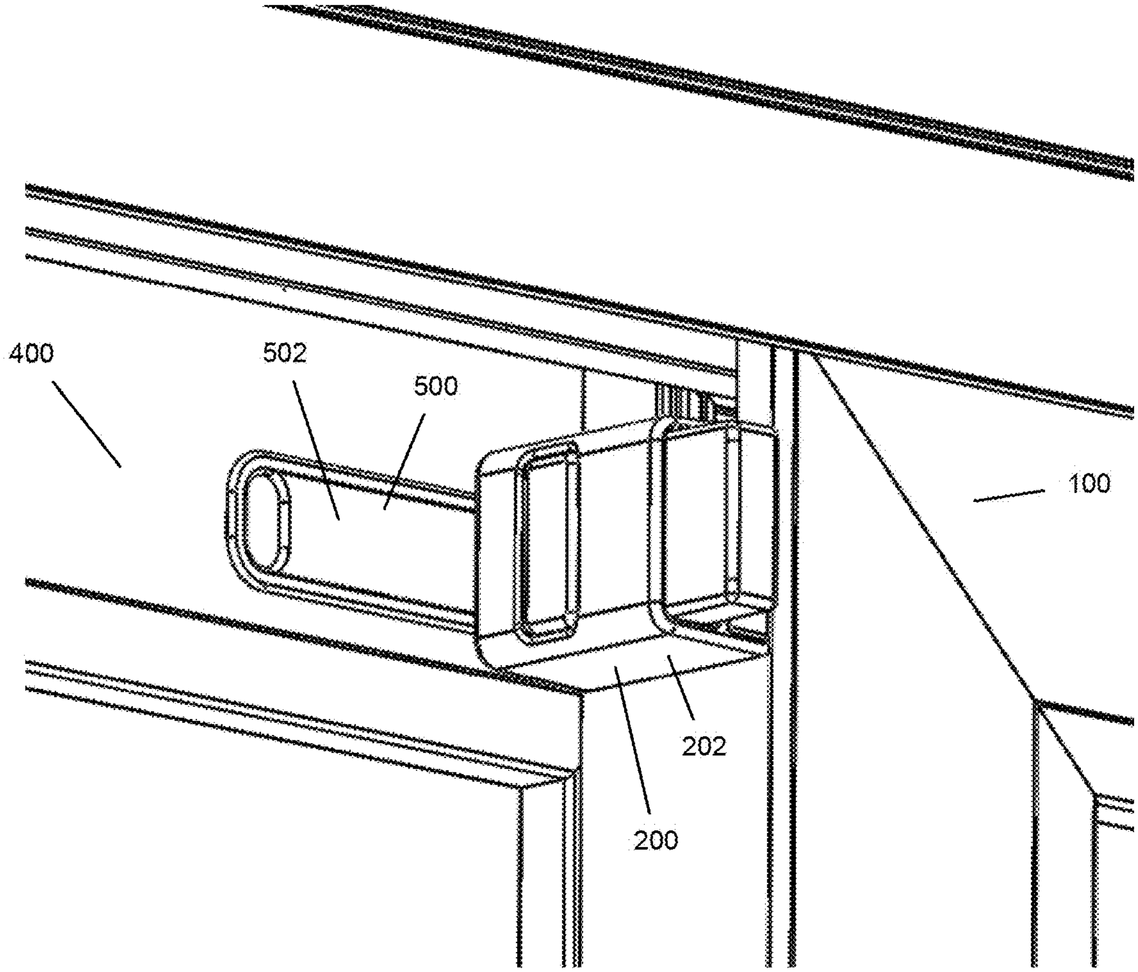
FIG. 43 is a perspective view of a first lock counterpart and second lock counterpart of the assembly of FIG. 1, the first lock counterpart mounted at a top end of a movable sash assembly, and the second lock counterpart mounted at a top end of a fixed sash assembly.

In some embodiments, for example, as depicted in FIG. 43, the mounting bracket 150 and the first lock counterpart 200 are mountable at a top end of the movable sash 102, and the second lock counterpart 500 is mountable at a top end of the fixed sash 402. In some embodiments, for example, the depicted first lock counterpart 200 is actable by a hand of a user.

Figure 44:
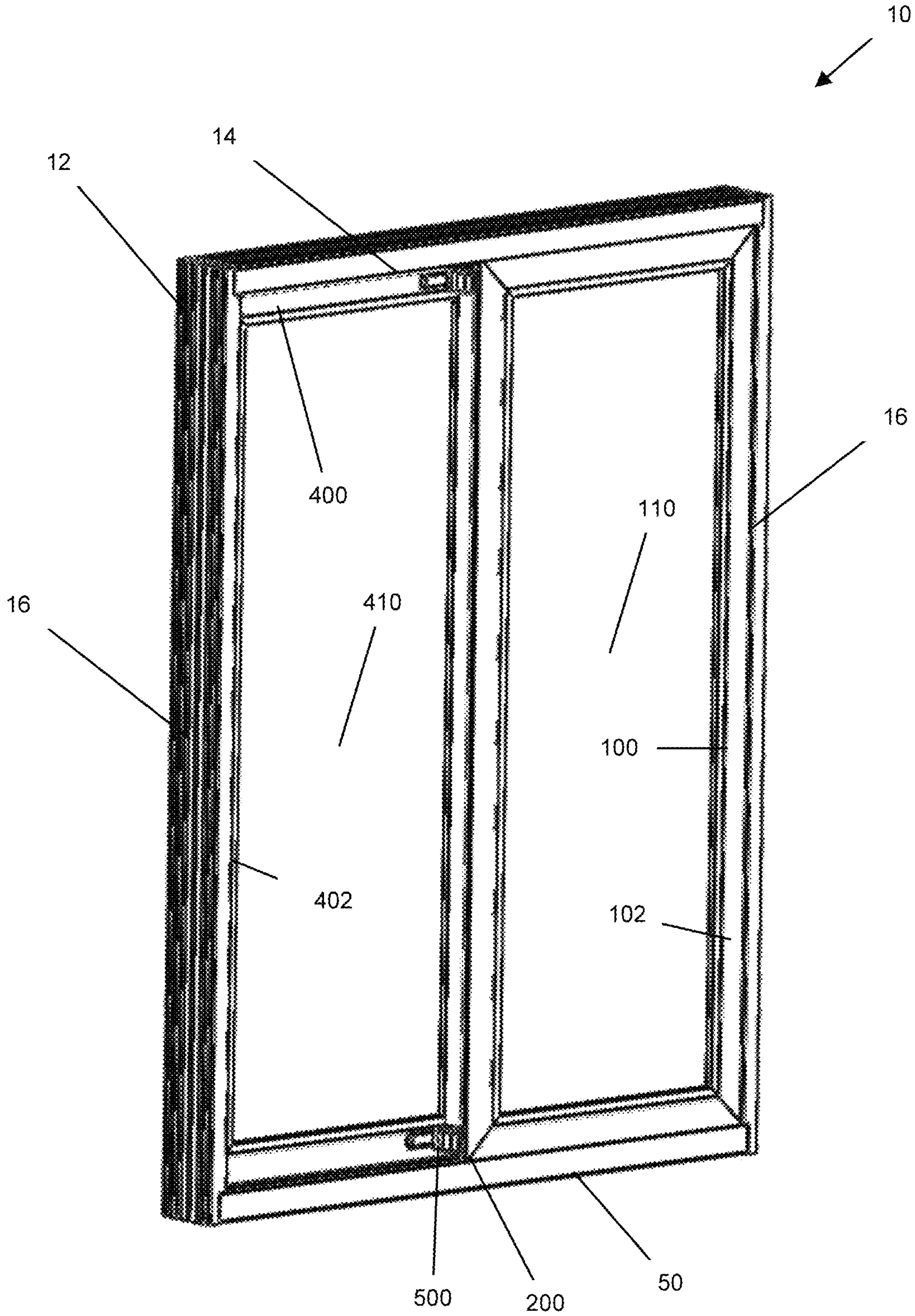
FIG. 44 is a perspective view of the assembly of FIG. 1, having first lock counterparts mounted at a top end and at a bottom end of the movable sash assembly, and second lock counterparts mounted at a top end and a bottom end of a fixed sash assembly.
Figure 45:
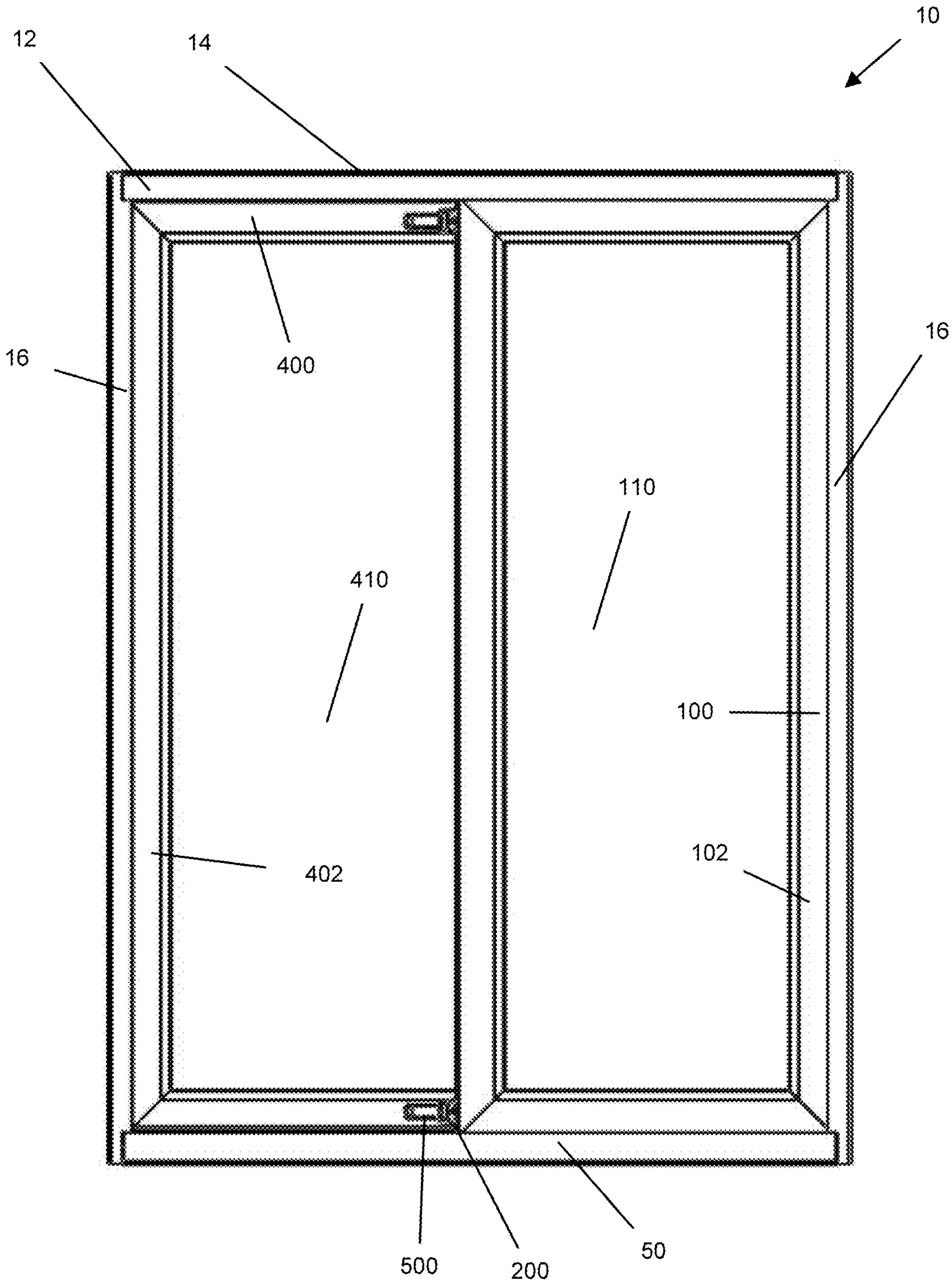
FIG. 45 is a front elevation view of the assembly of FIG. 44.

In some embodiments, for example, as depicted in FIG. 44 and FIG. 45, mounting brackets 150 and first lock counterparts 200 are mountable at the bottom end and the top end of the movable sash 102, and second lock counterparts 500 are mountable at the bottom end and top end of the fixed sash 402.

The preceding discussion provides many example embodiments. Although each embodiment represents a single combination of inventive elements, other examples may include all suitable combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be examples only. The invention is defined by the appended claims.

What is claimed is:

1. Parts for an assembly for a fenestration, comprising:

a movable sash;

a sill configuration;

wherein:

the movable sash is configured for mounting to the sill configuration; and the mounting is adjustable so that the movable sash is vertically positionable relative to the sill configuration between an upper position and a lower position;

a first lock counterpart mountable to the movable sash;

wherein:

while the first lock counterpart is mounted to the movable sash:

while the movable sash is mounted to the sill configuration such that the movable sash is disposed in the upper position relative to the sill configuration, the first lock counterpart, the movable sash, and the sill configuration are disposed in an upper position configuration; and while the movable sash is mounted to the sill configuration so that the movable sash is disposed in the lower position relative to the sill configuration, the first lock counterpart, the movable sash, and the sill configuration are disposed in a lower position configuration;

and;

a fixed sash assembly configured for mounting to the sill configuration so that a mounted fixed sash configuration is established, wherein the fixed sash assembly includes:

a fixed sash; and a second lock counterpart;

wherein:

the movable sash, the first lock counterpart, the fixed sash assembly, and the sill configuration are co-operatively configured so that, while the mounted fixed sash configuration is established:

while the upper position configuration is established, the second lock counterpart is disposed relative to the first lock counterpart for interacting with the first lock counterpart in response to a locking-effective actuation of the first lock counterpart, wherein the interacting is with effect that the movable sash becomes locked to the fixed sash assembly in a first locked configuration;

while the lower position configuration is established, the second lock counterpart is disposed relative to the first lock counterpart for interacting with the first lock counterpart in response to a locking-effective actuation of the first lock counterpart, wherein the interacting is with effect that the movable sash becomes locked to the fixed sash assembly in a second locked configuration;

in each one of the upper position configuration and the lower position configuration, independently, while there is an absence of the interaction between the first and second lock counterparts, the mounting of the movable sash to the sill configuration is with effect that the movable sash is movable relative to the sill configuration; and transitioning from the first locked configuration to the second locked configuration is effectible in absence of re-positioning of the second lock counterpart relative to the fixed sash.

2. The parts of claim 1, wherein the first lock counterpart, the movable sash, and the sill configuration are co-operatively configured so that, a minimum vertical displacement of the movable sash, in transitioning between the upper position configuration and the lower position configuration, is at least ⅛ inches.

3. The parts of claim 1, wherein the movable sash is configured for receiving mounting of sash wheels, the sash wheels being mountable to a track of the sill configuration for movement along the track, so that the movement of the sash wheels along the track is transmitted to the movable sash, so that the movability of the movable sash relative to the sill configuration is established by the mounting of the sash wheels to the track, wherein the mounting of the sash wheels to the movable sash is adjustable for effecting the vertical positioning of the movable sash relative to the sill configuration.

4. The parts of claim 1, wherein the first lock counterpart is mountable to a side surface of the movable sash, and wherein the second lock counterpart is defined on an inside surface of the fixed sash.

5. The parts of claim 1, wherein each one of the first and second locked configurations are established while the assembly is disposed in a closed position.

6. The parts of claim 1, wherein the first lock counterpart includes a locking pin, and the second lock counterpart includes a keeper for receiving insertion of the locking pin so that the interacting between the first and second lock counterparts includes insertion of the locking pin within the keeper, and the locking pin is positionable in retracted and extended positions, wherein each one of the first and second locked configurations, independently, is established while the locking pin is disposed in the extended position.

7. The parts of claim 6, wherein the absence of interacting between the first and second locking counterparts includes an absence of insertion of the locking pin within the keeper.

8. Parts for an assembly for a fenestration, comprising:

a movable sash;

a sill configuration;

wherein:

the movable sash is configured for mounting to the sill configuration; and the mounting is adjustable so that the movable sash is vertically positionable relative to the sill configuration between an upper position and a lower position;

a lock assembly mountable to the movable sash, including a locking pin movable between at least an extended position and a retracted position;

wherein:

while the lock assembly is mounted to the movable sash:

while the movable sash is mounted to the sill configuration so that the movable sash is disposed in the upper position relative to the sill configuration, the lock assembly, the movable sash, and the sill configuration are disposed in an upper position configuration; and while the movable sash is mounted to the sill configuration so that the movable sash is disposed in the lower position relative to the sill configuration, the lock assembly, the movable sash, and the sill configuration are disposed in a lower position configuration;

and a fixed sash assembly configured for mounting to the sill configuration so that a mounted fixed sash configuration is established, wherein the fixed sash assembly includes:

a fixed sash; and a keeper, the keeper being defined by an elongated aperture;

wherein:

the movable sash, the lock assembly, the fixed sash assembly, and the sill configuration are co-operatively configured so that, while the mounted fixed sash configuration is established:

and while the upper position configuration is established, the keeper is disposed relative to the lock assembly for receiving insertion of the locking pin, as the locking pin is being moved from the retracted position to the extended position, so that the movable sash becomes locked to the fixed sash assembly in a first locked configuration while the locking pin is inserted within the keeper;

while the lower position configuration is established, the keeper is also disposed relative to the lock assembly for receiving insertion of the locking pin, as the locking pin is being moved from the retracted position to the extended position, so that the movable sash becomes locked to the fixed sash assembly in a second locked configuration while the locking pin is inserted within the keeper;

and in each one of the upper position configuration and the lower position configuration, independently, while there is an absence of insertion of the locking pin within the keeper, the mounting of the movable sash to the sill configuration is with the effect that the movable sash is movable relative to the sill configuration.

9. The parts of claim 8, wherein in the upper position configuration, the keeper is disposed relative to the lock assembly for receiving insertion of the lock pin within an upper portion of the elongated aperture, and in the lower position configuration, the keeper is disposed relative to the lock assembly for receiving insertion of the locking pin within a lower portion of the elongated aperture.

10. The parts of claim 8, wherein the lock assembly, the movable sash, and the sill configuration are co-operatively configured so that a minimum vertical displacement of the movable sash, in transitioning between the upper position configuration and the lower position configuration, is at least ⅛ inches.

11. The parts of claim 8, wherein the elongated aperture has a minimum height of at least ⅜ inches.

12. The parts of claim 8, wherein the movable sash is configured for receiving mounting of sash wheels so that a movable sash assembly is established, the sash wheels being mountable to a track of the sill configuration for movement along the track, so that the movement of the sash wheels along the track is transmitted to the movable sash, so that the movability of the movable sash relative to the sill configuration is established by the mounting of the sash wheels to the track, wherein the mounting of the sash wheels to the movable sash is adjustable for effecting the vertical positioning of the movable sash relative to the sill configuration.

13. The parts of claim 8, wherein each one of the first and second locked configurations are established while the assembly is disposed in a closed position.

14. The parts of claim 8, wherein the lock assembly is mountable to a side surface of the movable sash, and the keeper is defined on an inside surface of the fixed sash.

15. The parts of claim 8, wherein transitioning from the first locked configuration to the second locked configuration is effectible in absence of re-positioning of the keeper relative to the fixed sash.

16. Parts for an assembly for a fenestration, comprising:

a movable sash assembly including:

a sash including an access port; and a sash wheel assembly, mounted to the sash, including sash wheels and a positioning mechanism;

a sill configuration including a track;

wherein:

the movable sash is configured for mounting to the sill configuration so that the sash wheels are mounted to the track of the sill configuration for movement along the track, so that the movement of the sash wheels along the track is transmitted to the movable sash, so that movability of the movable sash relative to the sill configuration is established by the mounting of the sash wheels to the track; and the mounting of the sash wheels, to the movable sash, is adjustable such that the sash wheels are vertically positionable relative to the movable sash, with effect that the movable sash is vertically positionable relative to the sill configuration between an upper position and a lower position;

a mounting bracket, including an opening, the mounting bracket mountable to the movable sash, wherein the mounting of the mounting bracket to the movable sash is such that the access port is accessible by a tool through the opening;

a first lock counterpart mountable to the mounting bracket, wherein the mounting of the first lock counterpart to the mounting bracket is so that the first lock counterpart is disposed in a snap fit relationship with the mounting bracket;

wherein, while the mounting bracket is mounted to the movable sash:

and while there is an absence of mounting of the first lock counterpart to the mounting bracket, the positioning mechanism of the sash wheel assembly is accessible by the tool, through the opening of the mounting bracket and through the access port, for effecting the adjustment to the sash wheel assembly;

while the first lock counterpart is mounted to the mounting bracket:

the access port is occluded so that the accessibility of the sash wheel assembly, by the tool, through the access port, is absent;

while the movable sash is mounted to the sill configuration so that the movable sash is disposed in the upper position relative to the sill configuration, the first lock counterpart, the movable sash, and the sill configuration are disposed in an upper position configuration; and while the movable sash is mounted to the sill configuration so that the movable sash is disposed in the lower position relative to the sill configuration, the first lock counterpart, the movable sash, and the sill configuration are disposed in a lower position configuration;

and a fixed sash assembly configured for mounting to the sill configuration so that a mounted fixed sash configuration is established, wherein the fixed sash assembly includes:

a fixed sash; and a second lock counterpart;

wherein:

the movable sash assembly, the first lock counterpart, the fixed sash assembly, and the sill configuration are co-operatively configured so that, while the mounted fixed sash configuration is established:

while the upper position configuration is established, the second lock counterpart is disposed relative to the first lock counterpart for interacting with the first lock counterpart in response to a locking-effective actuation of the first lock counterpart, wherein the interacting is with effect that the movable sash assembly becomes locked to the fixed sash assembly in a first locked configuration;

while the lower position configuration is established, the second lock counterpart is disposed relative to the first lock counterpart for interacting with the first lock counterpart in response to a locking-effective actuation of the first lock counterpart, wherein the interacting is with effect that the movable sash assembly becomes locked to the fixed sash assembly in a second locked configuration; and in each one of the upper position configuration and the lower position configuration, independently, while there is an absence of the interaction between the first and second lock counterparts, the mounting of the movable sash to the sill configuration is with effect that the movable sash assembly is movable relative to the sill configuration.

17. The parts of claim 16, wherein the access port is defined in a side surface of the movable sash.

18. The parts of claim 16, wherein the occlusion of the access port is with further effect that the positioning mechanism of the sash wheel assembly is concealed.

19. The parts of claim 16, wherein the first lock counterpart is mountable to a side surface of the movable sash, the second lock counterpart is defined on an inside surface of the fixed sash.

20. The parts of claim 16, wherein transitioning from the first locked configuration to the second locked configuration is effectible in absence of re-positioning of the second lock counterpart relative to the fixed sash.

* * * * *